(12) United States Patent
Minezawa et al.

(10) Patent No.: US 10,034,019 B2
(45) Date of Patent: Jul. 24, 2018

(54) IMAGE ENCODING DEVICE, IMAGE ENCODING METHOD, IMAGE DECODING DEVICE, AND IMAGE DECODING METHOD

(71) Applicant: MITSUBISHI ELECTRIC CORPORATION, Tokyo (JP)

(72) Inventors: Akira Minezawa, Tokyo (JP); Ryoji Hattori, Tokyo (JP); Kazuyuki Miyazawa, Tokyo (JP); Yoshimi Moriya, Tokyo (JP); Shunichi Sekiguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 182 days.

(21) Appl. No.: 14/892,288

(22) PCT Filed: Jun. 11, 2014

(86) PCT No.: PCT/JP2014/003107
§ 371 (c)(1),
(2) Date: Nov. 19, 2015

(87) PCT Pub. No.: WO2014/199634
PCT Pub. Date: Dec. 18, 2014

(65) Prior Publication Data
US 2016/0094860 A1    Mar. 31, 2016

(30) Foreign Application Priority Data

Jun. 12, 2013 (JP) .................................. 2013-123391
Aug. 26, 2013 (JP) .................................. 2013-174670

(51) Int. Cl.
*H04N 19/593* (2014.01)
*H04N 19/107* (2014.01)
(Continued)

(52) U.S. Cl.
CPC ......... *H04N 19/593* (2014.11); *H04N 19/107* (2014.11); *H04N 19/114* (2014.11);
(Continued)

(58) Field of Classification Search
CPC .. H04N 19/593; H04N 19/107; H04N 19/114; H04N 19/159; H04N 19/16;
(Continued)

(56) References Cited

U.S. PATENT DOCUMENTS

| 5,317,397 A | 5/1994 | Odaka et al. |
| 2005/0053137 A1* | 3/2005 | Holcomb ............... H04N 19/52 375/240.16 |

(Continued)

FOREIGN PATENT DOCUMENTS

| JP | 5-111012 A | 4/1993 |
| JP | 2010-41354 A | 2/2010 |

(Continued)

OTHER PUBLICATIONS

Terada, et al., U.S. Appl. No. 61/843,076. Image Coding Method, Image Decoding Method, Image Coding Apparatus, Image Decoding Apparatus, and Image Coding and Decoding Apparatus, Panasonic Corporation, Jul. 5, 2013.*

(Continued)

*Primary Examiner* — Jay Patel
*Assistant Examiner* — Marnie Matt
(74) *Attorney, Agent, or Firm* — Birch, Stewart, Kolasch & Birch, LLP

(57) ABSTRACT

An image encoding device includes an encoder that encodes a first field of a specific frame as an intra picture which is predicted by using only an ultra prediction, and that encodes the first field of the above-described specific frame, a second field of the above-described specific frame, a picture whose encoding order is later than that of the first field of the (Continued)

above-described specific frame later and whose display order is earlier than that of the first field, and another picture whose encoding order and also display order are later than those of the first field of the above-described specific frame in order of those pictures, and a multiplexer that multiplexes information showing that the first field of the above-described specific frame is a picture, in a bitstream, at which decoding can be started into the above-described bitstream.

5 Claims, 28 Drawing Sheets

(51) Int. Cl.
*H04N 19/114* (2014.01)
*H04N 19/159* (2014.01)
*H04N 19/16* (2014.01)
*H04N 19/172* (2014.01)
*H04N 19/70* (2014.01)

(52) U.S. Cl.
CPC ........... *H04N 19/159* (2014.11); *H04N 19/16* (2014.11); *H04N 19/172* (2014.11); *H04N 19/70* (2014.11)

(58) Field of Classification Search
CPC ...... H04N 19/172; H04N 19/70; H04N 19/46; H04N 19/105
USPC .................................................... 375/240.12
See application file for complete search history.

(56) References Cited

U.S. PATENT DOCUMENTS

| | | | |
|---|---|---|---|
| 2005/0069039 A1* | 3/2005 | Crinon | H04N 19/159 375/240.26 |
| 2005/0083218 A1* | 4/2005 | Regunathan | H04N 19/52 341/65 |
| 2005/0152448 A1* | 7/2005 | Crinon | H04N 21/23424 375/240.01 |
| 2007/0205928 A1* | 9/2007 | Chujoh | H04N 19/52 341/67 |
| 2008/0101465 A1* | 5/2008 | Chono | H04N 19/159 375/240.03 |
| 2011/0001839 A1 | 1/2011 | Arimura et al. | |
| 2014/0146885 A1 | 5/2014 | Park et al. | |
| 2015/0271508 A1* | 9/2015 | Terada | H04N 19/31 375/240.12 |
| 2015/0382002 A1 | 12/2015 | Park et al. | |

FOREIGN PATENT DOCUMENTS

| | | |
|---|---|---|
| JP | 2011-15117 A | 1/2011 |
| KR | 10-2013--0004436 | 1/2013 |

OTHER PUBLICATIONS

Bross et al., "High Efficiency Video Coding (HEVC) text specification draft 10 (for FDIS & Last Call)", doc. JCTVC-L1003, Joint Collaborative Team on Video Coding (JCT-VC) of ITU-T SG 16 WP 3 and ISO/IEC JTC 1/SC 29/WG 11, 12th Meeting, 2013, total 310 pages.
Recommendation ITU-T H.265, Series H: Audiovisual and Multimedia Systems, Infrastructure of audiovisual services—Coding of moving video, High efficiency video coding, Apr. 2013, total 317 pages.
Extended Supplementary European Search Report dated Dec. 22, 2016 in corresponding EP Application No. 14810646.1.
Fujibayashi et al. "Random Access Support for HEVC", 4, JCT-VC Meeting; 95, MPEG Meeting; Jan. 20, 2011-Jan. 28, 2011.
R. Sjoberg et al. "Overview of HEVC high-level syntax and reference picture management", IEEE Transactions on Circuits and Systems for Video Technology, Jan. 1, 2012.
R. Sjoberg et al. "RExt HLS: Picture referencing across CRA Picture", 16, JCT-VC Meeting; Jan. 9, 2014-Jan. 17, 2014.
Office Action dated Aug. 12, 2016 in corresponding Korean Application No. 2016-7000442 wth an English Translation.
Office Action issued in the counterpart Japanese Patent Application No. 2016-141163, with Machine translations, dated Dec. 12, 2017.

* cited by examiner

| Index | Class Classifying Method |
|---|---|
| 0 | No Offset Process |
| 1 | EO Method 1 |
| 2 | EO Method 2 |
| 3 | EO Method 3 |
| 4 | EO Method 4 |
| 5 | BO Method |

Region A, Region B, Region C, Region D, $P_i^n$

◯ Adjacent Already-Encoded Pixel

◎ Pixel to Be Filtered
◯ Reference Pixel $P_2$, $P_1$, $P_0$

Mean Value (DC Prediction), Horizontal Prediction, Vertical Prediction, Prediction Image, With Filtering Process

FIG.22

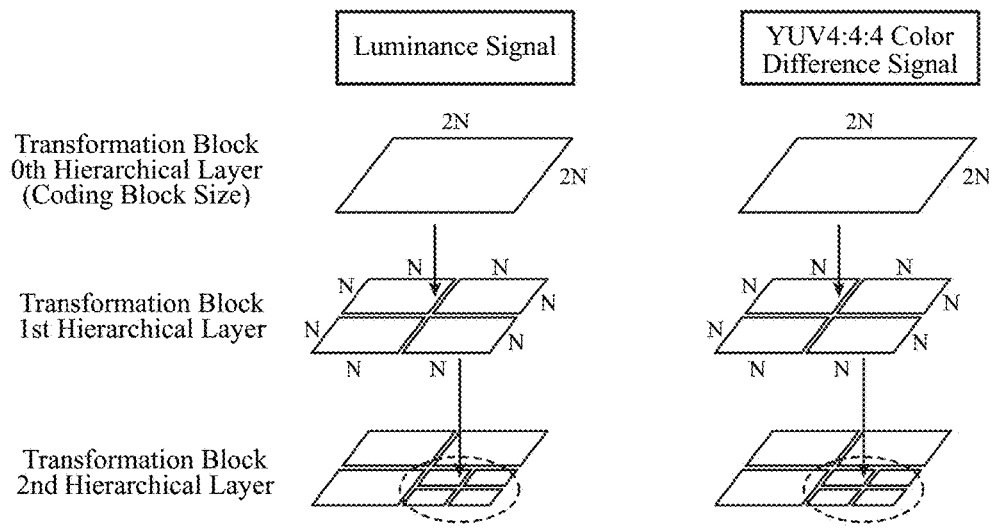

FIG.23

| Intra Prediction Parameter of Color Difference Signals | Color Difference Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |
| 5 | LM Mode |

FIG.24

| Intra Prediction Parameter of Color Difference Signals | Color Difference Intra Prediction Mode |
|---|---|
| 0 | Planar Prediction |
| 1 | Vertical Prediction |
| 2 | Horizontal Prediction |
| 3 | Mean Value (DC) Prediction |
| 4 | DM Mode |

FIG.29
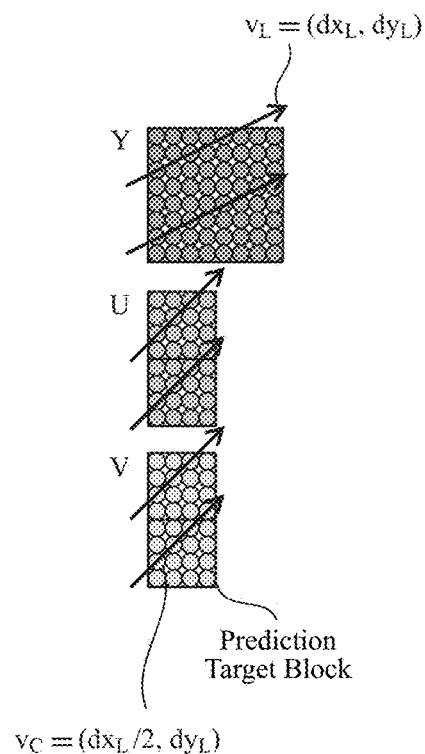
Prediction Target Block
FIG.30
In the Case of Prediction from Left
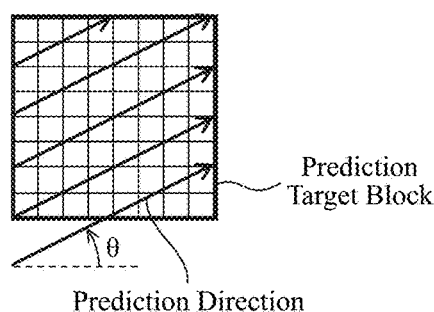
Prediction Target Block
Prediction Direction
In the Case of Prediction from Top
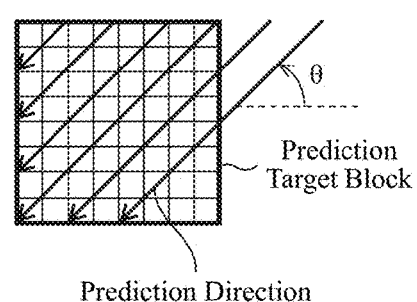
Prediction Target Block
Prediction Direction

FIG.31

| Intra Prediction Mode Index of Luminance Signal | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Intra Prediction Mode Index of Color Difference Signals | 0 | 1 | 2 | 2 | 2 | 2 | 3 | 5 | 7 | 8 | 10 | 12 | 13 | 15 | 17 | 18 | 19 | 20 |
| Intra Prediction Mode Index of Luminance Signal | 18 | 19 | 20 | 21 | 22 | 23 | 24 | 25 | 26 | 27 | 28 | 29 | 30 | 31 | 32 | 33 | 34 | |
| Intra Prediction Mode Index of Color Difference Signals | 21 | 22 | 23 | 23 | 24 | 24 | 25 | 25 | 26 | 27 | 27 | 28 | 28 | 29 | 29 | 30 | 31 | |

FIG.32

| Intra Prediction Mode Index | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|
| tanθ | 32/32 | 26/32 | 21/32 | 17/32 | 13/32 | 9/32 | 5/32 | 2/32 | 0 | −2/32 | −5/32 | −9/32 | −13/32 | −17/32 | −21/32 | −26/32 | −32/32 |

| Intra Prediction Mode Index | 19 | 20 | 21 | 22 | 23 | 24 | 25 | 26 | 27 | 28 | 29 | 30 | 31 | 32 | 33 | 34 |
|---|---|---|---|---|---|---|---|---|---|---|---|---|---|---|---|---|
| tanθ | −32/26 | −32/21 | −32/17 | −32/13 | −32/9 | −32/5 | −32/2 | - | 32/2 | 32/5 | 32/9 | 32/13 | 32/17 | 32/21 | 32/26 | 32/32 |

FIG.38

|  | Descriptor |
|---|---|
| recovery_poc_cnt | se(v) |
| exact_match_flag | u(1) |
| broken_link_flag | u(1) |

IMAGE ENCODING DEVICE, IMAGE ENCODING METHOD, IMAGE DECODING DEVICE, AND IMAGE DECODING METHOD

FIELD OF THE INVENTION

The present invention relates to an image encoding device for and an image encoding method of performing encoding with a high degree of efficiency, and an image decoding device and an image decoding method.

BACKGROUND OF THE INVENTION

For example, in a conventional image encoding device described in the following nonpatent reference 1, an inputted color image is partitioned into largest coding blocks each having a predetermined size, and each largest coding block is further partitioned hierarchically into smaller coding blocks.

Each coding block is further partitioned into smaller prediction blocks, and an intra-screen prediction and a motion-compensated prediction are performed on each of the prediction blocks to generate a prediction error.

Further, the prediction error is divided hierarchically into transformation blocks within each coding block, and each of the transform coefficients is entropy-encoded, thereby achieving a high compression ratio.

In order to implement efficient encoding using a temporal correlation in a conventional image encoding device, a block having a high correlation with a coding target block is searched for from an already-encoded picture on the basis of, for example, an encoding configuration as shown in FIG. 37, and encoding using a motion-compensated prediction which provides the block which is searched for as a predicted value is implemented. Generally, the picture through which the search (reference) is performed at that time is referred to as a reference picture. Particularly, it is known that a bidirectional prediction which is motion compensation which refers to both a past picture and a future picture in display order as shown in FIG. 37 can implement a high-accuracy prediction. However, providing a reference relation between pictures in this way results in dependence occurring in the decoding of each picture, and, as a result, a halfway playback of a sequence, this playback decoding an encoded bitstream from some point of this bitstream, cannot be implemented.

Therefore, when using the encoding configuration using a bidirectional motion-compensated prediction as shown in FIG. 37, there is a case of preparing a random access point at which to make it possible to correctly perform a playback even if the encoded bitstream is decoded from some point of the bitstream. For example, a case is examined in which a gray (shaded) picture having a number of 8 in the display order of FIG. 37 (having a number of 1 in the decoding (encoding)) order is set as a picture which is described in nonpatent reference 1 and can be accessed randomly (Intra Random Access Point (IRAP) picture described in nonpatent reference 1). In nonpatent reference 1, a picture whose decoding order (decoding order in a decoding device, and this decoding order has the same meaning as the encoding order in an encoding device) is later than that of an IRAP picture and whose display order is earlier than that of the IRAP picture (each of pictures having numbers 1 to 7 in the display order of FIG. 37) is defined as a "leading picture", and a picture whose decoding order and display order are later than those of the IRAP picture (each of pictures having numbers 9 to 16 in the display order of FIG. 37) is defined as a "trailing picture." When the gray (shaded) picture having a number of 8 in the display order of FIG. 37 (having a number of 1 in the decoding (encoding) order) is a CRA (Clean Random Access) picture which is a kind of an IRAP picture, there is no guarantee that the leading pictures can be decoded correctly when the decoding is started from the CRA picture, but the trailing pictures can be decoded correctly at all times. Limitations imposed on each associated picture are defined so that this operation is guaranteed. Concretely, in the image encoding device described in nonpatent reference 1, the use of each leading picture as a reference picture of a trailing picture is prohibited, while the existence of a picture whose display order is later than that of an IRAP picture and whose decoding order is earlier than that of the IRAP picture is also prohibited. In addition, in nonpatent reference 1, it is defined that each leading picture must be decoded (encoded) before the trailing pictures. Under such a definition, also when starting the decoding at some point of the encoded bitstream, by using a CRA picture, a picture whose display order is later than that of the CRA picture can be always decoded correctly by starting the decoding from the CRA picture, and a halfway playback of the encoded sequence can be implemented. Further, because it is only guaranteed that the trailing pictures can be decoded correctly in the case in which the picture is a CRA picture, the leading pictures make it possible to perform a bidirectional prediction also including the CRA picture, and a reduction of the coding efficiency which is caused by the insertion of the picture which can be accessed randomly can be reduced.

RELATED ART DOCUMENT

Nonpatent Reference

Nonpatent reference 1: B. Bross, W.-J. B. Bross, W.-J. Han, J.-R. Ohm, G. J. Sullivan, Y.-K. Wang and T. Wiegand, "High Efficiency Video Coding (HEVC) text specification draft 10 (for FDIS & Consent)", doc. JCTVC-L1003, Joint Collaborative Team on Video Coding (JCT-VC) of ITU-T SG16 WP3 and ISO/IEC JTC1/SC29/WG11, 12th Meeting, 2013

BRIEF SUMMARY OF THE INVENTION

Problems to be Solved by the Invention

Because the conventional image encoding device is constructed as above, in the case of a progressive video in which each frame consists of one picture, by starting the decoding from a specific picture even from some midpoint in an encoded bitstream, a random access which makes it possible to correctly decode pictures after the picture in the display order can be implemented. On the other hand, in the case of an interlaced video in which each frame consists of two fields: a top field and a bottom field, there is a case of performing the encoding with the field pair configuration being provided as a reference configuration, each frame which consists of two fields being taken into consideration in the field pair configuration, while setting each of these fields as a picture which is a coding unit. An example of the field pair configuration using a bidirectional prediction is shown in FIG. 33. In this example, when a top field shown by a gray box having a number of 32 in the display order of FIG. 33 (a number of 18 in the decoding (encoding) order) is tried to be set as a picture which can be accessed randomly, because a part of pictures which are leading pictures refers to both the top field having a number of 32 in the display order and the bottom field having a number of 33 in the display order, the decoding order must be the one in which immediately after the top field having a number of 32 in the display order is decoded, the bottom field having a number of 33 in the display order which is a trailing picture is decoded and, after that, leading pictures are decoded. However, according to the definition described in nonpatent reference 1 and indicating that leading pictures must be decoded (encoded) ahead of trailing pictures, the top field having a number of 32 in the display order cannot be set as a CRA picture. In other words, because immediately after the top field having a number of 32 in the set display order is decoded as a CRA picture, the bottom field having a number of 33 in the display order which is a trailing picture cannot be decoded when the decoding is performed according to the definition described in nonpatent reference 1 and indicating that leading pictures must be decoded (encoded) ahead of trailing pictures, the reference configuration of FIG. 33 cannot be provided. Therefore, when it is going to implement random access using a CRA picture within the limits of the definition described in nonpatent reference 1, for example, the reference configuration is changed to the one in which each leading picture does not refer to the bottom field having a number of 33 in the display order while it is necessary to modify the configuration in such a way that the bottom field having a number of 33 in the display order is decoded after the leading pictures are decoded, and define the bottom field having a number of 33 in the display order as a CRA picture. A problem with the former case is therefore that because the reference picture of each leading picture is limited as compared with the reference configuration of FIG. 33, the prediction efficiency degrades. In the latter case, when performing a playback from the start of the encoded bitstream, the video is played back from the top field, and when performing a playback from some midpoint in the encoded bitstream, the video is played back from the bottom field. More specifically, a problem is that the decoding cannot be performed at all times from the same field irrespective of the decoding start position of the encoded bitstream, and the display device is required to be ready for such a playback and therefore the display process becomes complicated.

The present invention is made in order to solve the above-mentioned problems, and it is therefore an object of the present invention to provide an image encoding device, an image encoding method, an image decoding device, and an image decoding method that make it possible to generate and encode an encoded bitstream which can be played back at all times from the same field irrespective of the decoding start position of the encoded bitstream also in the field pair encoding of an interlaced video.

Means for Solving the Problems

In accordance with the present invention, there is provided an image encoding device that encodes each field as a picture, each frame consisting of two fields: a first field and a second field, the image encoding device including: an encoder that encodes a first field of a specific frame as an intra picture which is predicted by using only an intra prediction, and that encodes the first field of the above-described specific frame, the second field of the above-described specific frame, a picture whose encoding order is later than that of the first field of the above-described specific frame later and whose display order is earlier than that of the first field, and another picture whose encoding order and also display order are later than those of the first field of the above-described specific frame in order of those pictures; and a multiplexer that multiplexes information showing that the first field of the above-described specific frame is a picture, in a bitstream, at which decoding can be started into the above-described bitstream.

Advantages of the Invention

In accordance with the present invention, because the image encoding device is configured in such a way as to generate an encoded bitstream which can be correctly played back from the same field at all times irrespective of the decoding start position of the encoded bitstream also in the field pair encoding of an interlaced video, a display device that displays the decoded image has only to be configured in such a way as to always display the same field first irrespective of the decoding start position of the encoded bitstream also in the field pair encoding of an interlaced video, and there is provided an advantage of being able to easily perform the display process.

BRIEF DESCRIPTION OF THE FIGURES

FIG. 22 is an explanatory drawing showing a transformation block size at the time of performing a compression process on the luminance signal and the color difference signals in a signal in the YUV4:2:4 format;

FIG. 23 is an explanatory drawing showing an example of a correspondence between an intra prediction parameter and a color difference intra prediction mode of the color difference signals;

FIG. 24 is an explanatory drawing showing an example of the correspondence between the intra prediction parameter and the color difference intra prediction mode of the color difference signals when not using an LM mode;

FIG. 29 is an explanatory drawing showing a prediction direction vector for the directional prediction in a signal in the YUV4:2:2 format;

FIG. 30 is an explanatory drawing showing a relation between the directional prediction and an angle;

FIG. 31 is an explanatory drawing showing a relation between an intra prediction mode index of the luminance signal and an intra prediction mode index of the color difference signals in a signal in the YUV4:2:2 format;

FIG. 32 is an explanatory drawing showing a relation between the intra prediction mode index and tanθ;

FIG. 38 is an explanatory drawing showing a syntax of Recovery Point SEI Message.

EMBODIMENTS OF THE INVENTION

Embodiment 1

Figure 1:
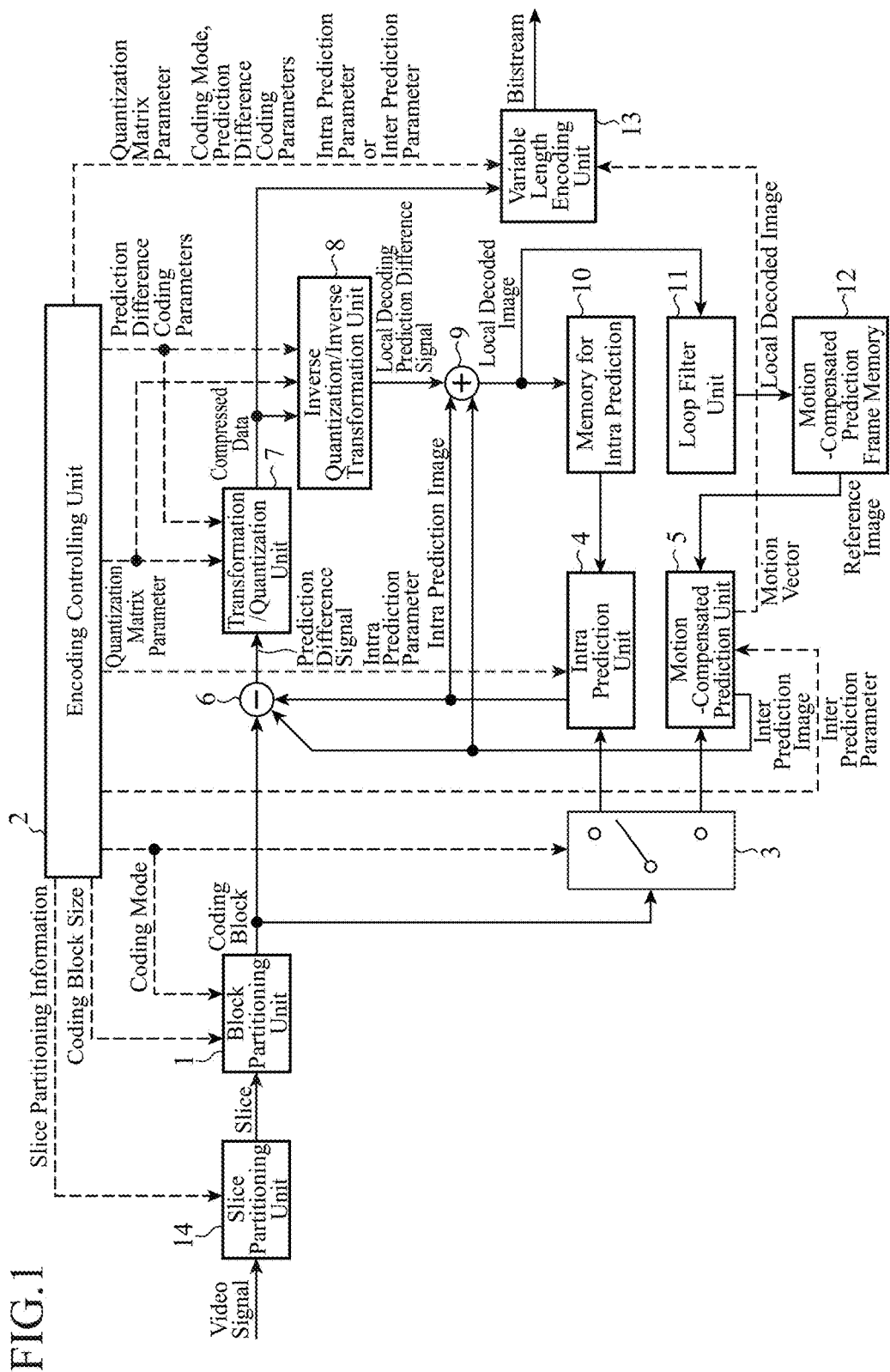
FIG. 1 is a block diagram showing an image encoding device in accordance with Embodiment 1 of the present invention.

FIG. 1 is a block diagram showing an image encoding device in accordance with Embodiment 1 of the present invention.

A video signal to be processed by the image encoding device in accordance with this Embodiment 1 is an arbitrary video signal in which each video frame consists of a series of digital samples (pixels) in two dimensions, horizontal and vertical, including a color video signal in arbitrary color space, such as a YUV signal which consists of a luminance signal and two color difference signals and an RGB signal outputted from a digital image sensor, a monochrome image signal, an infrared image signal, and so on.

The gradation of each pixel can be an 8-bit, 10-bit, or 12-bit one.

As a matter of course, the input signal can be a still image signal, instead of a video signal, because the still image signal can be assumed to be a video signal which consists of only a single frame.

In the following explanation, for the sake of convenience, the inputted video signal is assumed to be, unless otherwise specified, a signal having a YUV4:2:0 format in which the two color difference components U and V are subsampled by a factor of two both in the vertical and horizontal directions with respect to the luminance component Y, a signal having a YUV4:2:2 format in which the two color difference components U and V are subsampled by a factor of two in the horizontal direction with respect to the luminance component Y, or a signal having a YUV4:4:4 format in which the two color difference components U and V have the same number of samples as the luminance component Y. Further, as to a signal having an RGB4:4:4 format which consists of trichromatic signals of red (R), green (G) and blue (B), each of the signals is assumed to be a signal having the YUV4:4:4 format, and the same encoding as that on the YUV4:4:4 format is performed on the signal. However, how each signal (RGB) having the RGB4:4:4 format is brought into correspondence with each signal (YUV) having the YUV4:4:4 format is not limited (can be set arbitrarily). Further, in the case of a YUV4:4:4 format signal or an RGB4:4:4 format signal, each signal can be assumed to be a monochrome image signal, and monochrome (YUV4:0:0) encoding can be performed independently on each signal to generate a bitstream. By doing in this way, the encoding process can be performed on the signals in parallel.

A data unit to be processed which corresponds to each frame of the video is referred to as a "picture", and an explanation will be made in this Embodiment 1 by assuming that a "picture" is a signal of an image frame on which progressive scanning is performed. However, when the video signal is an interlaced signal, a "picture" can be a field image signal which is a unit which constructs an image frame.

Referring to FIG. 1, a slice partitioning unit 14 performs a process of, when receiving a video signal as an inputted image, partitioning the inputted image into one or more part images, which are called "slices", according to slice partitioning information determined by an encoding controlling unit 2. Each slice partitioned can be partitioned into up to coding blocks which will be mentioned below.

A block partitioning unit 1 performs a process of, every time when receiving a slice partitioned by the slice partitioning unit 14, partitioning the slice into largest coding blocks each of which is a coding block having a largest size determined by the encoding controlling unit 2, and further partitioning each of the largest coding blocks into coding blocks hierarchically until the number of hierarchical layers reaches an upper limit determined by the encoding controlling unit 2.

More specifically, the block partitioning unit 1 performs a process of partitioning the slice into coding blocks according to partition determined by the encoding controlling unit 2, and outputting the coding blocks. Each of the coding blocks is further partitioned into one or more prediction blocks each of which serves as a unit for prediction process.

The encoding controlling unit 2 performs a process of determining the largest size of the coding blocks serving as units to be processed when an encoding process is performed, and also determining the size of each coding block by determining the upper limit on the number of hierarchical layers at the time when each coding block having the largest size is hierarchically partitioned.

The encoding controlling unit 2 also performs a process of selecting a coding mode which is applied to a coding block outputted from the block partitioning unit 1, from among one or more selectable coding modes (one or more intra coding modes in which the size or the like of a prediction block which represents a unit for prediction process differs and one or more inter coding modes in which the size or the like of a prediction block differs). As an example of selecting methods, there is a method of selecting a coding mode which provides the highest degree of coding efficiency for a coding block outputted from the block partitioning unit 1, from among the one or more selectable coding modes.

The encoding controlling unit 2 also performs a process of, when a coding mode having the highest degree of coding efficiency is an intra coding mode, determining an intra prediction parameter to be used when performing an intra prediction process on a coding block in the intra coding mode, for each prediction block which is a unit for prediction process shown by the above-described intra coding mode, and, when the coding mode having the highest degree of coding efficiency is an inter coding mode, determining an inter prediction parameter to be used when performing an inter prediction process on a coding block in the inter coding mode, for each prediction block which is a unit for prediction process shown by the above-described inter coding mode.

The encoding controlling unit 2 further performs a process of determining prediction difference coding parameters to be provided to a transformation/quantization unit 7 and an inverse quantization/inverse transformation unit 8. The prediction difference coding parameters include transformation block partitioning information showing partitioning information about transformation blocks each serving as a unit for orthogonal transformation process on a coding block and a quantization parameter defining a quantization step size at the time when performing quantization on transform coefficients, etc.

Figure 20:
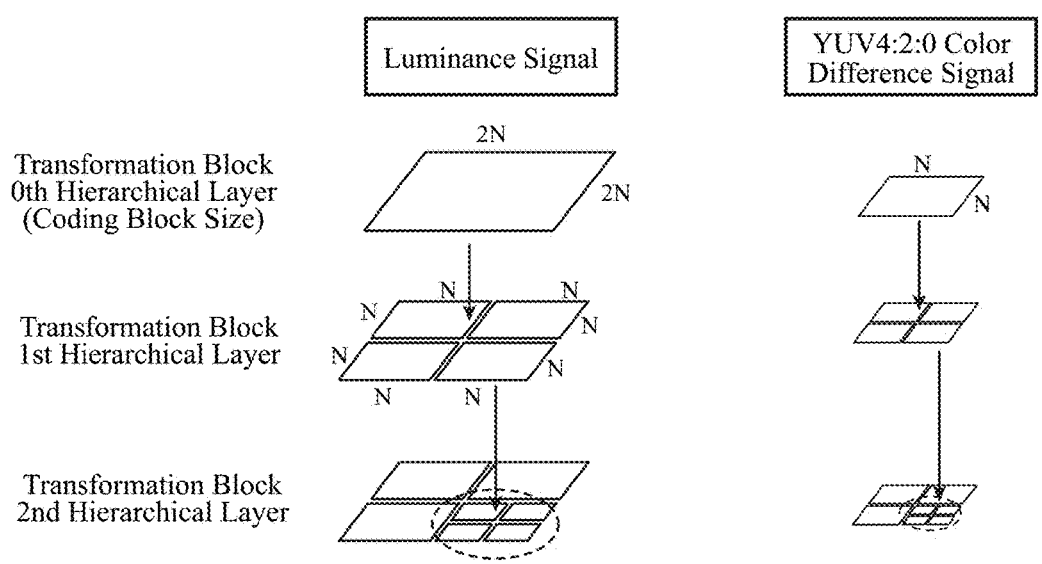
FIG. 20 is an explanatory drawing showing a transformation block size at the time of performing a compression process on the luminance signal and the color difference signals in a signal in the YUV4:2:0 format.

FIG. 20 is an explanatory drawing showing transformation block sizes at the time of performing a compression process (a transformation process and a quantization process) on the luminance signal and the color difference signals in a signal having the YUV4:2:0 format.

The transformation block sizes are determined by hierarchically partitioning each coding block into blocks in quadtree form, as shown in FIG. 20.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured, as shown in, for example, FIG. 20, in such a way that each coding block is hierarchically partitioned into one or more square transformation blocks.

The color difference signals are configured, as shown in FIG. 20, in such a way that when the input signal format is the YUV4:2:0 signal format, each coding block is hierarchically partitioned into one or more square transformation blocks, like the luminance signal.

In this case, the transformation block size of the color difference signals is half of that of the corresponding block of the luminance signal both in the vertical and horizontal directions.

Figure 21:
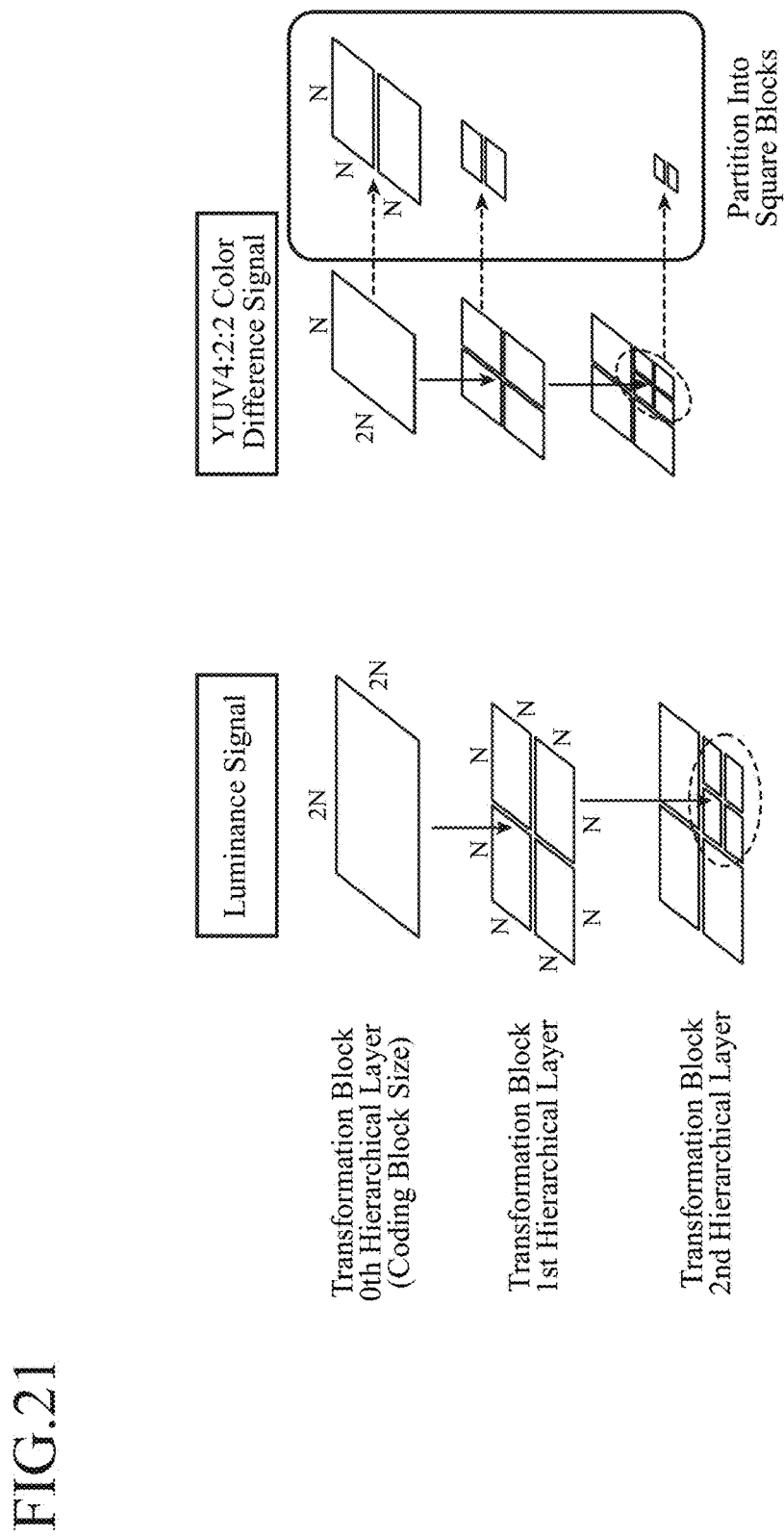
FIG. 21 is an explanatory drawing showing a transformation block size at the time of performing a compression process on the luminance signal and the color difference signals in a signal in the YUV4:2:2 format.
Figure 25:
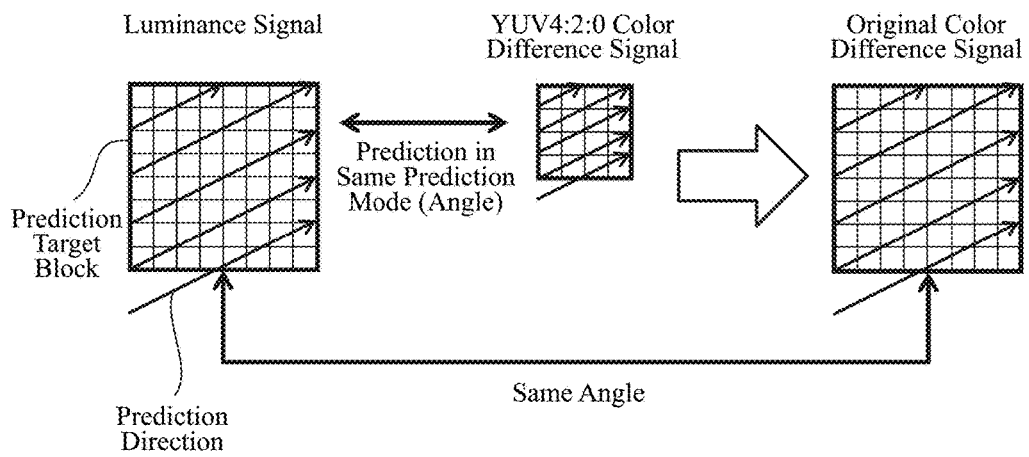
FIG. 25 is an explanatory drawing showing a case of using the same directional prediction for the luminance signal and the color difference signals in a signal in the YUV4:2:0 format.
Figure 26:
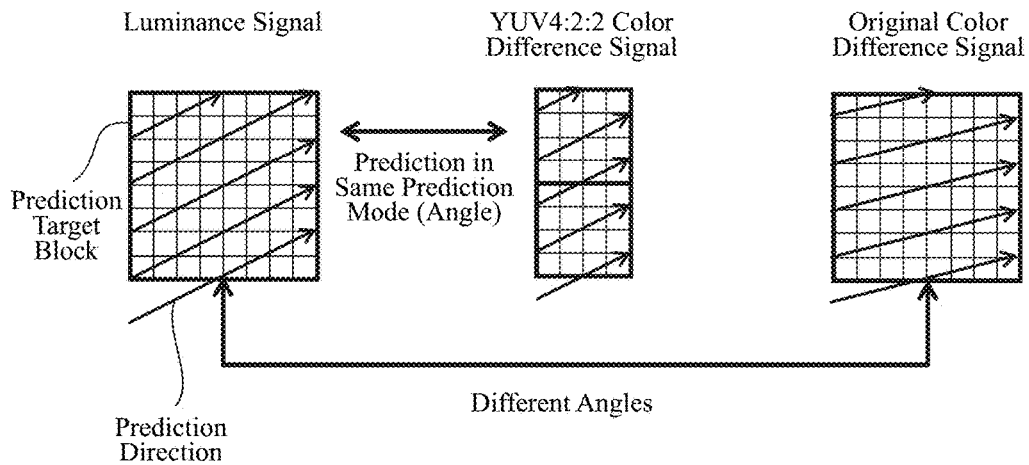
FIG. 26 is an explanatory drawing showing a case of using the same directional prediction for the luminance signal and the color difference signals in a signal in the YUV4:2:2 format.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by partitioning each partitioned block into two blocks in the vertical direction, each partitioned block is made to consist of two transformation blocks having the same block size as that of the color difference signals in a YUV4:2:0 signal (a size which is half of the size both in the vertical and horizontal directions of the transformation block of the luminance signal).

Further, when the input signal format is the YUV4:4:4 signal format, as shown in FIG. 22, the same partitioning as that on the transformation blocks of the luminance signal is always performed on the transformation blocks of the color difference signals in such a way that the transformation blocks are configured to have the same size.

Information about the partitioning of the luminance signal into the transformation blocks is outputted to the variable length encoding unit 13 as, for example, a transformation block partitioning flag showing whether or not to perform partitioning for each hierarchical layer.

A select switch 3 performs a process of, when the coding mode determined by the encoding controlling unit 2 is an intra coding mode, outputting the coding block outputted from the block partitioning unit 1 to an intra prediction unit 4, and, when the coding mode determined by the encoding controlling unit 2 is an inter coding mode, outputting the coding block outputted from the block partitioning unit 1 to a motion-compensated prediction unit 5.

The intra prediction unit 4 performs, when an intra coding mode is selected, as the coding mode associated with the coding block outputted from the select switch 3, by the encoding controlling unit 2, an intra prediction process (intra-frame prediction process) using the intra prediction parameter determined by the encoding controlling unit 2 while referring to a local decoded image stored in a memory 10 for intra prediction, and then performs a process of generating an intra prediction image. The intra prediction unit 4 constructs an intra predictor.

More specifically, as to the luminance signal, the intra prediction unit 4 performs the intra prediction process (intra-frame prediction process) using the intra prediction parameter of the luminance signal, and generates a prediction image of the luminance signal.

On the other hand, as to the color difference signals, when the intra prediction parameter of the color difference signals shows that the same prediction mode as the intra prediction mode for the luminance signal is used (when the intra prediction parameter shows an intra prediction mode common between the luminance and the color differences (DM mode)), the intra prediction unit performs the same intra-frame prediction as that on the luminance signal, and generates prediction images of the color difference signals.

Further, when the intra prediction parameter of the color difference signals shows a vertical prediction mode or a horizontal prediction mode, the intra prediction unit performs a directional prediction on the color difference signals, and generates prediction images of the color difference signals.

Further, when the intra prediction parameter of the color difference signals shows a color difference signal prediction mode using a luminance correlation (LM mode), the intra prediction unit calculates a correlation parameter showing a correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the blocks of the color difference signals which are the target for prediction process.

The intra prediction unit can be configured to, when the input signal format is the YUV4:4:4 signal format, perform a process in either the above-described DM mode or the above-described LM mode, and prevent itself from selecting another prediction mode.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Figure 27:
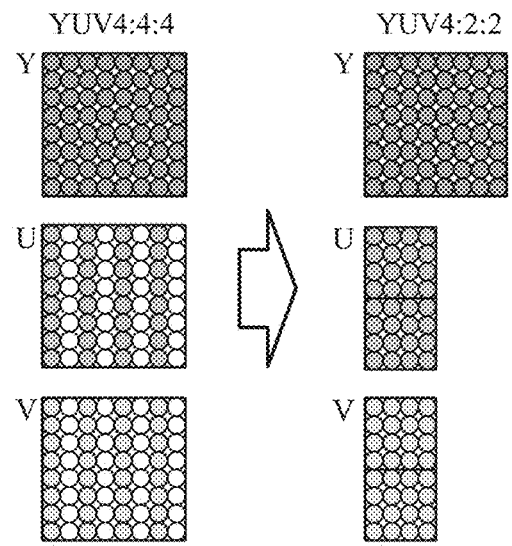
FIG. 27 is an explanatory drawing showing a relation between the YUV4:4:4 format and the YUV4:2:2 format.
Figure 28:
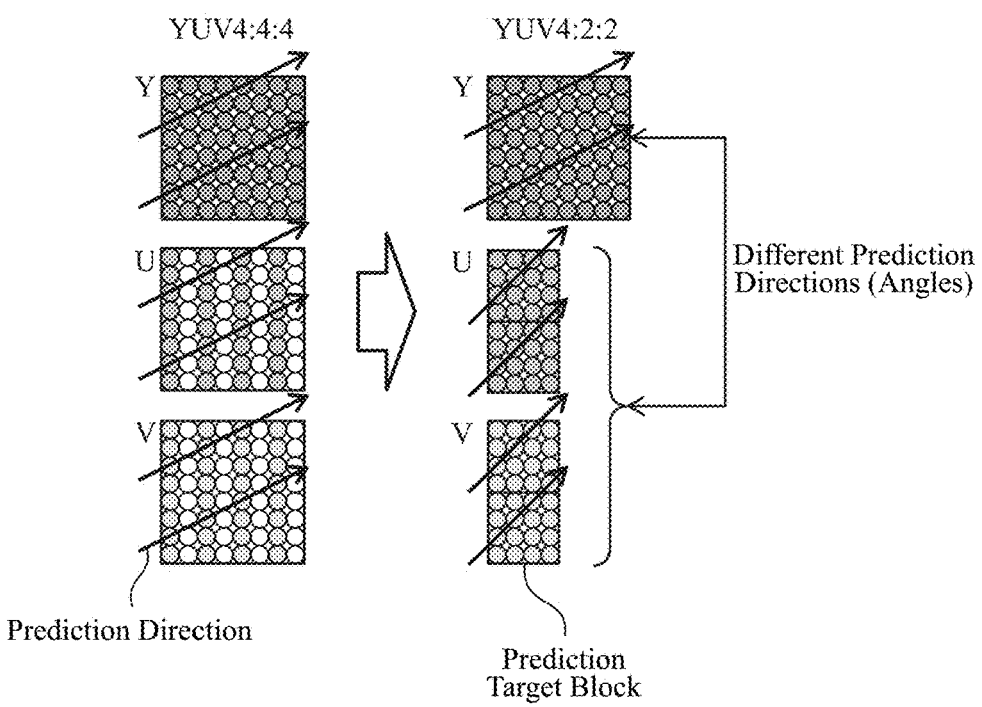
FIG. 28 is an explanatory drawing showing an example of a directional prediction in the YUV4:2:2 format which is equivalent to the use of the same directional prediction for the luminance signal and the color difference signals in a signal in the YUV4:4:4 format.

Further, when the input signal format is the YUV4:2:2 signal format, if the luminance signal is a square block, as shown in FIG. 27, each of the color difference signals is a rectangular block in which the number of pixels in the horizontal direction is half as compared with that of the luminance signal. Therefore, in order to apply a prediction in the same direction to the luminance signal and the color difference signals when a YUV4:4:4 signal is converted into a YUV4:2:2 signal, as shown in FIG. 28, the prediction direction of the color difference signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the color difference signals is expressed by $v_C=(dx_L/2, dy_L)$. More specifically, when the angle of the prediction direction is expressed by theta, as shown in FIG. 30, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the color difference signals is expressed by $\theta_C$.

Therefore, in order to make it possible to correctly perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals in the intra prediction mode corresponding to the converted index. Concretely, the intra prediction unit can be configured to convert the index by preparing a conversion table for the index and referring to the conversion table, or a conversion equation can be prepared in advance and the intra prediction unit can be configured to convert the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

The motion-compensated prediction unit 5 performs, when an inter coding mode is selected, as the coding mode associated with the coding block outputted from the select switch 3, by the encoding controlling unit 2, a process of comparing the coding block with one or more frames of local decoded images stored in a motion-compensated prediction frame memory 12 to search for a motion vector, performing an inter prediction process (motion-compensated prediction process) by using the motion vector and the inter prediction parameter, such as a frame number to be referred to, which is determined by the encoding controlling unit 2, and generating an inter prediction image.

A subtracting unit 6 performs a process of subtracting the intra prediction image generated by the intra prediction unit 4 or the inter prediction image generated by the motion-compensated prediction unit 5 from the coding block outputted from the block partitioning unit 1, and outputting a prediction difference signal showing a difference image which is the result of the subtraction to the transformation/quantization unit 7.

The transformation/quantization unit 7 refers to the transformation block partitioning information included in the prediction difference coding parameters determined by the encoding controlling unit 2 and performs an orthogonal transformation process (e.g., orthogonal transformation process, such as DCT (discrete cosine transform), DST (discrete sine transform), and KL transform in which bases are designed for specific learning sequence in advance) on the prediction difference signal outputted from the subtracting unit 6 on a per transformation block basis to calculate transform coefficients, and also refers to the quantization parameter included in the prediction difference coding parameters and performs a process of quantizing the transform coefficients of each transformation block and then outputting compressed data which are the transform coefficients quantized thereby to the inverse quantization/inverse transformation unit 8 and the variable length encoding unit 13.

When quantizing the transform coefficients, the transformation/quantization unit 7 can perform a process of quantizing the transform coefficients by using a quantization matrix for scaling, for each of the transform coefficients, the quantization step size calculated from the above-described quantization parameter.

Figures 9, 10:
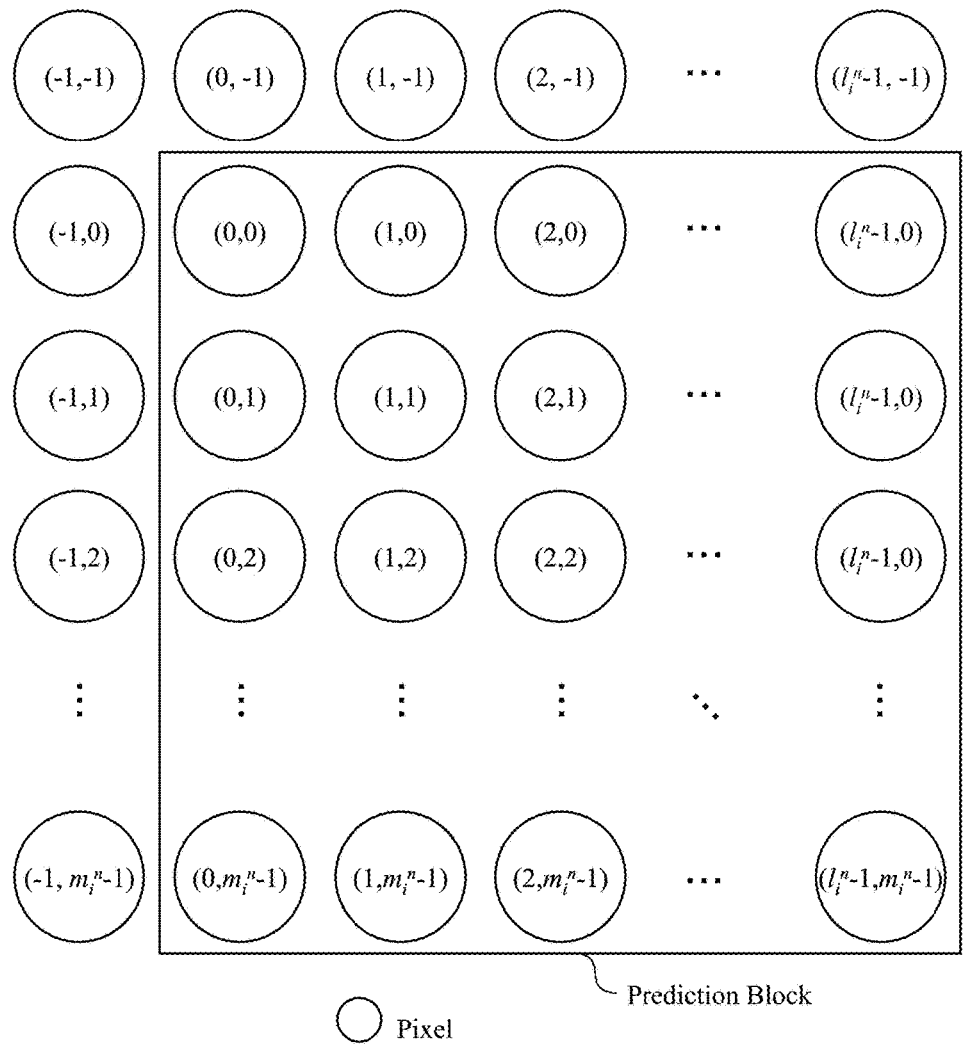
FIG. 9 is an explanatory drawing showing relative coordinates of each pixel in the prediction image generation block which are determined with the pixel at the upper left corner of the prediction image generation block being defined as the point of origin.
FIG. 10 is an explanatory drawing showing an example of a quantization matrix.

FIG. 10 is an explanatory drawing showing an example of the quantization matrix of a 4×4 DCT.

Numerals shown in the figure express scaling values for the quantization stepsizes of the transform coefficients.

For example, in order to suppress the coding bit rate, by performing the scaling in such a way that a transform coefficient in a higher frequency band has a larger quantization stepsize, as shown in FIG. 10, while transform coefficients in a high frequency band which occur in a complicated image area or the like are reduced, thereby suppressing the code amount, the encoding can be performed without reducing information about coefficients in a low frequency band which exert a great influence upon the subjective quality.

Thus, when it is desired that the quantization stepsize for each transform coefficient is controlled, what is necessary is just to use a quantization matrix.

Further, as the quantization matrix, a matrix which is independent for each chrominance signal and for each coding mode (intra coding or inter coding) at each orthogonal transformation size can be used, and either the selection of a quantization matrix from a quantization matrix which is prepared, as an initial value, in advance and in common between the image encoding device and the image decoding device and an already-encoded quantization matrix or the use of a new quantization matrix can be selected.

Thus, the transformation/quantization unit 7 sets, to a quantization matrix parameter to be encoded, flag information showing whether or not to use a new quantization matrix for each chrominance signal and for each coding mode at each orthogonal transformation size.

In addition, when a new quantization matrix is used, each of the scaling values in the quantization matrix as shown in FIG. 10 is set to the quantization matrix parameter to be encoded.

In contrast, when a new quantization matrix is not used, an index specifying a matrix to be used from a quantization matrix which is prepared, as an initial value, in advance and in common between the image encoding device and the image decoding device and an already-encoded quantization matrix is set to the quantization matrix parameter to be encoded. However, when no already-encoded quantization matrix which can be referred to exists, only a quantization matrix prepared in advance and in common between the image encoding device and the image decoding device can be selected.

The inverse quantization/inverse transformation unit 8 refers to the quantization parameter and the transformation block partitioning information included in the prediction difference coding parameters determined by the encoding controlling unit 2 and inverse-quantizes the compressed data outputted from the transformation/quantization unit 7 on a per transformation block basis, and also performs an inverse orthogonal transformation process on the transform coefficients which are the compressed data inverse-quantized thereby and performs a process of calculating a local decoding prediction difference signal corresponding to the prediction difference signal outputted from the subtracting unit 6. When the transformation/quantization unit 7 performs a quantization process by using a quantization matrix, the quantization matrix is referred to and a corresponding inverse quantization process is performed also in the inverse quantization process.

An adding unit 9 performs a process of adding the local decoding prediction difference signal calculated by the inverse quantization/inverse transformation unit 8 and the intra prediction image generated by the intra prediction unit 4 or the inter prediction image generated by the motion-compensated prediction unit 5, to calculate a local decoded image corresponding to the coding block outputted from the block partitioning unit 1.

The memory 10 for intra prediction is a recording medium for storing the local decoded image calculated by the adding unit 9.

A loop filter unit 11 performs a predetermined filtering process on the local decoded image calculated by the adding unit 9, and performs a process of outputting the local decoded image filtering-processed thereby.

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing the filtering process, and so on.

Figure 11:
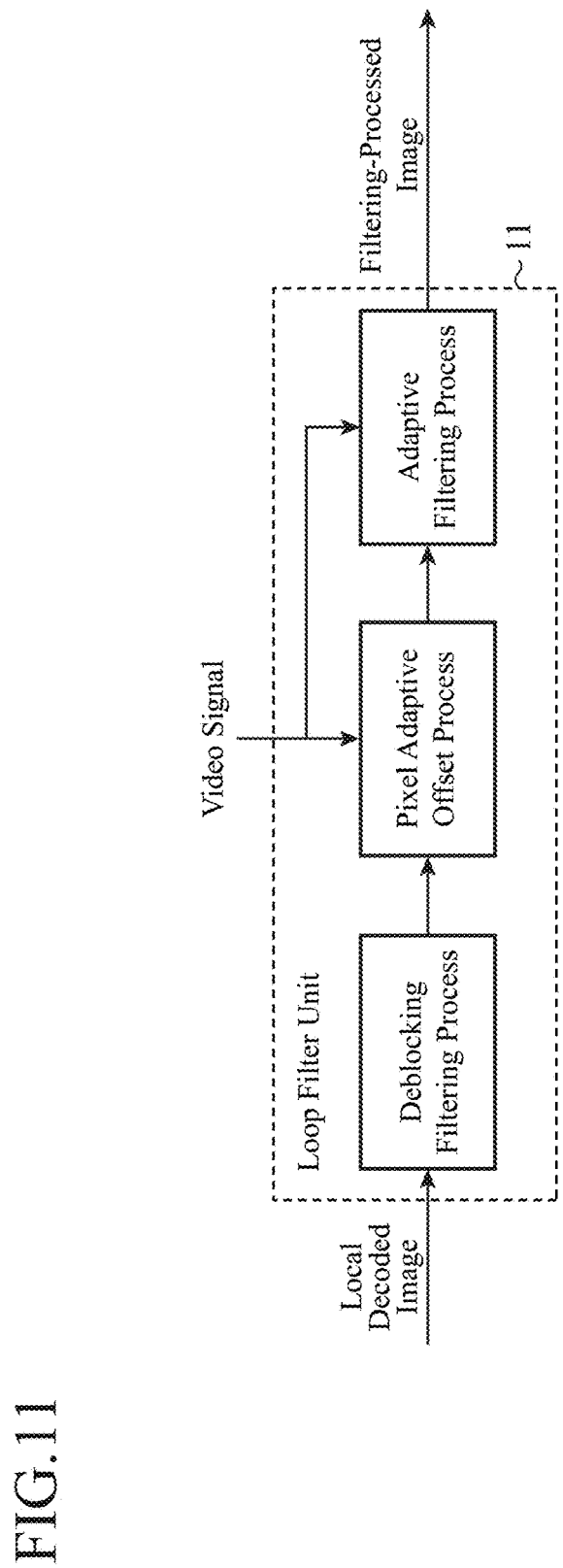
FIG. 11 is an explanatory drawing showing an example of a configuration of using a plurality of loop filtering processes in a loop filter unit of the image encoding device in accordance with Embodiment 1 of the present invention.

The loop filter unit 11 determines whether or not to perform the process for each of the above-described processes including the deblocking filtering process, the pixel adaptive offset process, and the adaptive filtering process, and outputs an enable flag of each of the processes, as header information, to the variable length encoding unit 13. When a plurality of filtering processes as described above are used, the filtering processes are performed sequentially. FIG. 11 shows an example of the configuration of the loop filter unit 11 in the case of using a plurality of filtering processes.

In general, while the image quality improves with the increase in the number of types of filtering processes to be used, the processing load increases. More specifically, there is a trade-off between the image quality and the processing load. Also, the image quality improving effect of each filtering process differs depending upon the characteristics of the image which is the target for filtering process. Thus, the filtering processes to be used can be determined according to the processing load acceptable to the image encoding device and the characteristics of images subjected to the encoding process. For example, when there is a demand to reduce the frequency with which the process cannot be performed rather than to provide the configuration shown in FIG. 11, there can be considered an example in which the loop filter unit is configured with only the deblocking filtering process and the pixel adaptive offset process.

In the deblocking filtering process, various parameters to be used for selecting the intensity of the filter applied to a block boundary can be changed from initial values. When changing a parameter, the parameter is outputted to the variable length encoding unit 13 as header information.

In the pixel adaptive offset process, an image is partitioned into a plurality of blocks first. A case of not performing the offset process is defined as one class classifying method, and one class classifying method is selected, for each of the blocks, from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset to the luminance value of the local decoded image is performed, thereby improving the image quality of the local decoded image.

Therefore, in the pixel adaptive offset process, the block partitioning information, an index indicating the class classifying method selected for each block, and offset information specifying the offset value calculated for each class on a per block basis are outputted to the variable length encoding unit 13 as header information.

In the pixel adaptive offset process, the image can be always partitioned into fixed size blocks, e.g., largest coding blocks, a class classifying method can be selected for each of the blocks, and an adaptive offset process for each of the classes can be performed. In this case, the need for the above-described block partitioning information can be eliminated, the code amount can be reduced by the code amount required for the block partitioning information, and the coding efficiency can be improved.

In the adaptive filtering process, the local decoded image is class classified by using a predetermined method, a filter for compensating for a distortion piggybacked thereonto is designed for a region (local decoded image) belonging to each of classes, and a filtering process is performed on the local decoded image by using the filter.

The filter designed for each class is then outputted to the variable length encoding unit 13 as header information.

As the class classifying method, there are a simplified method of spatially separating the image at equal intervals, and a method of making a classification on a per block basis according to the local characteristics (variance, etc.) of the image.

Further, the number of classes used in the adaptive filtering process can be set in advance as a value common between the image encoding device and the image decoding device, or can be a parameter to be encoded.

In comparison with the former, the latter can freely set the number of classes to be used, thereby increasing the image quality improving effect. On the other hand, since the latter encodes the number of classes, the code amount increases by an amount needed for the encoding.

Because the video signal needs to be referred to by the loop filter unit 11, as shown in FIG. 11, when performing the pixel adaptive offset process and the adaptive filtering process, the image encoding device shown in FIG. 1 needs to be modified in such a way that the video signal is inputted to the loop filter unit 11.

The motion-compensated prediction frame memory 12 is a recording medium for storing the local decoded image on which the filtering process is performed by the loop filter unit 11.

The variable length encoding unit 13 variable-length-encodes the compressed data outputted from the transformation/quantization unit 7, the output signal from the encoding controlling unit 2 (the block partitioning information about the inside of each largest coding block, the coding mode, the prediction difference coding parameters, and the intra prediction parameter or the inter prediction parameter), and the motion vector outputted from the motion-compensated prediction unit 5 (when the coding mode is an inter coding mode), to generate encoded data.

Figures 13, 14:
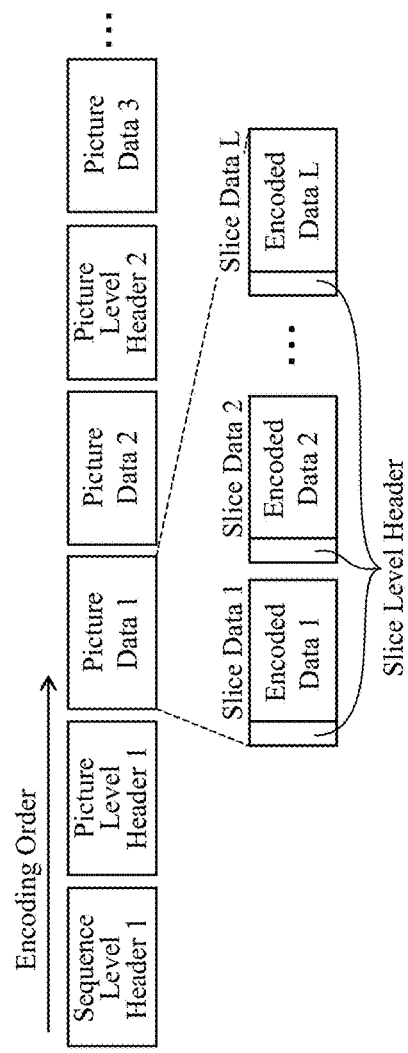
FIG. 13 is an explanatory drawing showing an example of an encoded bitstream.
FIG. 14 is an explanatory drawing showing indexes indicating class classifying methods for use in the pixel adaptive offset process.

The variable length encoding unit 13 also encodes sequence level headers and picture level headers, as the header information of an encoded bitstream, as illustrated in FIG. 13, and generates an encoded bitstream as well as picture data.

The picture data is configured with one or more pieces of slice data, and each slice data is acquired by aggregating the slice level header and the above-described encoded data contained in the slice.

The sequence level header is acquired by aggregating pieces of header information which are generally common on a per sequence basis and which include the image size, the chrominance signal format, the bit depth of the signal values of the luminance signal and the color difference signals, the enable flag information of each filtering process (adaptive filtering process, pixel adaptive offset process, and deblocking filtering process) in the loop filter unit 11 on a per sequence basis, and the enable flag information of the quantization matrix.

A picture level header is a combination of pieces of header information which are set on a per picture basis and which include an index of a sequence level header to be referred to, the number of reference pictures at the time of motion compensation, and a probability table initialization flag for entropy encoding, the quantization matrix parameter.

A slice level header is a combination of parameters which are set on a per slice basis and which include position information showing at which position of the picture the slice currently being processed exists, an index indicating which picture level header is to be referred to, the encoding type of the slice (all intra encoding, inter encoding, or the like), and the flag information showing whether or not to perform each of the filtering processes in the loop filter unit 11 (the adaptive filtering process, the pixel adaptive offset process, and the deblocking filtering process).

Figure 33:
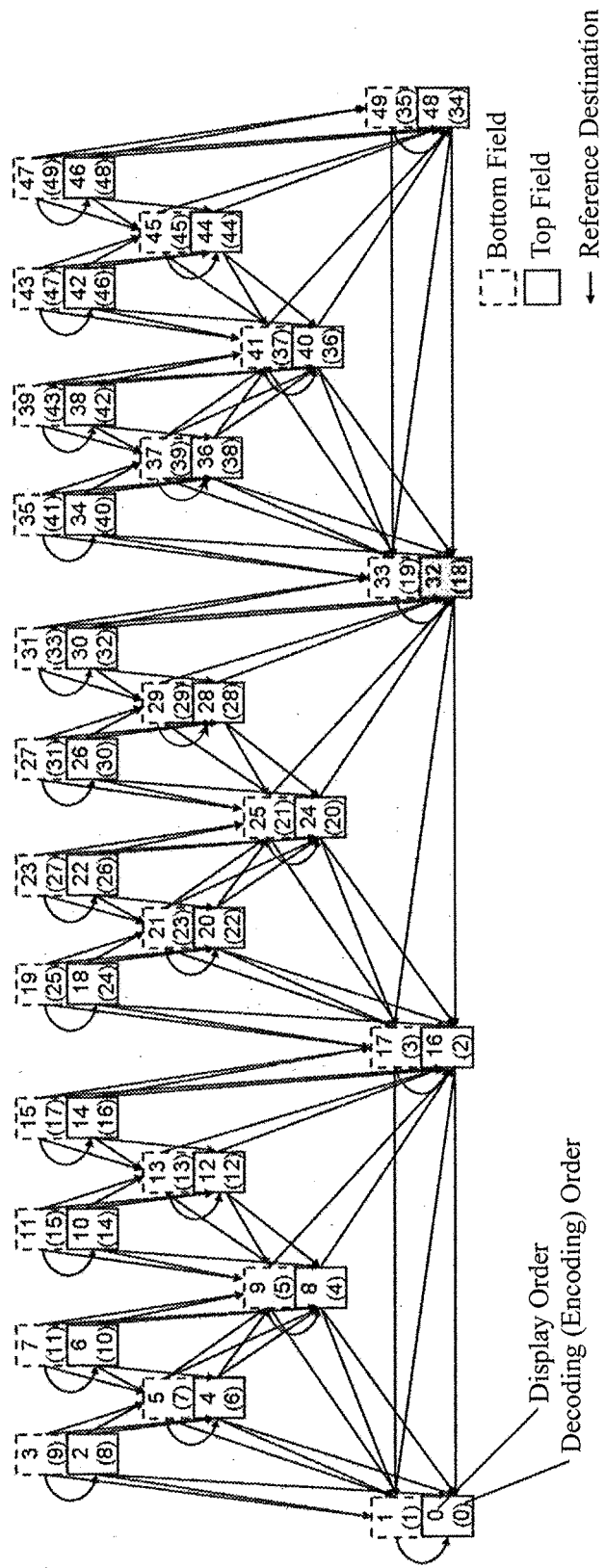
FIG. 33 is an explanatory drawing showing an example of an encoding configuration using a bidirectional prediction in field pair encoding of an interlaced signal.

When the input signal is an interlaced video signal and an encoding configuration shown in FIG. 33 is provided, by setting the top field shown by a gray box having a number of 32 in the display order of FIG. 33 (a number of 18 in the decoding (encoding) order) to be a picture which can be accessed randomly, an encoded bitstream which can be correctly played back from the top field at all times irrespective of the decoding start position of the encoded bitstream can be generated.

However, it is defined in nonpatent reference 1 that a leading picture must be decoded (encoded) ahead of trailing pictures, and hence the top field shown by the gray box having a number of 32 in the display order of FIG. 33 cannot be encoded as a picture, such as a CRA picture, which is defined in nonpatent reference 1 and which enables random access (Intra Random Access Point (IRAP) picture described in nonpatent reference 1). Hereafter, a method of setting the top field shown by the gray box having a number of 32 in the display order of FIG. 33 as a picture which can be accessed randomly while complying with the specifications described in nonpatent reference 1 will be explained below.

Concretely, the top field shown by the gray box having a number of 32 in the display order is set to be a non-IRAP picture, and is encoded only by using an intra prediction. Then, as additional information of the encoded bitstream, such as Supplemental Enhancement Information (SEI) described in, for example, nonpatent reference 1, information showing that the top field shown by the gray box having a number of 32 in the display order of FIG. 33 is a random access point is encoded. For example, by using Recovery Point SEI Message having pieces of syntax shown in FIG. 38 which is a kind of the SEI described in nonpatent reference 1, the top field shown by the gray box having a number of 32 in the display order of FIG. 33 is set to be a picture at a recovery point (recovery_poc_cnt). Further, it is assumed that at that time a picture whose encoding (decoding) order and also display order are later than those of the above-described recovery point picture (the top field shown by the gray box having a number of 32 in the display order) is prohibited from making a prediction reference to a picture whose display order is earlier than that of the above-described recovery point picture, like in the case of the restriction imposed on trailing pictures. However, because the above-described recovery point picture is a non-IRAP picture, even under conformity with the specifications described in nonpatent reference 1, there is no restriction that, as a relation between leading pictures and trailing pictures, a leading picture must be decoded (encoded) ahead of trailing pictures. Therefore, after the bottom field having a number of 33 in the display order, the bottom field corresponding to a trailing picture, is encoded immediately after the top field having a number of 32 in the display order is encoded, a picture whose encoding (decoding) order is later than that of the above-described recovery point picture corresponding to a leading picture, but whose display order is earlier than that of the recovery point picture can be encoded. More specifically, such a picture can be encoded in the encoding (decoding) order as shown in FIG. 33. By doing in this way, without using a CRA picture, a leading picture, and a trailing picture, an encoded bitstream which can be correctly played back from a top field at all times irrespective of the decoding start position of the encoded bitstream can be generated in the field pair configuration using a bidirectional prediction as shown in FIG. 33.

Hereafter, an example of a concrete method of using Recovery Point SEI Message will be described. First, Recovery Point SEI Message is provided as a higher-level header of a picture which is desired to be able to be accessed randomly (the top field shown by the gray box having a number of 32 in the display order of FIG. 33). More specifically, the above-described SEI is provided for the inside of an access unit of the above-described picture which is desired to be able to be accessed randomly. The access unit is a unit for data access including the encoded data about one picture, which is defined in nonpatent reference 1. In addition, as to the provided Recovery Point SEI Message, the values of the pieces of syntax shown in FIG. 38 are provided as follows.

recovery_poc_cnt=0
exact_match_flag=1
broken_link_flag=0

In this case, recovery_poc_cnt being 0 shows that the picture of the access unit for which this SEI is provided is a recovery point picture, and exact_match_flag being 1 shows that when performing the decoding from the recovery point, a picture whose display order is later than that of the recovery point picture can be decoded correctly. As a result, it is shown that the picture of the access unit for which this SEI is provided is a recovery point picture which can be accessed randomly. Further, because a picture whose encoding (decoding) order is later than that of the recovery point picture can be decoded correctly when the decoding is started from an IRAP picture existing ahead of the recovery point, broken_link_flag is set to zero (when this flag is 1, it is shown that such a picture cannot be decoded correctly, whereas when this flag is 0, it is shown that nothing definite is said about what may happen).

In addition, when providing Buffering period SEI message, as SEI, for the inside of the access unit of each IRAP picture as buffer management information, Buffering period SEI message is also provided for the inside of the access unit of the recovery point picture, as well as for the inside of the access unit of each IRAP picture. By doing in this way, the same buffer management as that in the case of an IRAP picture can be performed.

Although the case of setting the information that a top field is a random access point to SEI is explained in the explanation of FIG. 38, this embodiment is not limited to this example as long as the information can be set to a higher-level header. Concretely, there are a method of defining, as a new picture type belonging to IRAP pictures, a special IRAP picture which makes it possible to encode only one continuous trailing picture ahead of leading pictures, and encoding the top field having a number of 32 in the display order by using the new IRAP picture, and a method of newly defining a special trailing picture which can be encoded ahead of leading pictures, and encoding, as an IRAP picture such as a CRA picture, the top field having a number of 32 in the display order and also encoding, as the special trailing picture as defined above, the bottom field having a number of 33 in the display order. Further, units that perform the above-described encoding process and the above-described multiplexing process are an encoder and a multiplexer which the variable length encoding unit 13 shown in FIG. 1 includes.

As one concrete example of defining a special IRAP picture or a special trailing picture, there is a method of, for NAL units described in nonpatent reference 1 and showing the definitions of pictures, defining new NAL units showing that they are the above-described special pictures, respectively.

Although the example of FIG. 33 has a configuration of performing the decoding from a top field, by configuring an encoded bitstream as mentioned above also in a case of a configuration of performing the encoding, starting from a bottom field at all times, an encoded bitstream which can be correctly played back from a bottom field at all times irrespective of the decoding start position of the encoded bitstream can be generated.

Figure 34:
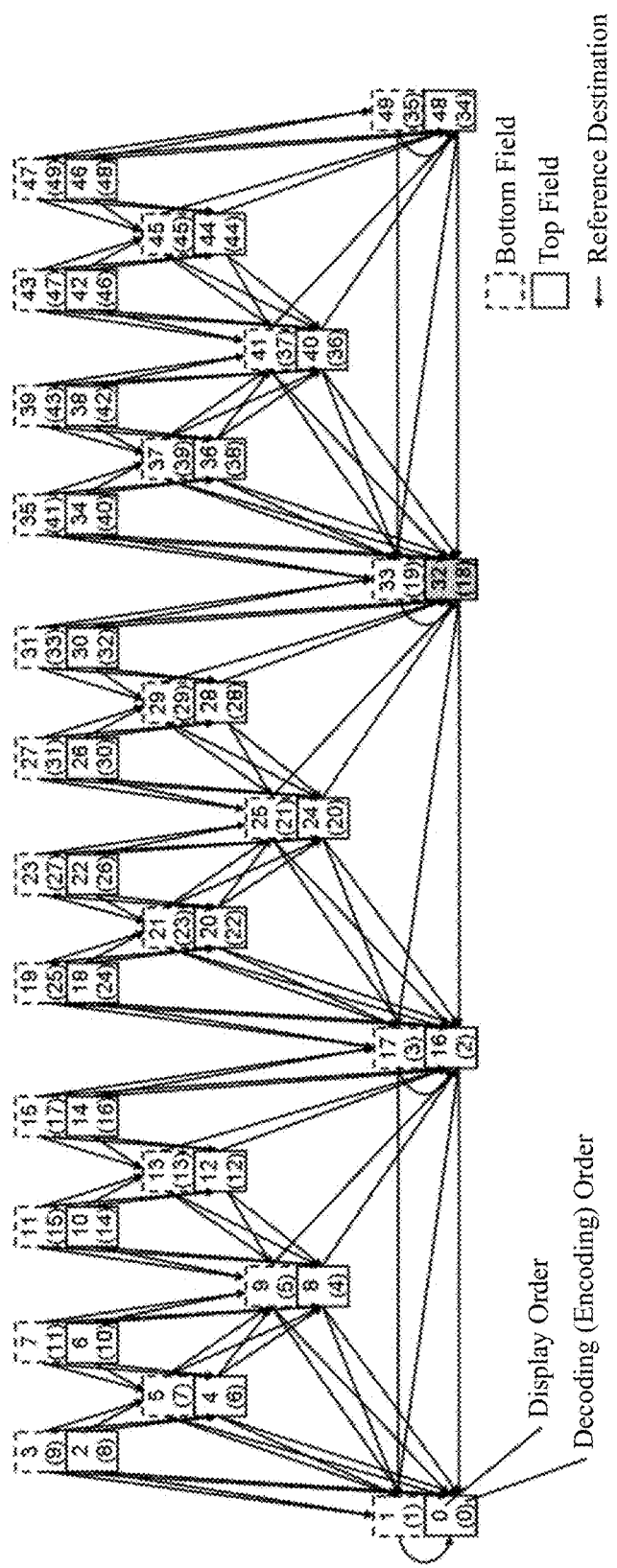
FIG. 34 is an explanatory drawing showing an example of the encoding configuration using the bidirectional prediction in the field pair encoding of an interlaced signal.
Figure 35:
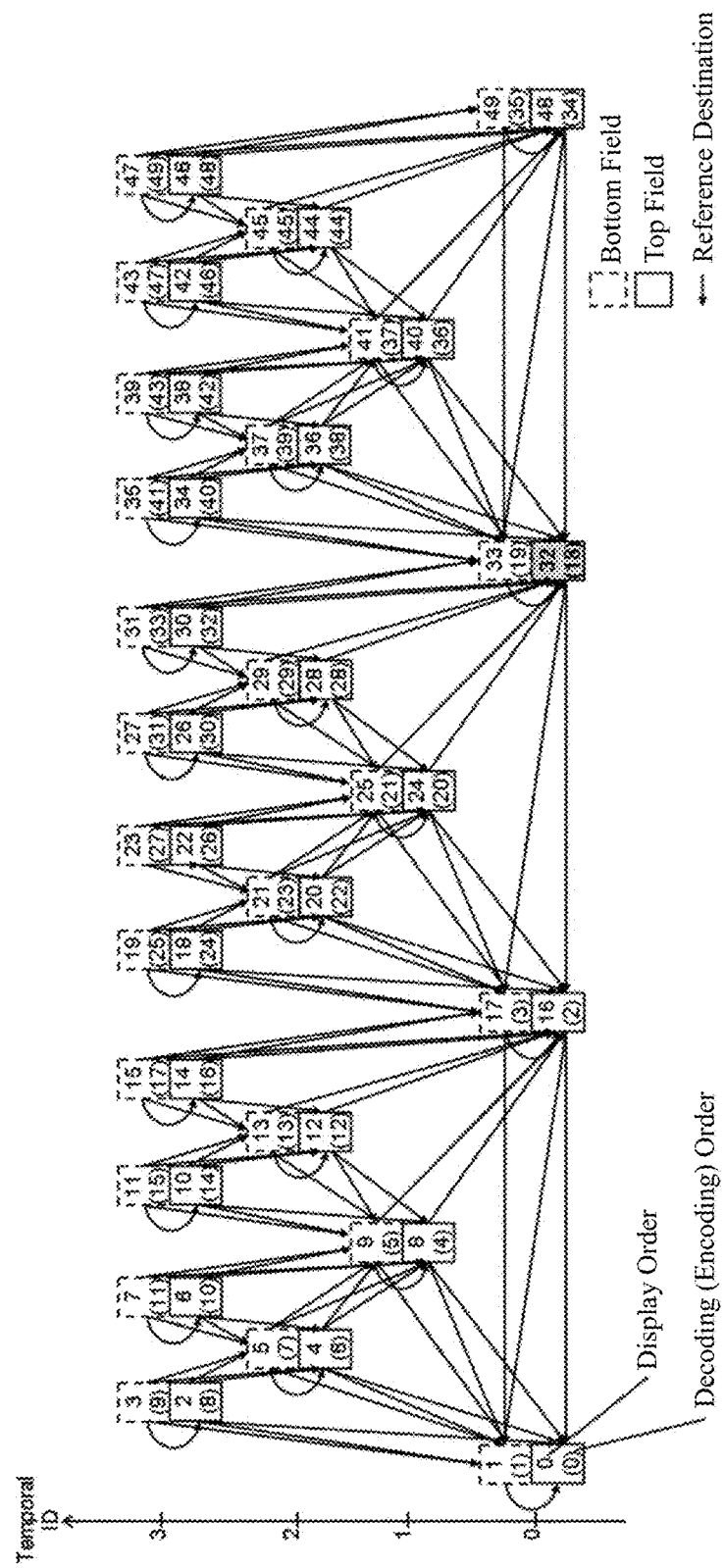
FIG. 35 is an explanatory drawing showing an example of the encoding configuration using the bidirectional prediction in the field pair encoding of an interlaced signal.
Figure 36:
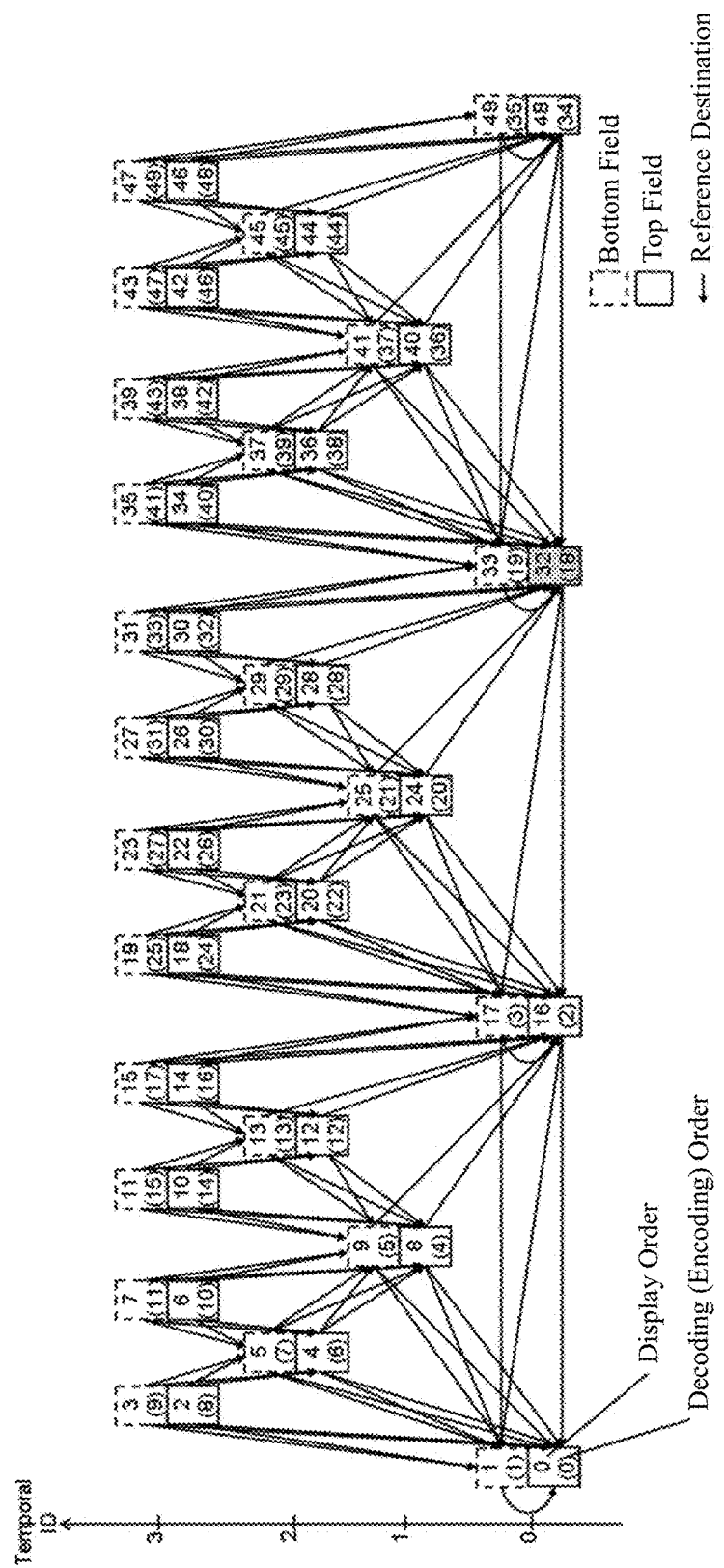
FIG. 36 is an explanatory drawing showing an example of the encoding configuration using the bidirectional prediction in the field pair encoding of an interlaced signal.
Figure 37:
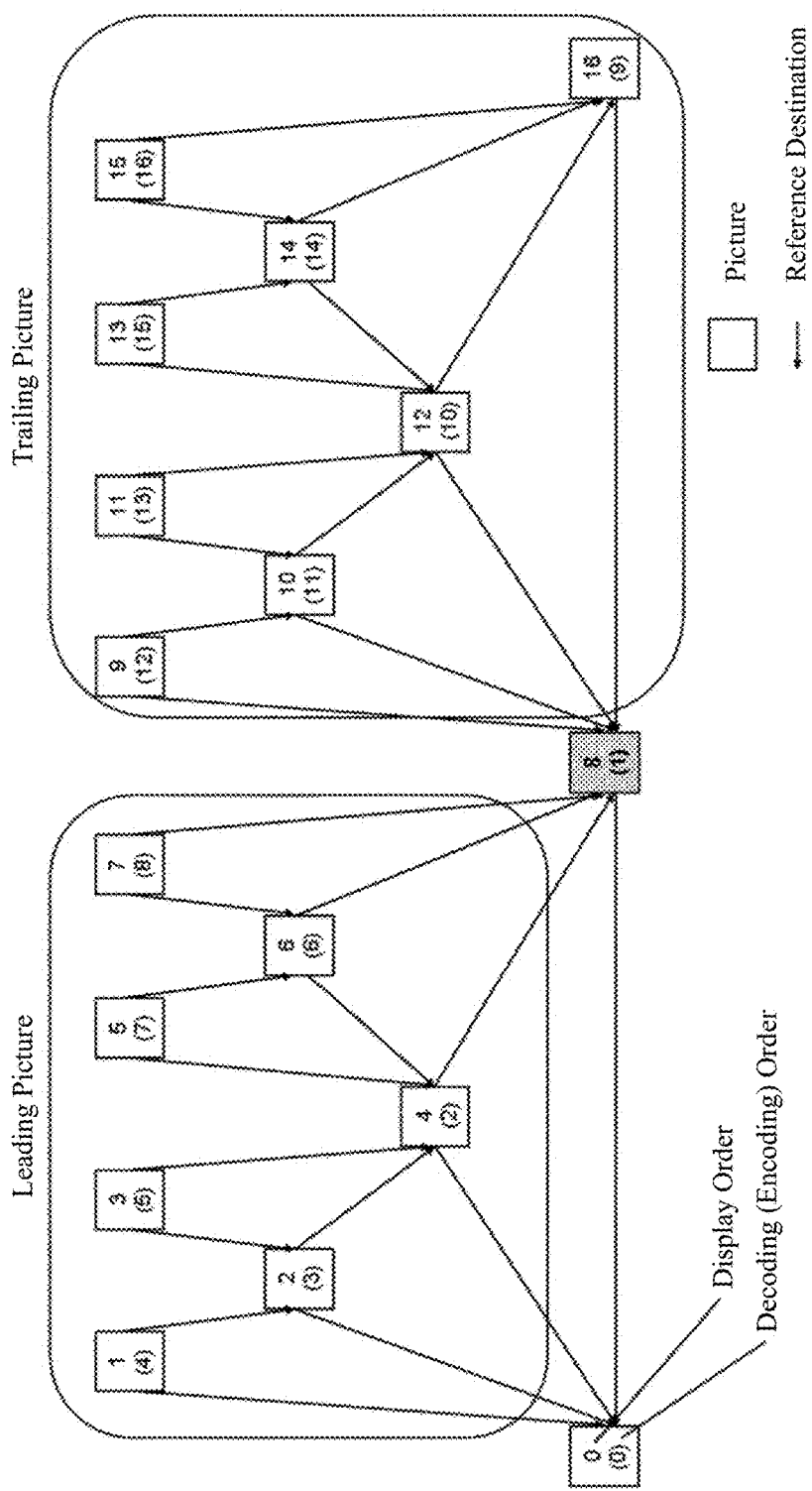
FIG. 37 is an explanatory drawing showing an example of the encoding configuration using the bidirectional prediction.

Further, FIG. 33 shows only an example of the field pair configuration using a bidirectional prediction, and various reference configurations can be provided. By encoding a picture which can be accessed randomly as a non-IRAP picture in the above-described way, regardless of the configuration, and performing the generation of an encoded bitstream by using, additional information such as SEI, information showing which picture is a picture which can be accessed randomly, an encoded bitstream which can be correctly played back from a top field at all times irrespective of the decoding start position of the encoded bitstream can be generated. For example, also a top field shown in a gray box having a number of 32 in the display order of FIG. 34 can be similarly set as a random access point. Further, by configuring an encoded bitstream in the same way as described above also in a case in which a reference configuration, as shown in FIGS. 35 and 36, having a scalable characteristic in a direction of display times is provided by using a temporal ID described in nonpatent reference 1, an encoded bitstream which can be correctly played back from a bottom field at all times, in a layer having a temporal ID=0, irrespective of the decoding start position of the encoded bitstream can be generated.

Further, although the example of encoding the information showing that random access can be performed is explained above, instead of encoding such the information, by changing the restrictions imposed on leading pictures and trailing pictures in such a way that, in the field pair configuration, when a top field is an IRAP picture, only the bottom field which pairs with the top field can be encoded (decoded) ahead of leading pictures, and always encoding, as an IRAP picture, a picture which can be accessed randomly, random access can be implemented.

In the example shown in FIG. 1, the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adder 9, the memory 10 for intra prediction, the loop filter unit 11, the motion-compensated prediction frame memory 12, the variable length encoding unit 13, and the slice partitioning unit 14, which are the components of the image encoding device, are assumed to be configured with pieces of hardware for exclusive use (e.g., semiconductor integrated circuits in each of which a CPU is mounted, one chip microcomputers, or the like). In a case in which the image encoding device is configured with a computer, a program in which the processes performed by the block partitioning unit 1, the encoding controlling unit 2, the select switch 3, the intra prediction unit 4, the motion-compensated prediction unit 5, the subtracting unit 6, the transformation/quantization unit 7, the inverse quantization/inverse transformation unit 8, the adder 9, the loop filter unit 11, the variable length encoding unit 13, and the slice partitioning unit 14 are described can be stored in a memory of the computer and a CPU of the computer can execute the program stored in the memory.

Figure 2:
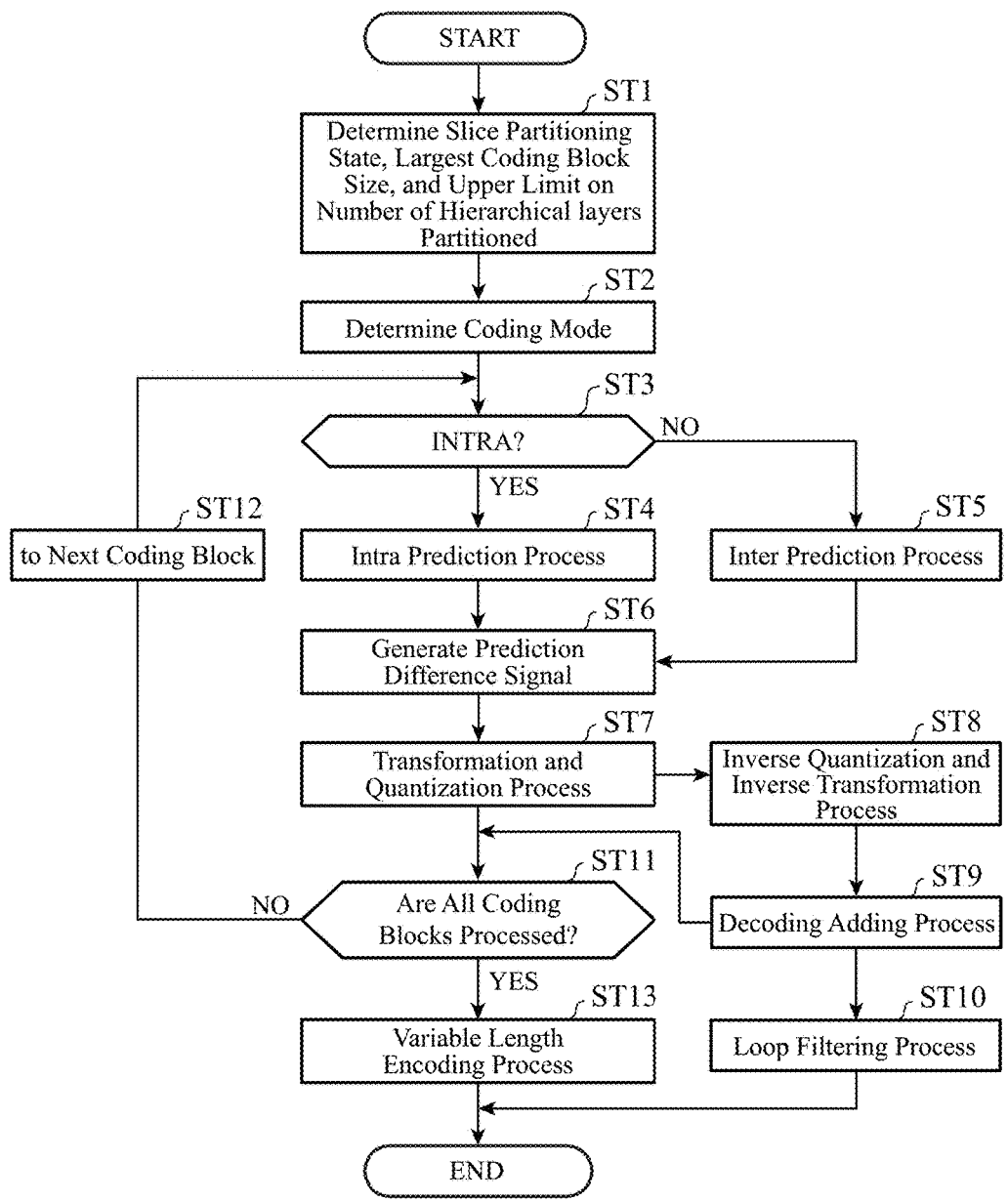
FIG. 2 is a flow chart showing processing (image encoding method) performed by the image encoding device in accordance with Embodiment 1 of the present invention.

FIG. 2 is a flow chart showing the processing (image encoding method) performed by the image encoding device in accordance with Embodiment 1 of the present invention.

Figure 3:
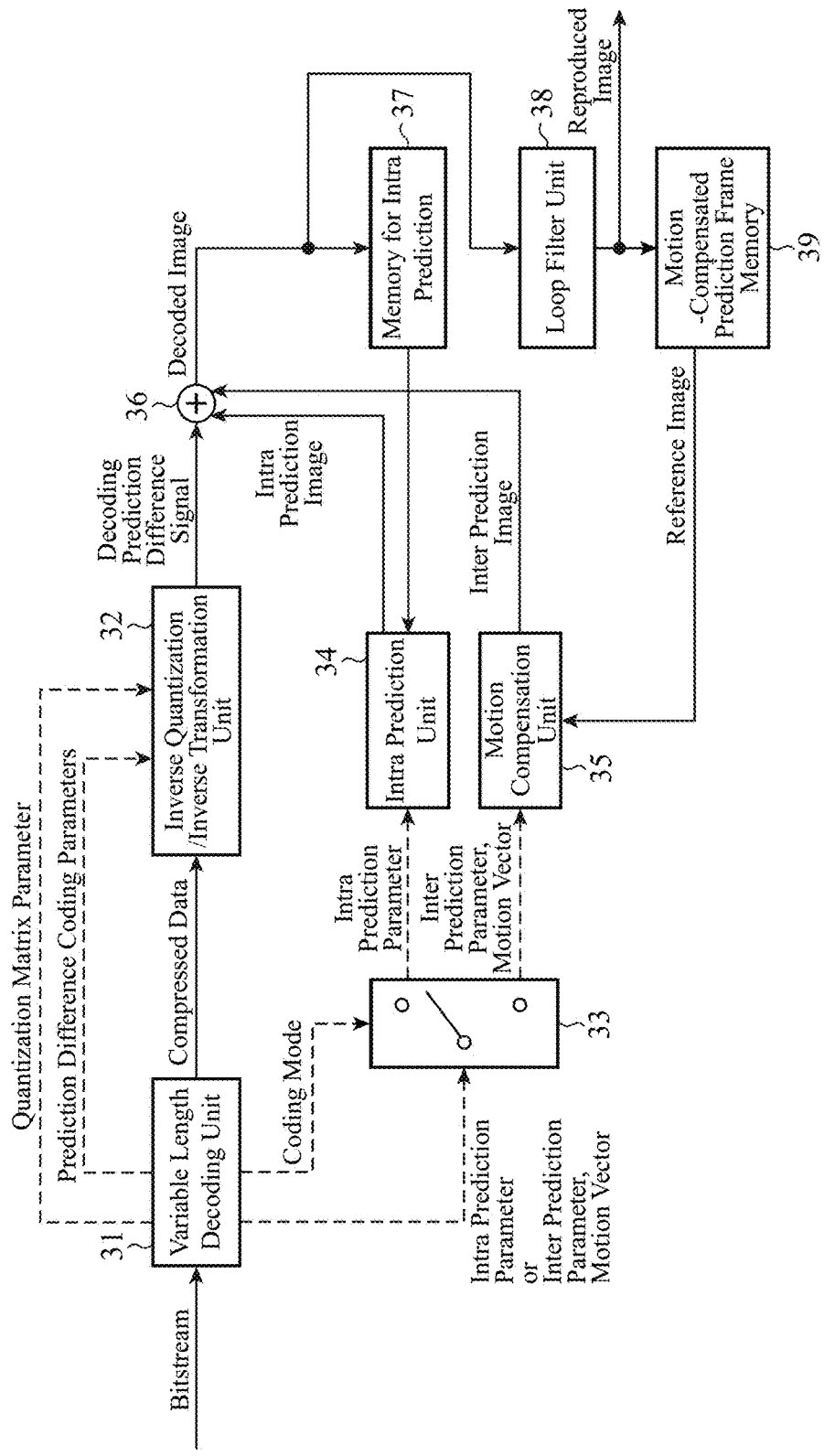
FIG. 3 is a block diagram showing an image decoding device in accordance with Embodiment 1 of the present invention.

FIG. 3 is a block diagram showing the image decoding device in accordance with Embodiment 1 of the present invention.

Referring to FIG. 3, when receiving the encoded bitstream generated by the image encoding device shown in FIG. 1, a variable length decoding unit 31 decodes each of the pieces of header information, such as sequence level headers, picture level headers, and slice level headers, from the bitstream, and also variable-length-decodes the block partitioning information showing the partitioning state of each of coding blocks partitioned hierarchically from the encoded bitstream. At that time, assuming that each of a YUV4:4:4 format signal and an RGB4:4:4 format signal is a monochrome image signal, when information showing that monochrome (YUV4:0:0) encoding is performed independently is included in the header information, a decoding process can be performed independently on the encoded bitstream of each chrominance signal.

At that time, when additional information, such as Supplemental Enhancement Information (SEI) described in nonpatent reference 1, is included, if the additional information includes information showing that a specific picture is a random access point, random access is enabled by performing the decoding from that picture. For example, in the encoding configuration of FIG. 33, under conformity with the specifications described in nonpatent reference 1, although when the top field shown by the gray box having a number of 32 in the display order is decoded as a non-IRAP picture, this top field shown by the gray box having a number of 32 in the display order is not recognized as a picture which can be accessed randomly, when Recovery Point SEI Message having the pieces of syntax shown in FIG. 38 which is a kind of SEI described in nonpatent reference 1 shows that the top field shown by the gray box having a number of 32 in the display order is set as a recovery point (recovery_poc_cnt), this top field shown by the gray box having a number of 32 in the display order can be recognized as a picture which can be accessed randomly. In addition, because this top field shown by the gray box having a number of 32 in the display order is a non-IRAP picture, even under conformity with the specifications described in nonpatent reference 1, the process under the restriction that is imposed on leading pictures and trailing pictures and that a leading picture must be decoded (encoded) ahead of trailing pictures is not indispensable, and the encoded bitstream, which is generated on condition that after the bottom field having a number of 33 in the display order, which is a trailing picture, is decoded immediately after the top field having a number of 32 in the display order is decoded, a leading picture is to be decoded, can be decoded correctly, and even if the decoding is started from the above-described top field, the subsequent fields can be decoded and played back correctly in the display order.

As a concrete example of Recovery Point SEI Message, there is provided a case in which the above-described SEI is decoded within the access unit of the picture which is desired to be able to be accessed randomly (the top field shown by the gray box having a number of 32 in the display order), and the value of each of the pieces of syntax shown in FIG. 38 is decoded as will be shown below.

recovery_poc_cnt=0
exact_match_flag=1
broken_link_flag=0

The meaning shown by each of the pieces of syntax mentioned above is as mentioned in the explanation of the image encoding device, and the decoding of this SEI as additional information makes clear that the target picture can be accessed randomly.

Further, in a case in which the image encoding device defines a special picture which permits such an encoding configuration as a new type of NAL unit or the like, instead of additional information such as SEI, the corresponding image decoding device can be configured in such away as to similarly define a special picture as a new type of new NAL unit or the like. In this case, the image decoding device can recognize that the top field having a number of 32 can be accessed randomly by decoding the above-described information.

Although the example of FIG. 33 has a configuration of performing the decoding from a top field, also in a case of an encoded bitstream which is configured in such a way that a bottom field is always encoded before everything else, by using a non-IRAP picture and additional information such as SEI, when performing the decoding from a specific bottom field shown by the additional information, fields subsequent to this specific bottom field can be decoded correctly in the display order.

Further, also in the case in which the reference configuration, as shown in FIGS. 35 and 36, having a scalable characteristic in a direction of display times is provided by using a temporal ID described in nonpatent reference 1, when the top field shown by the gray box having a number of 32 is a non-IRAP picture, like in the above-described case, and information showing that the top field shown by the gray box having a number of 32 is a random access point is decoded by using the additional information such as SEI, the encoded bitstream can be correctly decoded from a bottom field at all times, in a layer having a temporal ID=0, irrespective of the decoding start position of the encoded bitstream.

Further, although the example in which the information showing that random access can be performed is encoded is explained above, in a case in which in the image encoding device, instead of encoding such the information, the restriction imposed on leading pictures and trailing pictures is changed in such a way that when a top field is an IRAP picture in the field pair configuration, only the bottom field which pairs up with the top field can be decoded ahead of leading pictures, the same restriction is imposed on the corresponding image decoding device and, as a result, random access is implemented at all times by using an IRAP picture.

When the enable flag information of the quantization matrix included in the above-described header information shows "enabled", the variable length decoding unit 31 variable-length-decodes the quantization matrix parameter and specifies a quantization matrix. Concretely, for each chrominance signal and for each coding mode at each orthogonal transformation size, when the quantization matrix parameter shows that either a quantization matrix which is prepared, as an initial value, in advance and in common between the image encoding device and the image decoding device, or an already-decoded quantization matrix is used (no new quantization matrix is used), the variable length decoding unit refers to the index information specifying which quantization matrix in the above-described matrices is used, to specify a quantization matrix, and, when the quantization matrix parameter shows that a new quantization matrix is used, specifies, as the quantization matrix to be used, the quantization matrix included in the quantization matrix parameter.

The variable length decoding unit 31 also refers to each header information to specify the slice partitioning state and also specify each largest coding block included in the slice data about each slice, refers to the block partitioning information to partition each largest coding block hierarchically and specify each coding block which is a unit on which the decoding process is to be performed, and performs a process of variable-length-decoding the compressed data, the coding mode, the intra prediction parameter (when the coding mode is an intra coding mode), the inter prediction parameter (when the coding mode is inter encoding mode), the motion vector (when the coding mode is an inter coding mode), and the prediction difference coding parameters, which are associated with each coding block.

An inverse quantization/inverse transformation unit 32 refers to the quantization parameter and the transformation block partitioning information which are included in the prediction difference coding parameters variable-length-decoded by the variable length decoding unit 31, to inverse-quantize the compressed data variable-length-decoded by the variable length decoding unit 31 on a per transformation block basis, performs an inverse orthogonal transformation process on the transform coefficients which are the compressed data inverse-quantized thereby, and performs a process of calculating a decoding prediction difference signal which is the same as the local decoding prediction difference signal outputted from the inverse quantization/inverse transformation unit 8 shown in FIG. 1.

In this case, from the above-described transformation block partitioning information, the partitioning state of the transformation blocks in each coding block is determined. For example, in the case of a signal having the YUV4:2:0 format, the transformation block sizes are determined by performing hierarchical partitioning of each coding block into blocks in quadtree form, as shown in FIG. 20.

The luminance signal is configured in such a way that each coding block is hierarchically partitioned into one or more of square transformation blocks, as shown in, for example, FIG. 20.

Each of the color difference signals is configured in such a way that when the input signal format is the YUV4:2:0 signal format, each coding block is hierarchically partitioned into one or more of square transformation blocks, as shown in FIG. 20, like the luminance signal. In this case, the transformation block size of each of the color difference signals is half of that of the corresponding luminance signal both in the vertical and horizontal directions.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the color difference signals in a YUV4:2:0 signal (a size which is half of the size both in the vertical and horizontal directions of each transformation block of the luminance signal).

When the input signal format is the YUV4:4:4 signal format, as shown in FIG. 22, the same partitioning as that on the transformation blocks of the luminance signal is always performed on the transformation blocks of each of the color difference signals in such a way that the transformation blocks are configured to have the same sizes.

Further, when each header information variable-length-decoded by the variable length decoding unit 31 shows that in the slice currently being processed, an inverse quantization process is performed by using a quantization matrix, the inverse quantization process is performed by using the quantization matrix.

Concretely, the inverse quantization/inverse transformation unit performs the inverse quantization process by using the quantization matrix specified from each header information.

A select switch 33 performs a process of, when the coding mode variable-length-decoded by the variable length decoding unit 31 is an intra coding mode, outputting the intra prediction parameter which is variable-length-decoded by the variable length decoding unit 31 to an intra prediction unit 34, whereas when the coding mode variable-length-decoded by the variable length decoding unit 31 is an inter coding mode, outputting the inter prediction parameter and the motion vector which are variable-length-decoded by the variable length decoding unit 31 to a motion compensation unit 35.

When the coding mode associated with the coding block determined from the block partitioning information variable-length-decoded by the variable length decoding unit 31 is an intra coding mode, the intra prediction unit 34 performs an intra prediction process (intra-frame prediction process) using the intra prediction parameter outputted from the select switch 33 while referring to a decoded image stored in a memory 37 for intra prediction, and performs a process of generating an intra prediction image. The intra prediction unit 34 constructs an intra predictor.

More specifically, as to the luminance signal, the intra prediction unit 34 performs the intra prediction process (intra-frame prediction process) using the above-described intra prediction parameter on the luminance signal, to generate a prediction image of the luminance signal.

On the other hand, as to the color difference signals, when the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs the directional prediction on the color difference signals to generate prediction images of the color difference signals.

Further, when the intra prediction parameter of the color difference signals shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

In a case in which the image encoding device is configured to perform the process in the above-described DM mode or the above-described LM mode and prevent itself from selecting another prediction mode when the input signal format is the YUV4:4:4 signal format, the image decoding device is similarly configured in such a way as to be able to decode the encoded bitstream generated by the image encoding device.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Further, when the input signal format is the YUV4:2:2 signal format, if the luminance signal is a square block, as shown in FIG. 27, each of the color difference signals is a rectangular block in which the number of pixels in the horizontal direction is half as compared with that of the luminance signal. Therefore, in order to apply a prediction in the same direction to the luminance signal and the color difference signals when a YUV4:4:4 signal is converted into a YUV4:2:2 signal, as shown in FIG. 28, the prediction direction of the color difference signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the color difference signals is expressed by $v_C=(dx_L/2, dy_L)$. More specifically, when the angle of the prediction direction is expressed by theta, as shown in FIG. 30, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the color difference signals is expressed by $\theta_C$.

Therefore, in order to make it possible to correctly perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals in the intra prediction mode corresponding to the converted index. Concretely, a conversion table for the index can be prepared and the intra prediction unit can be configured to convert the index by referring to the conversion table, or a conversion equation can be prepared in advance and the intra prediction unit can be configured to convert the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

The motion compensation unit 35 performs a process of, when the coding mode associated with the coding block determined from the block partitioning information variable-length-decoded by the variable length decoding unit 31 is an inter coding mode, performing an inter prediction process (motion-compensated prediction process) using the motion vector and the inter prediction parameter which are outputted from the select switch 33 while referring to a decoded image stored in a motion-compensated prediction frame memory 39, and generating an inter prediction image.

An adding unit 36 performs a process of adding the decoding prediction difference signal calculated by the inverse quantization/inverse transformation unit 32 and the intra prediction image generated by the intra prediction unit 34 or the inter prediction image generated by the motion compensation unit 35, to calculate a decoded image which is the same as the local decoded image outputted from the adding unit 9 shown in FIG. 1.

The memory 37 for intra prediction is a recording medium that stores the decoded image calculated by the adder 36 as a reference image used for intra prediction process.

A loop filter unit 38 performs a predetermined filtering process on the decoded image calculated by the adding unit 36, and performs a process of outputting the decoded image filtering-processed thereby.

Concretely, the loop filter unit performs a filtering (de-blocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing the filtering process, and so on.

For each of the above-mentioned filtering processes including the deblocking filtering process, the pixel adaptive offset process, and the adaptive filtering process, the loop filter unit 38 refers to each header information variable-length-decoded by the variable length decoding unit 31 and specifies whether or not to perform the process in the slice currently being processed.

Figure 12:
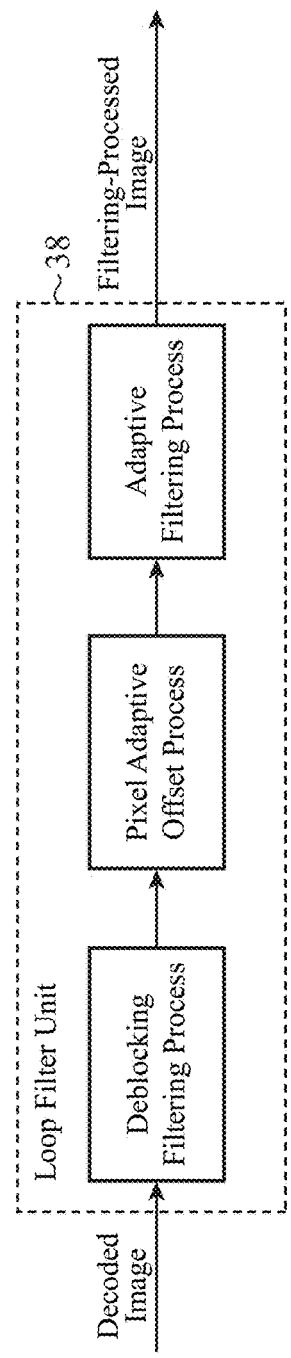
FIG. 12 is an explanatory drawing showing an example of the configuration of using a plurality of loop filtering processes in the loop filter unit of the image encoding device in accordance with Embodiment 1 of the present invention.

At that time, if, for example, the loop filter unit 11 of the image encoding device is configured as shown in FIG. 11 when performing two or more filtering processes, the loop filter unit 38 is configured as shown in FIG. 12. As a matter of course, if the loop filter unit 11 of the image encoding device is configured with the deblocking filtering process and the pixel adaptive offset process, the loop filter unit 38 is also configured with the deblocking filtering process and the pixel adaptive offset process.

In the deblocking filtering process, the loop filter unit refers to the header information variable-length-decoded by the variable length decoding unit 31, and, when there exists information for changing the various parameters used for the selection of the intensity of a filter applied to a block boundary from initial values, performs the deblocking filtering process on the basis of the change information. When no change information exists, the loop filter unit performs the deblocking filtering process according to a predetermined method.

In the pixel adaptive offset process, the loop filter unit partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-described index.

As a candidate for the class classifying method, a method which is the same as a candidate for the class classifying method for the pixel adaptive offset process in the loop filter unit 11 is prepared in advance.

The loop filter unit then refers to the offset information specifying the offset value calculated for each class on a per block basis, and performs a process of adding the offset to the luminance value of the decoded image.

When the pixel adaptive offset process in the loop filter unit 11 of the image encoding device is configured in such a way as to, instead of encoding the block partitioning information, always partition the image into blocks each having a fixed size (e.g., largest coding blocks), select a class classifying method for each of the blocks, and perform an adaptive offset process on a per class basis, a pixel adaptive offset process is performed also in the loop filter unit 38 for each block having a fixed size which is the same as that in the loop filter unit 11.

In the adaptive filtering process, after performing a class classification according to the same method as that used by the image encoding device of FIG. 1, the loop filter unit performs the filtering process by using the filter for each class, which is variable-length-decoded by the variable length decoding unit 31, on the basis of information about the class classification.

The motion-compensated prediction frame memory 39 is a recording medium that stores the decoded image filtering-processed by the loop filter unit 38 as a reference image used for inter prediction process (motion-compensated prediction process).

In the example shown in FIG. 3, the variable length decoding unit 31, the inverse quantization/inverse transformation unit 32, the select switch 33, the intra prediction unit 34, the motion compensation unit 35, the adder 36, the memory 37 for intra prediction, the loop filter unit 38, and the motion-compensated prediction frame memory 39, which are the components of the image decoding device, are assumed to be configured with pieces of hardware for exclusive use (e.g., semiconductor integrated circuits in each of which a CPU is mounted, one chip microcomputers, or the like). In a case in which the image decoding device is configured with a computer, a program in which the processes performed by the variable length decoding unit 31, the inverse quantization/inverse transformation unit 32, the select switch 33, the intra prediction unit 34, the motion compensation unit 35, the adder 36, and the loop filter unit 38 are described can be stored in a memory of the computer and a CPU of the computer can execute the program stored in the memory.

Figure 4:
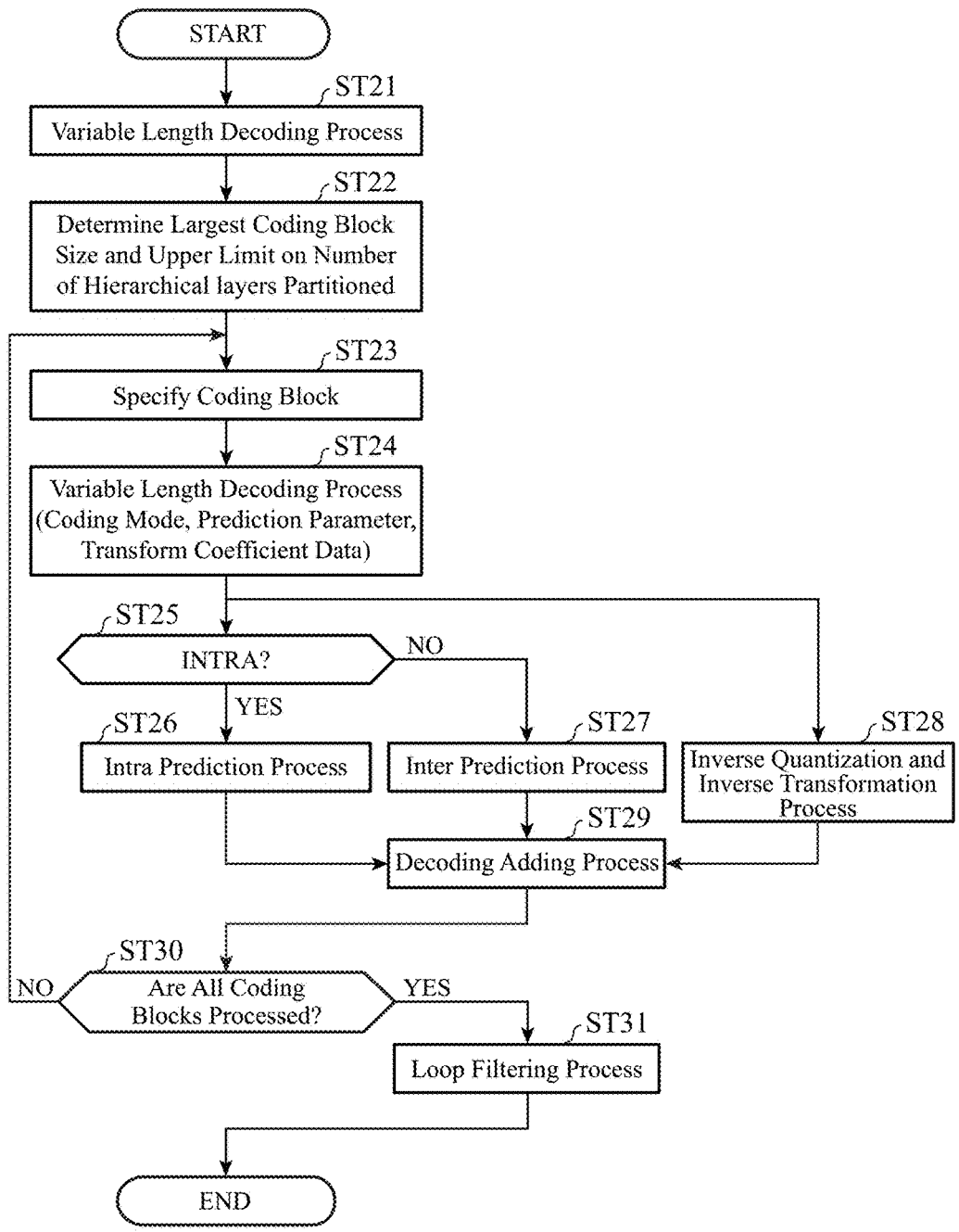
FIG. 4 is a flow chart showing processing (image decoding method) performed by the image decoding device in accordance with Embodiment 1 of the present invention.

FIG. 4 is a flow chart showing the processing (image decoding method) performed by the image decoding device in accordance with Embodiment 1 of the present invention.

Next, operations will be explained.

In this Embodiment 1, a case will be explained in which the image encoding device receives each frame image of a video as an input image, performs an intra prediction based on already-encoded neighboring pixels or a motion-compensated prediction between adjacent frames, performs a compression process with orthogonal transformation and quantization on an acquired prediction difference signal, and, after that, performs variable length encoding to generate an encoded bitstream, and the image decoding device decodes the encoded bitstream outputted from the image encoding device.

The image encoding device shown in FIG. 1 is characterized in that the device is adapted for local changes of a video signal in a space direction and in a time direction, partitions the video signal into blocks having various sizes, and performs intra-frame and inter-frame adaptive encoding.

In general, video signals have characteristics of their complexity locally varying in space and time. From the viewpoint of space, a certain video frame may have, for example, a pattern having a uniform signal characteristic in a relatively large image region, such as a sky image or a wall image, or a pattern in which a pattern having a complicated texture in a small image region, such as a person image or a picture including a fine texture, also coexists.

Also from the viewpoint of time, a sky image and a wall image have a small local change in a time direction in their patterns, while an image of a moving person or object has a larger temporal change because its outline has a movement of a rigid body and a movement of a non-rigid body with respect to time.

Although a process of generating a prediction difference signal having small signal power and small entropy by using a temporal and spatial prediction, thereby reducing the whole code amount, is performed in the encoding process, the code amount of parameters used for the prediction can be reduced as long as the parameters can be applied uniformly to as large an image signal region as possible.

On the other hand, because the amount of errors occurring in the prediction increases when the same prediction parameter is applied to a large image region in an image signal pattern having a large change in time and space, the code amount of the prediction difference signal increases.

Therefore, it is desirable that, for an image region having a large change in time and space, the size of a block subjected to the prediction process to which the same prediction parameter is applied is reduced, thereby increasing the data volume of the parameter which is used for the prediction and reducing the electric power and entropy of the prediction difference signal.

In this Embodiment 1, in order to perform encoding which is adapted for the above-described general characteristics of a video signal, a configuration is employed in which the prediction process and so on are started first from a predetermined largest block size, the region of the video signal is hierarchically partitioned, and the prediction process and the encoding process on the prediction difference are adapted for each of the partitioned regions.

The processing performed by the image encoding device shown in FIG. 1 will be explained first.

First, the encoding controlling unit 2 determines the slice partitioning state of a picture (current picture) which is the target to be encoded, and also determines the size of each largest coding block which is used for the encoding of the picture and the upper limit on the number of hierarchical layers at the time when each largest coding block is hierarchically partitioned into blocks (step ST1 of FIG. 2).

As a method of determining the size of each largest coding block, for example, there can be a method of determining the same size for all the pictures according to the resolution of the video signal of the inputted image, and a method of quantifying a variation in the complexity of a local movement of the video signal of the inputted image as a parameter and then determining a small size for a picture having a vigorous movement while determining a large size for a picture having a small movement.

As a method of determining the upper limit on the number of hierarchical layers partitioned, for example, there can be a method of determining the same number of hierarchical layers for all the pictures according to the resolution of the video signal of the inputted image, and a method of determining an increased number of hierarchical layers so that a finer movement can be detected when the video signal of the inputted image has a vigorous movement, while determining a decreased number of hierarchical layers when the video signal of the inputted image has a small movement.

The above-described size of each largest coding block and the upper limit on the number of hierarchical layers into which each largest coding block is hierarchically partitioned can be encoded into the sequence level header or the like, or, instead of encoding the size and the number, the image decoding device can be configured in such a way as to also perform the same determination process.

In the former case, the code amount of the header information increases. However, because the image decoding device does not have to perform the above-described determination process, the processing load on the image decoding device can be reduced and, in addition to that, the image encoding device can search for and send an optimal value.

In the latter case, conversely, while the processing load on the image decoding device increases since the image decoding device performs the above-described determination process, the code amount of the header information does not increase.

Further, when the above-described size of each largest coding block and the upper limit on the number of hierarchical layers into which each largest coding block is hierarchically partitioned is encoded into the sequence level header, the smallest block size of the coding blocks, instead of the upper limit on the number of hierarchical layers partitioned, can be encoded. More specifically, because the size of blocks which are acquired when each largest coding block is partitioned until its number of hierarchical layers partitioned reaches the upper limit is the smallest block size of the coding blocks, the image decoding device can determine the upper limit on the number of hierarchical layers partitioned from the size of the largest coding blocks and the smallest block size of the coding blocks.

The encoding controlling unit 2 also selects a coding mode corresponding to each of the coding blocks into which each inputted image is hierarchically partitioned from one or more available coding modes (step ST2).

More specifically, the encoding controlling unit 2 hierarchically partitions each image region having the largest coding block size into coding blocks each having a coding block size until the number of hierarchical layers partitioned reaches the upper limit which is determined in advance, and determines a coding mode for each of the coding blocks.

The coding mode is one of one or more intra coding modes (generically referred to as "INTRA") and one or more inter coding modes (generically referred to as "INTER"), and the encoding controlling unit 2 selects a coding mode corresponding to each of the coding blocks from among all the coding modes available in the picture currently being processed or a subset of these coding modes.

Each of the coding blocks into which each inputted image is hierarchically partitioned by the block partitioning unit 1, which will be mentioned below, is further partitioned into one or more prediction blocks each of which is a unit on which a prediction process is to be performed, and the state of the partitioning into the prediction blocks is also included as information in the coding mode. More specifically, the coding mode, which is an intra or inter coding mode, is an index identifying what type of partitioned prediction blocks are included.

Although a detailed explanation of a method of selecting a coding mode for use in the encoding controlling unit 2 will be omitted hereafter because the selecting method is a known technique, there is a method of performing an encoding process on each coding block by using arbitrary available coding modes to examine the coding efficiency, and selecting a coding mode having the highest degree of coding efficiency from among the plurality of available coding modes, for example.

The encoding controlling unit 2 further determines a quantization parameter and a transformation block partitioning state, which are used when a difference image is compressed, for each coding block, and also determines a prediction parameter (intra prediction parameter or inter prediction parameter) which is used when a prediction process is performed.

When each coding block is further partitioned into prediction blocks on each of which the prediction process is to be performed, a prediction parameter (intra prediction parameter or inter prediction parameter) can be selected for each of the prediction blocks.

FIG. 20 is an explanatory drawing showing transformation block sizes at the time of performing the compression process (the transformation process and quantization process) on the luminance signal and the color difference signals in a 4:2:0 format signal.

The transformation block sizes are determined by hierarchically partitioning each coding block into blocks in quadtree form, as shown in FIG. 20.

For example, by determining whether or not to partition each transformation block on the basis of the code amount in the case of partitioning the transformation block, the code amount in the case of not partitioning the transformation block, and an evaluation criterion which takes into consideration coding errors, etc. in such a way that an evaluated value is minimized, an optimal partitioned shape of the transformation block can be determined from the viewpoint of a trade-off between the code amount and the coding errors.

The luminance signal is configured, as shown in, for example, FIG. 20, in such a way that each coding block is hierarchically partitioned into one or more square transformation blocks.

The color difference signals are configured, as shown in FIG. 20, in such a way that when the input signal format is the YUV4:2:0 signal format, each coding block is hierarchically partitioned into one or more square transformation blocks, like the luminance signal. In this case, the transformation block size of each of the color difference signals is half of that of the corresponding luminance signal both in the vertical and horizontal directions.

As shown in FIG. 21, when the input signal format is the YUV4:2:2 signal format, the same hierarchical partitioning into blocks in quadtree form as that on the luminance signal is performed. Further, because the shape of each partitioned block is a rectangle in which the number of pixels in the vertical direction is twice as large as the number of pixels in the horizontal direction, by further partitioning each partitioned block into two blocks in the vertical direction, each partitioned block is made to consist of two transformation blocks having the same block size as that of the color difference signals in a YUV 4:2:0 signal (a size which is half of the size both in the vertical and horizontal directions of each transformation block of the luminance signal).

Further, when the input signal format is the YUV4:4:4 signal format, as shown in FIG. 22, the same partitioning as that on the transformation blocks of the luminance signal is always performed on the transformation blocks of each of the color difference signals in such a way that the transformation blocks are configured to have the same sizes.

The encoding controlling unit 2 outputs the prediction difference coding parameters including the transformation block partitioning information showing the partitioning information about the transformation blocks in each coding block, and the quantization parameter defining the quantization step size at the time of performing quantization on the transform coefficients to the transformation/quantization unit 7, the inverse quantization/inverse transformation unit 8, and the variable length encoding unit 13.

The encoding controlling unit 2 also outputs the intra prediction parameter to the intra prediction unit 4 as needed.

The encoding controlling unit 2 further outputs the inter prediction parameter to the motion-compensated prediction unit 5 as needed.

When receiving the video signal as the inputted image, the slice partitioning unit 14 partitions the inputted image into one or more slices which are part images according to the slice partitioning information determined by the encoding controlling unit 2.

Every time when receiving each of the slices from the slice partitioning unit 14, the block partitioning unit 1 partitions the slice into coding blocks each having the largest coding block size determined by the encoding controlling unit 2, and further partitions each of the largest coding blocks partitioned into coding blocks hierarchically, these coding blocks being determined by the encoding controlling unit 2, and outputs each of the coding blocks.

Figure 5:
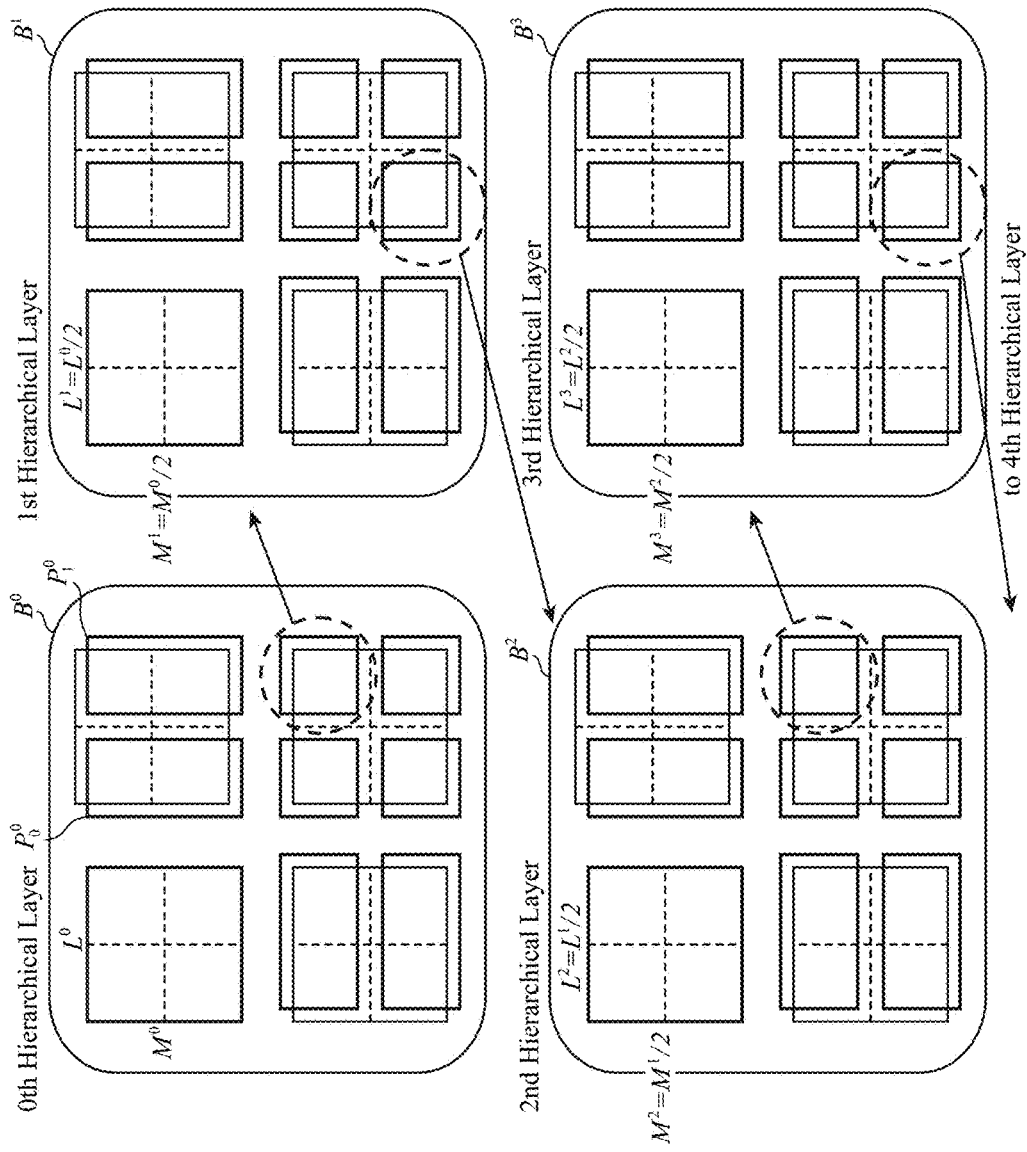
FIG. 5 is an explanatory drawing showing an example in which each largest coding block is partitioned hierarchically into a plurality of coding blocks.

FIG. 5 is an explanatory drawing showing an example in which each largest coding block is hierarchically partitioned into a plurality of coding blocks.

Referring to FIG. 5, each largest coding block is a coding block whose luminance component, which is shown by "0-th hierarchical layer", has a size of $(L^0, M^0)$.

By performing the partitioning hierarchically with each largest coding block being set as a starting point until the depth of the hierarchy reaches a predetermined depth which is set separately according to a quadtree structure, the coding blocks are acquired.

At the depth of n, each coding block is an image region having a size of $(L^n, M^n)$.

Although $L^n$ can be the same as or differ from $M^n$, the case of $L^n=M^n$ is shown in FIG. 5.

Hereafter, the coding block size determined by the encoding controlling unit 2 is defined as the size of $(L^n, M^n)$ in the luminance component of each coding block.

Because quadtree partitioning is performed, $(L^{n+1}, M^{n+1})=(L^n/2, M^n/2)$ is always established.

In the case of a color video signal (4:4:4 format) in which all the color components have the same sample number, such as an RGB signal, all the color components have a size of $(L^n, M^n)$, while in the case of handling the 4:2:0 format, a corresponding color difference component has a coding block size of $(L^n/2, M^n/2)$.

Hereafter, each coding block in the nth hierarchical layer is expressed by $B^n$, and a coding mode selectable for each coding block $B^n$ is expressed by $m(B^n)$.

In the case of a color video signal which consists of a plurality of color components, the coding mode $m(B^n)$ can be configured in such a way that an individual mode is used for each color component, or can be configured in such a way that a common mode is used for all the color components. Hereafter, an explanation will be made by assuming that the coding mode indicates a coding mode for the luminance component of each coding block when having the 4:2:0 format in a YUV signal unless otherwise specified.

Each coding block $B^n$ is partitioned into one or more prediction blocks each representing a unit for prediction process by the block partitioning unit 1, as shown in FIG. 5.

Hereafter, each prediction block belonging to each coding block $B^n$ is expressed by $P_i^n$ (i shows a prediction block number in the nth hierarchical layer). An example of $P_0^0$ and $P_1^0$ is shown in FIG. 5.

How the partitioning of each coding block $B^n$ into prediction blocks is performed is included as information in the coding mode $m(B^n)$.

While a prediction process is performed on each of all the prediction blocks $P_i^n$ according to the coding mode $m(B^n)$, an individual prediction parameter (an intra prediction parameter or an inter prediction parameter) can be selected for each prediction block $P_i^n$.

Figure 6:
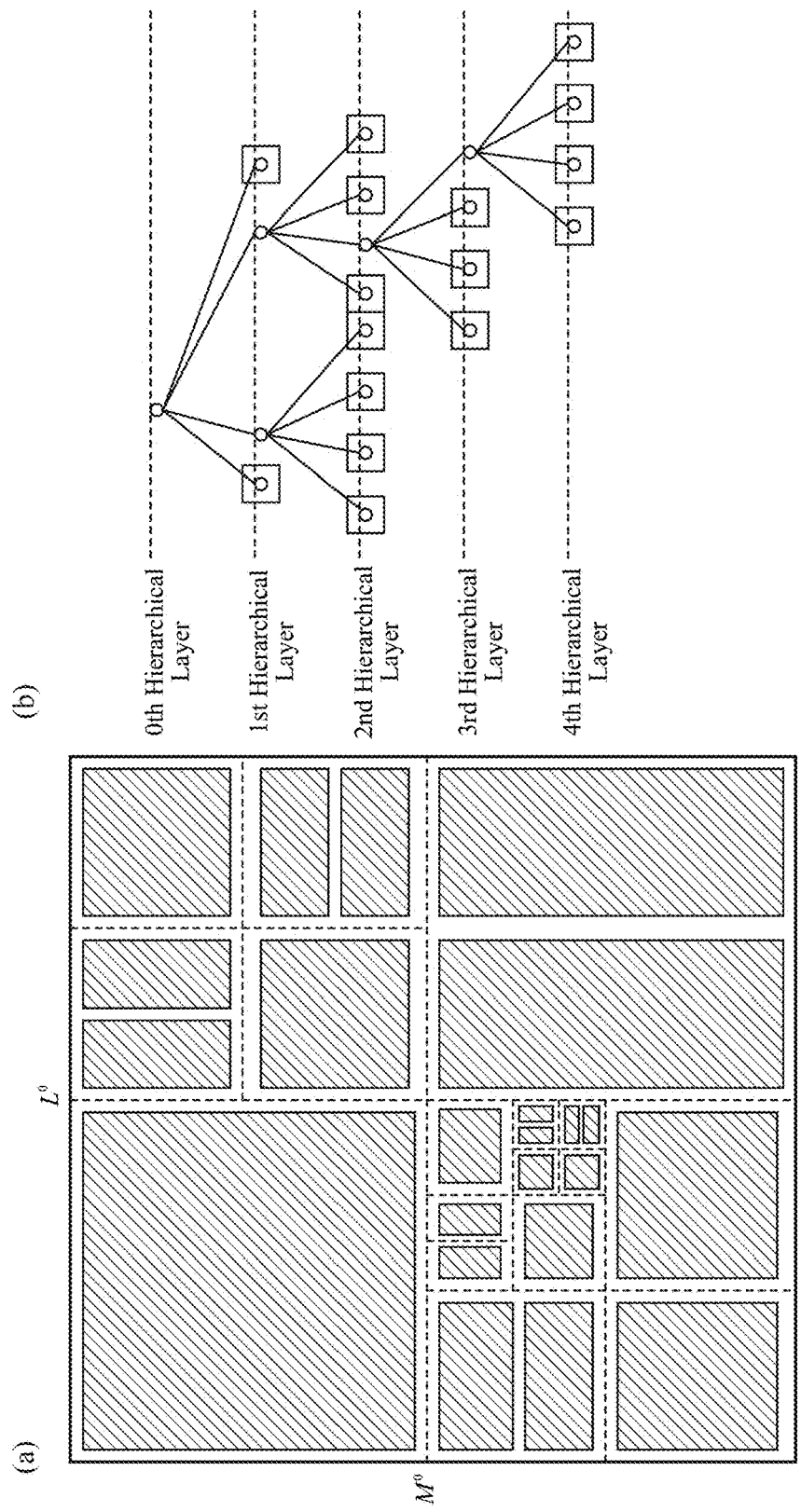
FIG. 6(a) is an explanatory drawing showing the distribution of coding blocks and prediction blocks after partitioning.
FIG. 6(b) is an explanatory drawing showing a state in which a coding mode m(B") is assigned to each of the blocks through hierarchical layer partitioning.

The encoding controlling unit 2 generates such a block partitioning state as shown in FIG. 6 for each largest coding block, and then specifies coding blocks.

Each rectangle enclosed by a dotted line of FIG. 6(a) shows a coding block, and each block filled with hatch lines in each coding block shows the partitioning state of each prediction block.

FIG. 6(b) shows a situation where a coding mode $m(B^n)$ is assigned to each node through the hierarchical layer partitioning in the example of FIG. 6(a) is shown by using a quadtree graph. Each node enclosed by □ shown in FIG. 6(b) is a node (coding block) to which a coding mode $m(B^n)$ is assigned.

Information about this quadtree graph is outputted from the encoding controlling unit 2 to the variable length encoding unit 13 together with the coding mode $m(B^n)$, and is multiplexed into a bitstream.

When the coding mode $m(B^n)$ determined by the encoding controlling unit 2 is an intra coding mode (when $m(B^n)$ ∈INTRA), the select switch 3 outputs the coding block $B^n$ outputted from the block partitioning unit 1 to the intra prediction unit 4.

In contrast, when the coding mode m(B″) determined by the encoding controlling unit 2 is an inter coding mode (when m(B″)∈INTER), the select switch outputs the coding block B″ outputted from the block partitioning unit 1 to the motion-compensated prediction unit 5.

When the coding mode m(B″) determined by the encoding controlling unit 2 is an intra coding mode (when m(B″) ∈INTRA), and the intra prediction unit 4 receives the coding block B″ from the select switch 3 (step ST3), the intra prediction unit 4 performs the intra prediction process on each prediction block $P_i^n$ in the coding block B″ by using the intra prediction parameter determined by the encoding controlling unit 2 while referring to the local decoded image stored in the memory 10 for intra prediction, to generate an intra prediction image $P_{INTRAi}^n$ (step ST4).

Although the details will be described below, because already-encoded pixels adjacent to the target block for prediction are used when performing the process of generating an intra prediction image, the process of generating an intra prediction image must be always performed on a per transformation block basis in such a way that the pixels adjacent to the target block for prediction which are used for the prediction process have been already encoded.

Accordingly, for a coding block in which the coding mode is an intra coding mode, the selectable block sizes of the transformation blocks are limited to sizes equal to or smaller than the size of the prediction blocks. In addition, when each transformation block is smaller than a prediction block (when a plurality of transformation blocks exist in a prediction block), an intra prediction process using the intra prediction parameter determined for this prediction block is performed and the process of generating an intra prediction image is performed on a per transformation block basis.

Because the image decoding device needs to generate an intra prediction image which is completely the same as the intra prediction image $P_{INTRAi}^n$, the intra prediction parameter used for generating the intra prediction image $P_{INTRAi}^n$ is outputted from the encoding controlling unit 2 to the variable length encoding unit 13, and is multiplexed into the bitstream.

The details of the processing performed by the intra prediction unit 4 will be mentioned below.

When the coding mode m(B″) determined by the encoding controlling unit 2 is an inter coding mode (when m(B″) ∈INTER), and the motion-compensated prediction unit 5 receives the coding block B″ from the select switch 3 (step ST3), the motion-compensated prediction unit 5 compares each prediction block $P_i^n$ in the coding block B″ with the local decoded image which is stored in the motion-compensated prediction frame memory 12 and on which the filtering process is performed, to search for a motion vector, and performs the inter prediction process on each prediction block $P_i^n$ in the coding block B″ by using both the motion vector and the inter prediction parameter determined by the encoding controlling unit 2, to generate an inter prediction image $P_{INTERi}^n$ (step ST5).

Because the image decoding device needs to generate an inter prediction image which is completely the same as the inter prediction image $P_{INTERi}^n$, the inter prediction parameter used for generating the inter prediction image $P_{INTERi}^n$ is outputted from the encoding controlling unit 2 to the variable length encoding unit 13, and is multiplexed into the bitstream.

The motion vector which is searched for by the motion-compensated prediction unit 5 is also outputted to the variable length encoding unit 13 and is multiplexed into the bitstream.

When receiving the coding block B″ from the block partitioning unit 1, the subtracting unit 6 subtracts the intra prediction image $P_{INTRAi}^n$ generated by the intra prediction unit 4 or the inter prediction image $P_{INTERi}^n$ generated by the motion-compensated prediction unit 5 from the prediction block $P_i^n$ in the coding block B″, and outputs a prediction difference signal $e_i^n$ showing a difference image which is the result of the subtraction to the transformation/quantization unit 7 (step ST6).

When receiving the prediction difference signal $e_i^n$ from the subtracting unit 6, the transformation/quantization unit 7 refers to the transformation block partitioning information included in the prediction difference coding parameters determined by the encoding controlling unit 2, and performs an orthogonal transformation process (e.g., an orthogonal transformation process, such as a DCT (discrete cosine transform), a DST (discrete sine transform), or a KL transform in which bases are designed for a specific learning sequence in advance) on the prediction difference signal $e_i^n$ on a per transformation block basis, to calculate transform coefficients.

The transformation/quantization unit 7 also refers to the quantization parameter included in the prediction difference coding parameters and quantizes the transform coefficients of each transformation block, and outputs compressed data which are the transform coefficients quantized thereby to the inverse quantization/inverse transformation unit 8 and the variable length encoding unit 13 (step ST7). At that time, the transformation/quantization unit can perform the quantization process by using a quantization matrix for performing scaling on the quantization step size calculated from the above-described quantization parameter for each transform coefficient.

As the quantization matrix, a matrix which is independent for each chrominance signal and for each coding mode (intra encoding or inter encoding) at each orthogonal transformation size can be used, and either the selection of a quantization matrix from a quantization matrix which is prepared, as an initial value, in advance and in common between the image encoding device and the image decoding device and an already-encoded quantization matrix or the use of a new quantization matrix can be selected.

Therefore, the transformation/quantization unit 7 sets flag information showing whether or not to use a new quantization matrix for each chrominance signal and for each coding mode at each orthogonal transformation size to a quantization matrix parameter to be encoded.

In addition, when a new quantization matrix is used, each of the scaling values in the quantization matrix as shown in FIG. 10 is set to the quantization matrix parameter to be encoded.

In contrast, when a new quantization matrix is not used, an index specifying a matrix to be used from a quantization matrix which is prepared, as an initial value, in advance and in common between the image encoding device and the image decoding device and an already-encoded quantization matrix is set to the quantization matrix parameter to be encoded. However, when no already-encoded quantization matrix which can be referred to exists, only a quantization matrix prepared in advance and in common between the image encoding device and the image decoding device can be selected.

The transformation/quantization unit 7 then outputs the quantization matrix parameter set thereby to the variable length encoding unit 13.

When receiving the compressed data from the transformation/quantization unit 7, the inverse quantization/inverse transformation unit 8 refers to the quantization parameter and the transformation block partitioning information which are included in the prediction difference coding parameters determined by the encoding controlling unit 2, and inverse-quantizes the compressed data on a per transformation block basis.

When the transformation/quantization unit 7 uses a quantization matrix for the quantization process, the inverse quantization/inverse transformation unit refers to the quantization matrix and performs a corresponding inverse quantization process also at the time of the inverse quantization process.

The inverse quantization/inverse transformation unit 8 also performs an inverse orthogonal transformation process (e.g., an inverse DCT, an inverse DST, an inverse KL transform, or the like) on the transform coefficients, which are the compressed data inverse-quantized, on a per transformation block basis, and calculates a local decoding prediction difference signal corresponding to the prediction difference signal $e_i''$ outputted from the subtracting unit 6 and outputs the local decoding prediction difference signal to the adding unit 9 (step ST8).

When receiving the local decoding prediction difference signal from the inverse quantization/inverse transformation unit 8, the adding unit 9 calculates a local decoded image by adding the local decoding prediction difference signal and either the intra prediction image $P_{INTRAi}''$ generated by the intra prediction unit 4 or the inter prediction image $P_{INTERi}''$ generated by the motion-compensated prediction unit 5 (step ST9).

The adding unit 9 outputs the local decoded image to the loop filter unit 11 while storing the local decoded image in the memory 10 for intra prediction.

This local decoded image is an encoded image signal which is used at the time of subsequent intra prediction processes.

When receiving the local decoded image from the adding unit 9, the loop filter unit 11 performs the predetermined filtering process on the local decoded image, and stores the local decoded image filtering-processed thereby in the motion-compensated prediction frame memory 12 (step ST10).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

The loop filter unit 11 determines whether or not to perform the process for each of the above-described filtering processes including the deblocking filtering process, the pixel adaptive offset process, and the adaptive filtering process, and outputs the enable flag of each of the processes, as a part of the sequence level header and a part of the slice level header, to the variable length encoding unit 13. When using two or more of the above-described filtering processes, the loop filter unit performs each of the filtering processes in order. FIG. 11 shows an example of the configuration of the loop filter unit 11 in the case of using a plurality of filtering processes.

In general, while the image quality is improved with increase in the number of types of filtering processes used, the processing load is increased conversely. More specifically, there is a trade-off between the image quality and the processing load. Further, the image quality improving effect of each of the filtering processes differs depending upon the characteristics of the image which is the target for filtering process. Thus, the filtering process to be used can be determined according to the processing load acceptable to the image encoding device and the characteristics of the image on which the encoding process is to be performed.

In the deblocking filtering process, various parameters used for the selection of the intensity of a filter to be applied to a block boundary can be changed from initial values. When changing a parameter, the parameter is outputted to the variable length encoding unit 13 as header information.

In the pixel adaptive offset process, the image is partitioned into a plurality of blocks first, a case of not performing the offset process is defined as one class classifying method for each of the coding blocks, and one class classifying method is selected from among a plurality of class classifying methods which are prepared in advance.

Next, by using the selected class classifying method, each pixel included in the block is classified into one of classes, and an offset value for compensating for a coding distortion is calculated for each of the classes.

Finally, a process of adding the offset value to the brightness value of the local decoded image is performed, thereby improving the image quality of the local decoded image.

As the method of performing a class classification, there are a method (referred to as a BO method) of classifying each pixel into one of classes according to the brightness value of the local decoded image, and a method (referred to as an EO method) of classifying each pixel into one of classes according to the state of a neighboring region around the pixel (e.g., whether or not the neighboring region is an edge portion) for each of the directions of edges.

These methods are prepared in common between the image encoding device and the image decoding device. For example, as shown in FIG. 14, the case of not performing the offset process is defined as one class classifying method, and an index indicating which one of these methods is to be used to perform the class classification is selected for each of the above-described blocks.

Therefore, in the pixel adaptive offset process, the block partitioning information, the index indicating the class classifying method for each block, and the offset information for each block are outputted to the variable length encoding unit 13 as header information.

In the pixel adaptive offset process, for example, the image can be always partitioned into blocks each having a fixed size, such as largest coding blocks, and a class classifying method can be selected for each of the blocks and the adaptive offset process for each class can be performed. In this case, the need for the above-described block partitioning information can be eliminated, the code amount can be reduced by the code amount required for the block partitioning information, and the coding efficiency can be improved.

Further, in the adaptive filtering process, a class classification is performed on the local decoded image by using a predetermined method, a filter for compensating for a distortion piggybacked on the image is designed for each region (local decoded image) belonging to each class, and the process of filtering this local decoded image is performed by using the filter.

The filter designed for each class is then outputted to the variable length encoding unit 13 as header information.

As the class classifying method, there are a simple method of partitioning the image into equal parts spatially and a method of performing a classification on a per block basis according to the local characteristics (a variance and so on) of the image. Further, the number of classes used in the adaptive filtering process can be set in advance to be a value common between the image encoding device and the image decoding device, or can be set as a parameter to be encoded.

While the image quality improving effect in the latter case is enhanced as compared with that in the former case because the number of classes used in the latter case can be set freely, the code amount is increased by that required for the number of classes because the number of classes is encoded.

The video encoding device repeatedly performs the processes of steps ST3 to ST9 until the video encoding device completes the processing on all the coding blocks $B^n$ into which the inputted image is partitioned hierarchically, and, when completing the processing on all the coding blocks $B^n$, shifts to a process of step ST13 (steps ST11 and ST12).

The variable length encoding unit 13 variable-length-encodes the compressed data outputted from the transformation/quantization unit 7, the block partitioning information about the inside of each largest coding block, which is outputted from the encoding controlling unit 2 (the quadtree information which is shown in FIG. 6(b) as an example), the coding mode $m(B^n)$ and the prediction difference coding parameters, the intra prediction parameter (when the coding mode is an intra coding mode) or the inter prediction parameter (when the coding mode is an inter coding mode) which is outputted from the encoding controlling unit 2, and the motion vector outputted from the motion-compensated prediction unit 5 (when the coding mode is an inter coding mode), and generates encoded data showing those encoded results (step ST13).

At that time, as a method of encoding the compressed data which are the quantized orthogonal transformation coefficients, each transformation block is further partitioned into blocks (coding sub-blocks) of 4×4 pixels each of which is called a Coefficient Group (CG), and a process of encoding the coefficients is performed on a per CG basis.

Figure 15:
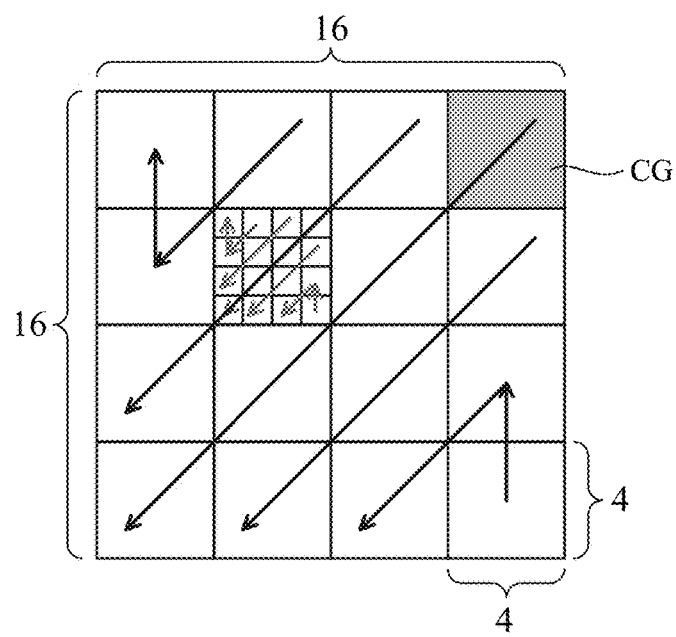
FIG. 15 is an explanatory drawing showing the encoding order of transform coefficients in orthogonal transformation on a size of 16×16 pixels.

FIG. 15 shows the order (scanning order) of encoding the coefficients in each 16×16 pixel transformation block.

A process of encoding 16 CGs of 4×4 pixels is performed in order from the CG at the lower right corner in this way, and the 16 coefficients in each CG are further encoded in order from the coefficient at the lower right corner.

Concretely, flag information showing whether a significant (non-zero) coefficient exists in the 16 coefficients in the CG is encoded first, whether or not each coefficient in the CG is a significant (non-zero) coefficient is then encoded in the above-described order only when a significant (non-zero) coefficient exists in the CG, and, for each significant (non-zero) coefficient, information about its coefficient value is finally encoded in order. This process is performed in the above-described order on a per CG basis.

At that time, it is preferable to configure the scanning order in such a way that significant (non-zero) coefficients appear as consecutively as possible, thereby being able to improve the coding efficiency according to the entropy encoding.

Figure 16:
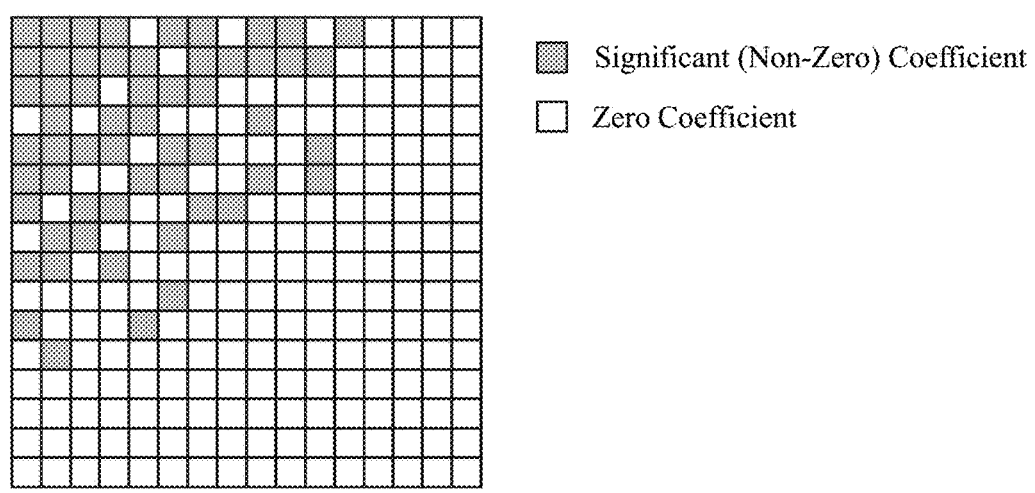
FIG. 16 is an explanatory drawing showing an example of the distribution of transform coefficients in orthogonal transformation on a size of 16×16 pixels.

Because the coefficients after orthogonal transformation, starting with the dc component located at the upper left corner, represent the coefficients of components having a frequency which decreases as they approach the upper left corner, and therefore, in general, significant (non-zero) coefficients appear more frequently as they approach the upper left corner, as shown in the example shown in FIG. 16, the coefficients can be encoded efficiently by encoding them in order from the coefficient at the lower right corner, as shown in FIG. 15.

Although 16×16 pixel transformation blocks are explained in the above-described example, an encoding process for each CG (coding sub-block) is assumed to be performed also on transformation blocks having a block size other than 16×16 pixels, such as 8×8 or 32×32 pixel transformation blocks.

The variable length encoding unit 13 also encodes sequence level headers and picture level headers, as the header information of an encoded bitstream, as illustrated in FIG. 13, and generates an encoded bitstream as well as picture data.

Picture data consists of one or more slice data, and each slice data is a combination of a slice level header and encoded data as mentioned above in the slice currently being processed.

A sequence level header is generally a combination of pieces of header information which are common on a per sequence basis, the pieces of header information including the image size, the chrominance signal format, the bit depths of the signal values of the luminance signal and the color difference signals, and the enable flag information about each of the filtering processes (the adaptive filtering process, the pixel adaptive offset process, and the deblocking filtering process) which are performed on a per sequence basis by the loop filter unit 11, the enable flag information of the quantization matrix, a flag showing whether or not field encoding is performed, and so on.

A picture level header is a combination of pieces of header information which are set on a per picture basis, the pieces of header information including an index of a sequence level header to be referred to, the number of reference pictures at the time of motion compensation, a probability table initialization flag for entropy coding, and so on.

A slice level header is a combination of parameters which are set on a per slice basis, the parameters including position information showing at which position of the picture the slice currently being processed exists, an index indicating which picture level header is to be referred to, the coding type of the slice (all intra coding, inter coding, or the like), the flag information showing whether or not to perform each of the filtering processes in the loop filter unit 11 (the adaptive filtering process, the pixel adaptive offset process, and the deblocking filtering process), and so on.

Next, the process performed by the intra prediction unit 4 will be explained in detail.

The intra prediction unit 4 refers to the intra prediction parameter of each prediction block $P_i^n$ and performs the intra prediction process on the prediction block $P_i^n$ to generate an intra prediction image $P_{INTRAi}^n$, as mentioned above. Hereafter, an intra process of generating an intra prediction image of each prediction block $P_i^n$ in the luminance signal will be explained.

Figure 7:
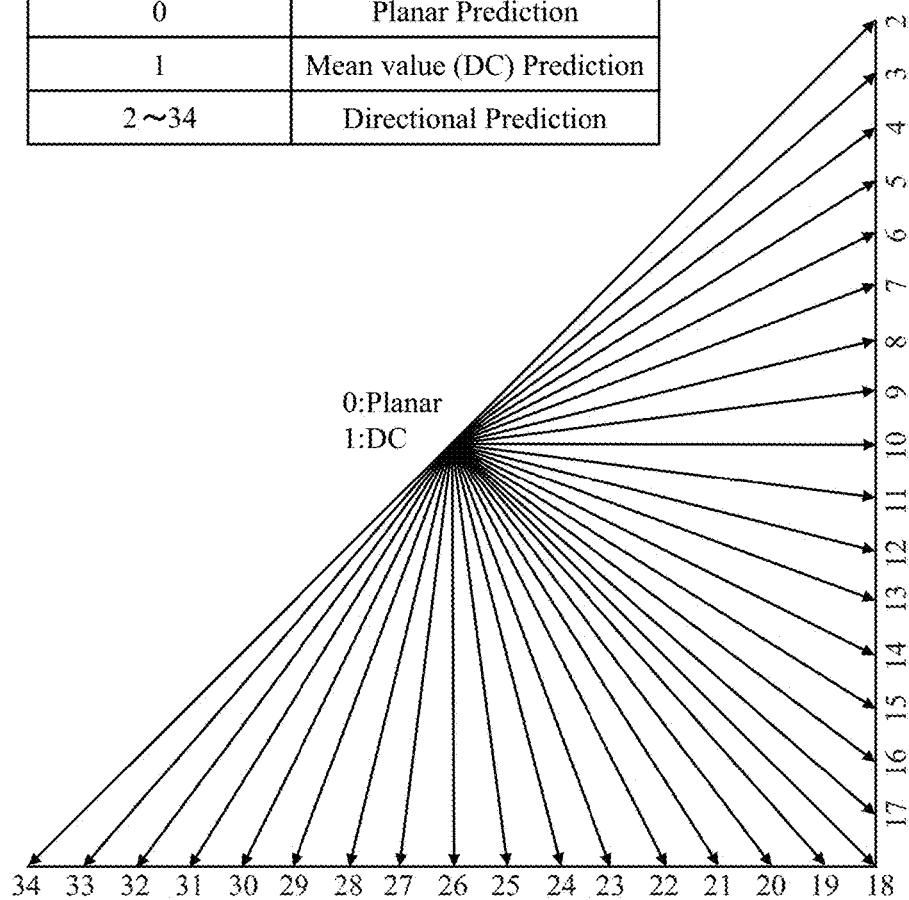
FIG. 7 is an explanatory drawing showing an example of an intra prediction intra prediction mode which can be selected for each prediction block $P_i^n$ in a coding block B"

FIG. 7 is an explanatory drawing showing an example of intra prediction modes each of which can be selected for each prediction block $P_i^n$ in the coding block $B^n$, and shows the index values of the intra prediction modes and prediction direction vectors respectively indicated by the intra prediction modes. The index value of each of the above-described intra prediction modes shows the intra prediction parameter.

The number of intra prediction modes can be configured to differ according to the size of the block which is the target for processing.

By providing a configuration in which the number of intra prediction directions which can be selected is made to be small for a block having a larger size because the efficiency of intra prediction degrades whereas the number of intra prediction directions which can be selected is made to be large for a block having a smaller size, the amount of computations can be suppressed.

First, because the process of generating an intra prediction image employs an already-encoded pixel adjacent to the block which is the target for processing, the process must be performed on a per transformation block basis, as mentioned above.

Hereafter, a transformation block for which an intra prediction image is to be generated is referred to as a prediction image generation block. Therefore, the intra prediction unit 4 performs an intra prediction image generating process, which will be mentioned blow, on a per prediction image to generation block basis, to generate an intra prediction image of the prediction block $P_i^n$.

It is assumed that the size of a prediction image generation block is $l_i^n \times m_i^n$ pixels.

Figure 8:
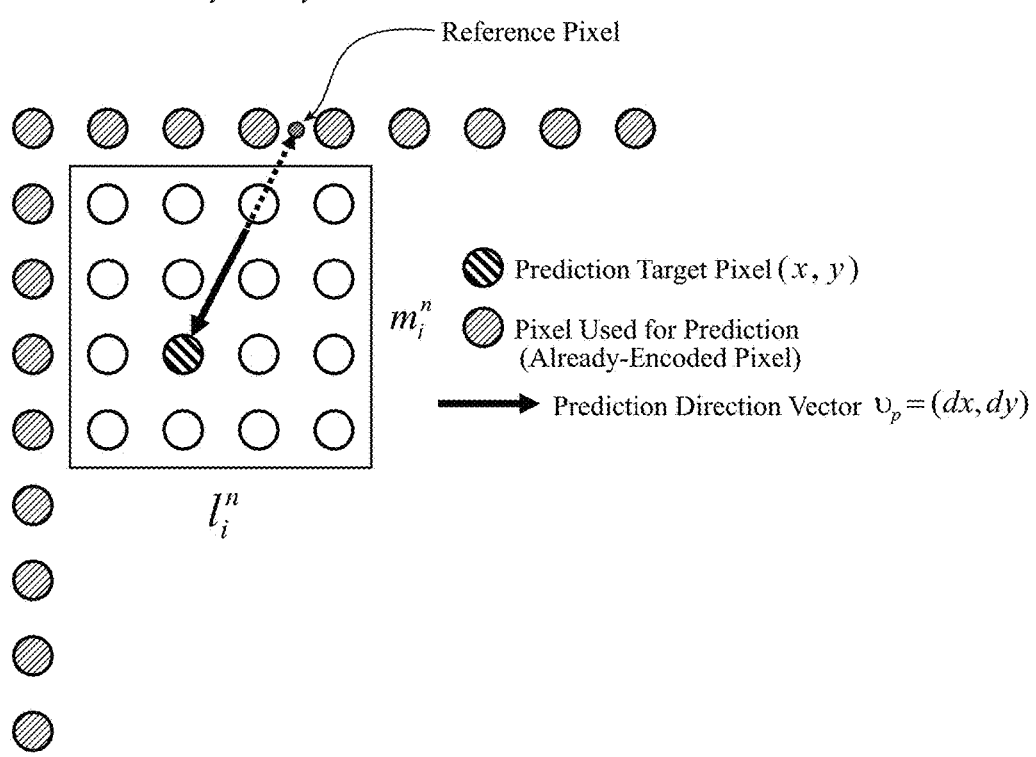
FIG. 8 is an explanatory drawing showing an example of pixels which are used when generating a predicted value of each pixel in a prediction image generation block in the case of $l_i^n = m_i^n = 4$.

FIG. 8 is an explanatory drawing showing an example of pixels which are used when generating a predicted value of each pixel in the prediction image generation block in the case of $l_i^n = m_i^n = 4$.

Although $(2 \times l_i^n + 1)$ already-encoded pixels located on the top of the prediction image generation block and $(2 \times m_i^n)$ already-encoded pixels located to the left of the prediction image generation block are set as the pixels used for prediction in the example of FIG. 8, the number of pixels used for prediction can be larger or smaller than that of the pixels shown in FIG. 8.

Further, although one row or column of pixels adjacent to the prediction image generation block are used for prediction in the example shown in FIG. 8, two or more rows or columns of pixels can be alternatively used for prediction.

When the index value indicating the intra prediction mode for the prediction block $P_i^n$ to which the prediction image generation block belongs is 0 (planar prediction), by using already-encoded pixels adjacent to the top of the prediction image generation block and already-encoded pixels adjacent to the left of the prediction image generation block, the intra prediction unit determines a value interpolated according to the distances between these pixels and the target pixel for prediction in the prediction image generation block as a predicted value and generates a prediction image.

When the index value indicating the intra prediction mode for the prediction block $P_i^n$ to which the prediction image generation block belongs is 1 (mean value (DC) prediction), the intra prediction unit determines the mean value of the already-encoded pixels adjacent to the top of the prediction image generation block and the already-encoded pixels adjacent to the left of the prediction image generation block as the predicted value of each pixel in the prediction image generation block and generates a prediction image.

Figure 17:
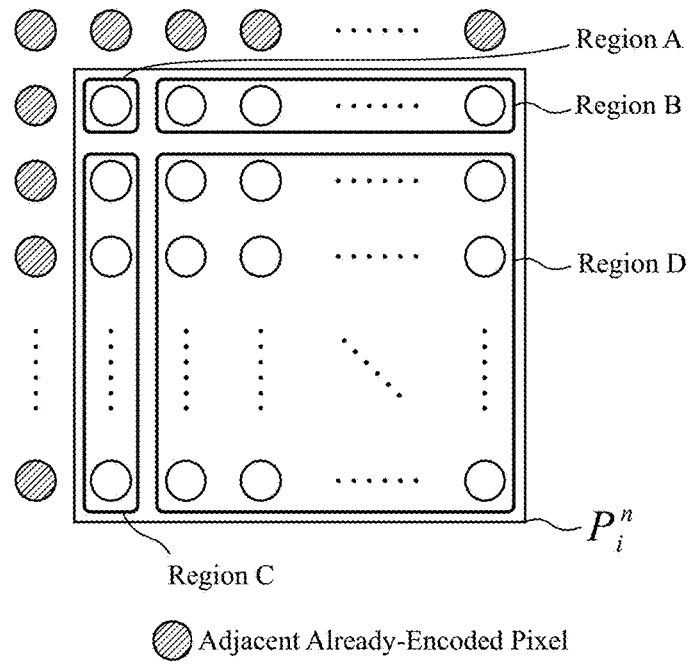
FIG. 17 is an explanatory drawing showing regions for which switching of filters is performed in a filtering process at the time of a mean value prediction.
Figure 18:
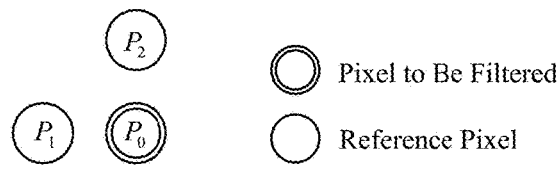
FIG. 18 is an explanatory drawing showing the arrangement of reference pixels in the filtering process at the time of the mean value prediction.

In addition, a filtering process of smoothing a block boundary is performed on regions A, B, and C of FIG. 17 located at the upper edge and at the left edge of the prediction image generation block, and a final prediction image is generated. For example, in the case of the arrangement, as shown in FIG. 18, of reference pixels of the filter, according to the following equation (1), the filtering process is performed by using the following filter coefficients.

$$S'(p_0) = a_0 S(p_0) + a_1 S(p_1) + a_2 S(p_2) \quad (1)$$

Region A (the pixel at the upper left corner of the partition $P_i^n$)
$a_0 = \frac{1}{2}$, $a_1 = \frac{1}{4}$, $a_2 = \frac{1}{4}$ Region B (the pixels at the upper edge of the partition $P_i^n$, except the region A)
$a_0 = \frac{3}{4}$, $a_2 = \frac{1}{4}$, ($a_1 = 0$)

Region C (the pixels at the left edge of the partition $P_i^n$, except the region A)
$a_0 = \frac{3}{4}$, $a_1 = \frac{1}{4}$, ($a_2 = 0$)

In the equation (1), $a_n$ (n=0, 1, 2) denotes the filter coefficient by which each reference pixel is multiplied, $p_n$ (n=0, 1, 2) denotes each reference pixel of the filter, including the target pixel $p_0$ for filtering process, $S'(p_0)$ denotes the predicted value after the filtering process in the target pixel $p_0$ for filtering process, and $S(p_n)$ (n=0, 1, 2) denotes the predicted value before the filtering process of each reference pixel including the target pixel $p_0$ for filtering process.

In addition, the block size of the prediction image generation block on which the above-described filtering process is to be performed can be limited.

In general, because when the filtering process is performed only on a block edge to change the predicted value, a block having a large block size has a small ratio of occupation of a region in which the predicted value varies due to the filtering process, a change of a prediction residual signal which is caused by this variation in the predicted value is expressed by a very high frequency component, and there is a tendency that degradation of the coding efficiency is caused because of the encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, instead of applying the above-described filtering process to prediction image generation blocks having a block size of 32×32 pixels or more, applying the above-described filtering process only to blocks having a size smaller than 32×32 pixels, increase in the amount of computations can be suppressed while improving the prediction performance as compared with that of the conventional mean value prediction.

In addition, the block size of the prediction image generation block on which the above-described filtering process is to be performed can be limited according to the transformation block size.

For example, the above-described filtering process is not applied to prediction image generation blocks having a block size equal to or larger than max(16, MaxTUsize), but the above-described filtering process is applied only to blocks having a size smaller than max(16, MaxTUsize).

max($\alpha$, $\beta$) shows the maximum of $\alpha$ and $\beta$ (e.g., when $\alpha=1$ and $\beta=2$, max($\alpha$, $\beta$)=2), "MaxTUsize" shows the largest transformation block size which each transformation block can have, and "16" shows a predetermined block size (16×16 pixels).

More specifically, in the case of not applying the above-described filtering process to prediction image generation blocks having a block size equal to or larger than max (16, MaxTUsize), but applying the above-described filtering process only to blocks having a size smaller than max(16, MaxTUsize), when MaxTUsize is 32, max(16, 32)=32 and therefore the prevention of the application of the above-described filtering process is performed only on 32×32 pixel blocks while the above-described filtering process is performed on 16×16 pixel blocks, 8×8 pixel blocks, and 4×4 pixel blocks.

Similarly, when MaxTUsize is 16, max(16, 16)=16, and therefore the prevention of the application of the above-described filtering process is performed only on 16×16 pixel blocks while the above-described filtering process is performed on 8×8 pixel blocks and 4×4 pixel blocks.

In addition, when MaxTUsize is 8, max(16, 8)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 8 at which no 16×16 pixel block exists, the above-described filtering process is performed on all the pixel blocks (8×8 and 4×4).

Similarly, when MaxTUsize is 4, max(16, 4)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 4 at which only 4×4 pixel blocks exist, the above-described filtering process is performed on all the pixel blocks (4×4).

By doing in this way, because an orthogonal transformation process with as large a size as possible is typically performed on, for example, a flat region, such as a "sky" region when performing efficient encoding, a transformation process with a block size of MaxTUsize is performed on such a region.

On the other hand, because there is a tendency that in such a large block, the filtering process causes a distortion at a block boundary of the decoded image, as described above, the filtering process is prevented from being performed on a flat portion in which the sensitivity is particularly high as a human being's visual sense characteristic, in order to suppress such a distortion, and the above-described filtering process is performed on a block having a small block size, such as a complicated region in which there is a tendency that a reduction of the block size makes it possible to perform the encoding efficiently, so that there is provided an advantage of improving the prediction efficiency and improving the quality of the decoded image.

Figure 19:
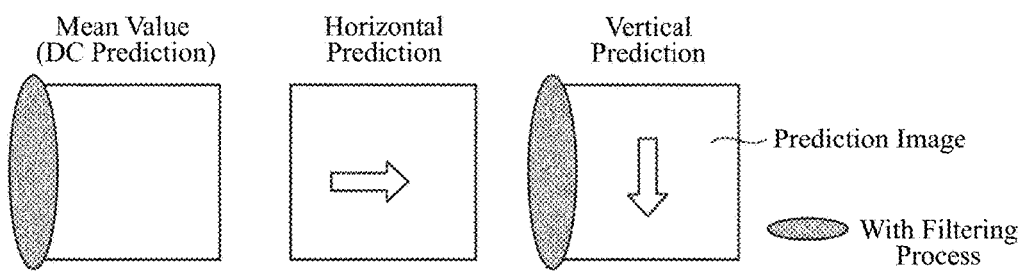
FIG. 19 is an explanatory drawing showing a filtering process on an intra prediction image at the time of field encoding.

In addition, when a flag showing whether or not the field encoding is performed is provided for each sequence level header and the above-described flag is valid, the filtering process is not performed on the upper edge of the prediction image generation block, as shown in FIG. 19.

In the case of the field encoding, there is a possibility that because the correlation between pixels in the vertical direction is low, the prediction efficiency gets worse due to the filtering process on the upper edge of the prediction image generation block. Therefore, by performing the filtering process only on the regions A and C, and preventing the filtering process from being performed on the region B, the amount of computations can be reduced while a reduction of the prediction efficiency is prevented.

Although in the above-described example, the filtering process is performed only on the regions A and C when the flag of a sequence level header showing whether or not the field encoding is performed is valid, the same filtering process as that on the region C can be performed also on the region A. Thus, by not using pixels in the vertical direction having a low correlation between the pixels, the possibility of reduction of the prediction efficiency can be further lowered while the amount of computations required for the filtering process can be reduced. As an alternative, when attaching importance to a further reduction of the amount of computations, no filtering process can be performed also on the region A and the filtering process can be performed only on the region C.

When the index value indicating the intra prediction mode for the prediction block $P_i^n$ to which the prediction image generation block belongs is 26 (vertical prediction), the intra prediction unit calculates the predicted value of each pixel in the prediction image generation block according to the following equation (2), and generates a prediction image.

$$S'(x, y) = \begin{cases} S(x, -1) + (S(-1, y) - S(-1, -1)) \gg 1 & (x \le 0) \\ S(x, -1) & (x > 0) \end{cases} \quad (2)$$

In this equation, coordinates (x, y) are relative coordinates (refer to FIG. 9) acquired with the pixel at the to upper left corner in the prediction image generation block being defined as the point of origin, S' (x, y) is the predicted value at the coordinates (x, y), and S (x, y) is the brightness value (decoded brightness value) of the already-encoded pixel at the coordinates (x, y). Further, when the calculated predicted value exceeds a range of values which the brightness value can have, the predicted value is rounded in such a way as to fall within the range.

An expression in the first line of the equation (2) means that by adding a value which is one-half of the amount of change (S (−1, y)−S (−1, −1)) in the vertical direction of the brightness values of adjacent already-encoded pixels to S (x, −1) which is the predicted value acquired by the vertical prediction in MPEG-4 AVC/H.264, the filtering process is performed in such a way that a block boundary is smoothed, and an expression in the second line of the equation (2) shows the same prediction expression as that for the vertical prediction in MPEG-4 AVC/H.264.

When the index value indicating the intra prediction mode for the prediction block $P_i^n$ to which the prediction image generation block belongs is 10 (horizontal prediction), the intra prediction unit calculates the predicted value of each pixel in the prediction image generation block according to the following equation (3), and generates a prediction image.

$$S'(x, y) = \begin{cases} S(-1, y) + (S(x, -1) - S(-1, -1)) \gg 1 & (y \le 0) \\ S(-1, y) & (y > 0) \end{cases} \quad (3)$$

In this equation, coordinates (x, y) are relative coordinates (refer to FIG. 9) acquired with the pixel at the upper left corner in the prediction image generation block being defined as the point of origin, S'(x, y) is the predicted value at the coordinates (x, y), and S (x, y) is the brightness value (decoded brightness value) of the already-encoded pixel at the coordinates (x, y). Further, when the calculated predicted value exceeds a range of values which the brightness value can have, the predicted value is rounded in such a way as to fall within the range.

An expression in the first line of the equation (3) means that by adding a value which is one-half of the amount of change (S(x, −1)−S(−1, −1)) in the horizontal direction of the brightness values of adjacent already-encoded pixels to S (−1, y) which is the predicted value acquired by the horizontal prediction in MPEG-4 AVC/H.264, the filtering process is performed in such a way that a block boundary is smoothed, and an expression in the second line of the equation (3) shows the same prediction expression as that for the horizontal prediction in MPEG-4 AVC/H.264.

The block size of the prediction image generation block on which the vertical prediction according to the equation (2) and the horizontal prediction according to the equation (3) are to be performed can be limited.

In general, because when a filtering process of adding a value proportional to the amount of change of the brightness value in the prediction direction is performed only on a block edge so as to change the predicted value, a block having a large block size has a small ratio of occupation of a region in which the predicted value varies due to the above-described filtering process on the block edge of the prediction image generation block, a change of the prediction residual signal which is caused by this variation in the predicted value is expressed by a very high frequency component, and there is a tendency that degradation of the coding efficiency is caused because of encoding of this high frequency component. Further, when preventing this high frequency component from being encoded while giving a priority to the coding efficiency, there is a tendency that a change of the prediction residual signal of a block edge cannot be restored and a distortion is caused at a block boundary.

On the other hand, because a block having a small block size has a large ratio of occupation of a region in which the predicted value varies due to the filtering process, a change of the prediction residual signal which is caused by this variation in the predicted value is not expressed by such a high frequency component as mentioned at the time of a block having a large block size, and the residual signal can be encoded appropriately and the quality of the decoded image can be improved by such an extent that the continuity of a block boundary is improved by using this filtering process.

Accordingly, for example, by, for a prediction image generation block having a block size of 32×32 pixels or more, always using the expressions in the second lines of the equations (2) and (3) regardless of the coordinates of the target pixel for prediction (not performing the filtering process on the block edges of the prediction image generation block), and applying the equations (2) and (3) according to which the above-described filtering process is performed only to blocks having a size smaller than 32×32 pixels, increase in the amount of computation can be suppressed while improving the prediction performance as compared with those of the conventional vertical and horizontal predictions.

In addition, the block size of the prediction image generation block on which the vertical prediction according to the equation (2) and the horizontal prediction according to the equation (3) are to be performed can be limited according to the transformation block size.

For example, for a prediction image generation block having a block size equal to or larger than max (16, MaxTUsize), the expressions in the second lines of the equations (2) and (3) are always used regardless of the coordinates of the target pixel for prediction (the filtering process on the block edges of the prediction image generation block is not performed), and the equations (2) and (3) according to which the above-described filtering process is performed are applied only to blocks having a size smaller than max (16, MaxTUsize).

max($\alpha$, $\beta$) shows the maximum of $\alpha$ and $\beta$ (e.g., when $\alpha$=1 and $\beta$=2, max($\alpha$, $\beta$)=2), "MaxTUsize" shows the largest transformation block size which each transformation block can have, and "16" shows a predetermined block size (16×16 pixels).

More specifically, in the case of not applying the above-described filtering process to prediction image generation blocks having a block size equal to or larger than max (16, MaxTUsize), but applying the above-described filtering process only to blocks having a size smaller than max(16, MaxTUsize), when MaxTUsize is 32, max(16, 32)=32 and therefore the prevention of the application of the above-described filtering process is performed only on 32×32 pixel blocks while the above-described filtering process is performed on 16×16 pixel blocks, 8×8 pixel blocks, and 4×4 pixel blocks.

Similarly, when MaxTUsize is 16, max(16, 16)=16, and therefore the prevention of the application of the above-described filtering process is performed only on 16×16 pixel blocks while the above-described filtering process is performed on 8×8 pixel blocks and 4×4 pixel blocks.

In addition, when MaxTUsize is 8, max(16, 8)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 8 at which no 16×16 pixel block exists, the above-described filtering process is performed on all the pixel blocks (8×8 and 4×4).

Similarly, when MaxTUsize is 4, max(16, 4)=16, and therefore the prevention of the application of the above-described filtering process is performed only on 16×16 pixel blocks while the above-described filtering process is performed on 8×8 pixel blocks and 4×4 pixel blocks. Therefore, when MaxTUsize is 4 at which only 4×4 pixel blocks exist, the above-described filtering process is performed on all the pixel blocks (4×4).

By doing in this way, because an orthogonal transformation process with as large a size as possible is typically performed on a flat region, such as a "sky" region, for example, when performing efficient encoding, a transformation process with a block size of MaxTUsize is performed on such a region.

On the other hand, because there is a tendency that in such a large block, the filtering process causes a distortion at a block boundary of the decoded image, as mentioned above, the filtering process is prevented from being performed on a flat portion in which its sensitivity is particularly high as a human being's visual sense characteristic, in order to suppress such a distortion, and, by performing the above-described filtering process on a block having a small block size, such as a complicated region in which there is a tendency that reduction of the block size makes it possible to perform the encoding efficiently, there is provided an advantage of improving the prediction efficiency and improving the quality of the decoded image.

Although the above-described operation is explained as to the case of the mean value prediction, the case of the horizontal prediction, and the case of the vertical prediction, the same advantages can be provided also when a prediction other than these predictions is used.

In addition, when the flag showing whether or not the field encoding is performed is provided for each sequence level header and the above-described flag is valid, an equation (4) is used, instead of the equation (3), for the horizontal prediction.

$$S'(x,y)=S(-1,y) \quad (4)$$

More specifically, the filtering process is prevented from being performed on the upper edge of the prediction image generation block (in the case of the mean value prediction and the vertical prediction, the filtering process is performed only on the left edge of the prediction image generation block, whereas in the case of the horizontal prediction, the filtering process is not performed), as shown in FIG. 19.

In the case of the field encoding, there is a possibility that because the correlation between pixels in the vertical direction is low, the prediction efficiency gets worse due to an improvement of the continuity of a block boundary which is caused by the filtering process on the upper edge of the prediction image generation block. Accordingly, by not performing the above-described filtering process, the amount of computations can be reduced while a reduction of the prediction efficiency is prevented.

The flag of a sequence level header showing whether or not the field encoding is performed can be prepared in each picture level header, and the ON/OFF switching of the filtering process on the upper edge of the prediction image generation block in the mean value (DC) prediction and in the horizontal prediction can be performed according to the correlation between pixels in the vertical direction of each picture.

By doing in this way, adaptive control on a per picture basis can be implemented, and the coding efficiency can be improved. It is necessary to prepare the above-described flag in each picture level header when implementing the encoding of adaptively switching between the frame encoding and the field encoding on a per picture basis.

Further, although the case in which the ON/OFF of the filtering process on the upper edge of the prediction image generation block is switched on the basis of the flag of a sequence level header or a picture level header showing whether or not the field encoding is performed is explained in this Embodiment 1, a flag showing whether or not this switching process is performed can be defined independently from the flag of a sequence level header or a picture level header showing whether or not the field encoding is performed, and the ON/OFF of the filtering process on the upper edge of the prediction image generation block can be switched on the basis of this flag showing whether or not the switching process is performed.

Further, although the changing of the encoding order explained previously and the above-described switching of the filtering process are explained separately in this Embodiment 1, these processes can be combined and configured.

When the index value indicating an intra prediction mode is other than 0 (planar prediction), 1 (mean value prediction), 26 (vertical prediction), and 10 (horizontal prediction), the intra prediction unit generates the predicted value of each pixel in the prediction image generation block on the basis of the prediction direction vector $\upsilon_p=(dx, dy)$ shown by the index value.

As shown in FIG. 9, when the relative coordinates of each pixel in the prediction image generation block are expressed as (x, y) with the pixel at the upper left corner of the prediction image generation block being defined as the point of origin, each reference pixel which is used for prediction is located at a point of intersection of L shown below and an adjacent pixel.

$$L = \begin{pmatrix} x \\ y \end{pmatrix} + kv_p \quad (5)$$

where k is a negative real number.

When a reference pixel is at an integer pixel position, the value of the integer pixel is determined as the predicted value of the target pixel for prediction, whereas when a reference pixel is not at an integer pixel position, the value of an interpolation pixel generated from integer pixels which are adjacent to the reference pixel is determined as the predicted value.

In the example shown in FIG. 8, because a reference pixel is not located at an integer pixel position, the predicted value is interpolated from the values of two pixels adjacent to the reference pixel. The intra prediction unit can use, instead of only the adjacent two pixels, adjacent two or more pixels to generate an interpolation pixel and determine the value of this interpolation pixel as the predicted value.

While the increase in the number of pixels used for the interpolation process provides an advantage of improving the accuracy of interpolation of an interpolation pixel, because the degree of complexity of computations required for the interpolation process increases, it is preferable to generate an interpolation pixel from a larger number of pixels in a case in which the image encoding device requires high encoding performance even if the arithmetic load is large.

Through the process described above, the intra prediction unit generates prediction pixels for all the pixels of the luminance signal in the prediction block $P_i^n$ on a per prediction image generation block basis, and outputs an intra prediction image $P_{INTRAi}^n$.

The intra prediction parameter (intra prediction mode) used for the generation of the intra prediction image $P_{INTRAi}^n$ is outputted to the variable length encoding unit 13 in order to multiplex the intra prediction parameter into the bitstream.

Like in the case of performing a smoothing process on a reference pixel at the time of performing an intra prediction on an 8×8 pixel block in MPEG-4 AVC/H.264 explained previously, even if the intra prediction unit 4 is configured in such a way that an already-encoded pixel adjacent to the prediction image generation block on which a smoothing process is performed is provided as the reference pixel at the time of generating a prediction image of the prediction image generation block, the filtering process which is the same as that in the above-described example can be performed on the prediction image. By doing in this way, the noise of the reference pixel which is caused by the filtering process on the reference pixel can be removed, and the accuracy of the prediction can be improved by performing the prediction by using this configuration.

As an alternative, the above-described filtering process on the reference pixel can be configured to be performed only at the time of a prediction including the step of performing the filtering process on the prediction image, other than the mean value prediction, the vertical prediction, and the horizontal prediction. By doing in this way, the intra prediction unit has only to perform one filtering process at the maximum for each prediction mode, and the increase in the amount of computations can be suppressed.

Although the process of generating a prediction image of the luminance signal is explained above, prediction images for the color difference components are generated as follows.

The intra prediction unit performs an intra prediction process based on the intra prediction parameter (intra prediction mode) of the color difference signals on the color difference signals of the prediction block $P_i''$, and outputs the intra prediction parameter used for the generation of the intra prediction image to the variable length encoding unit 13.

FIG. 23 is an explanatory drawing showing an example of a correspondence between the intra prediction parameter (index value) and a color difference intra prediction mode of the color difference signals.

When the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal, to generate prediction images of the color difference signals.

Further, when the intra prediction parameter of the color difference signals shows the vertical prediction mode or the horizontal prediction mode, the intra prediction unit performs a directional prediction on the color difference signals to generate prediction images of the color difference signals.

Further, when the intra prediction parameter of the color difference signal shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

The intra prediction unit can be configured to perform the process in the above-described DM mode or the above-described LM mode and prevent itself from selecting another prediction mode when the input signal format is the YUV4:4:4 signal format. Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

As a matter of course, the intra prediction unit can be configured to select, for the color difference signals, a directional prediction mode different from that for the luminance signal also in the case of a YUV4:4:4 signal.

Further, when the input signal format is the YUV4:2:2 signal format, if the luminance signal is a square block, as shown in FIG. 27, each of the color difference signals is a rectangular block in which the number of pixels in the horizontal direction is half as compared with that of the luminance signal. Therefore, in order to apply a prediction in the same direction to the luminance signal and the color difference signals when a YUV4:4:4 signal is converted into a YUV4:2:2 signal, as shown in FIG. 28, the prediction direction of the color difference signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the color difference signals is expressed by $v_C=(dx_L/2, dy_L)$. More specifically, when the angle of the prediction direction is expressed by theta, as shown in FIG. 30, it is necessary to perform a prediction in a prediction direction having a relation shown by $\tan \theta_C = 2 \tan \theta_L$, where the angle of the prediction direction of the luminance signal is expressed by $\theta_L$ and the angle of the prediction direction of each of the color difference signals is expressed by $\theta_C$.

Therefore, in order to make it possible to correctly perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index.

FIG. 31 shows an example of the conversion of the intra prediction mode index in the intra prediction mode of FIG. 7.

The conversion table of FIG. 31 is an example of a table for performing conversion into an angle $\theta_C$ which is the closest to the following relation: $\tan \theta_C = 2 \tan \theta_L$ in the case of an angle at which the directional prediction in the intra prediction mode is given by $\tan \theta$ shown in FIG. 32, where the angle of the prediction direction is expressed by theta (refer to FIG. 30).

The implementation of the conversion process can be configured in such a way that a conversion table for the index is prepared and the intra prediction unit converts the index by referring to the conversion table, as described above, or a conversion equation is prepared and the intra prediction unit converts the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

Further, the intra prediction unit can be configured in such a way as to prevent itself from performing the above-described LM mode on the color difference signals. As an example of the correspondence between the intra prediction parameter (index value) and the color difference intra prediction mode of the color difference signals at that time, an example of FIG. 24 is provided.

Because by thus configuring the intra prediction unit in such a way as not to use the LM mode as well, the dependence between the luminance signal and the color difference signals of the target pixel for prediction is eliminated, parallelization of the prediction process on the luminance signal and that on the color difference signals is enabled, and high-speed arithmetic processing can be implemented.

In addition, as to the vertical prediction and the horizontal prediction on the color difference signals, the same prediction method as that in MPEG-4 AVC/H.264 can be used without performing the filtering process on a block boundary. By not performing the filtering process in this way, a reduction of the amount of computations of the prediction process can be achieved.

Next, the processing performed by the image decoding device shown in FIG. 3 will be explained concretely.

When receiving the encoded bitstream generated by the image encoding device of FIG. 1, the variable length decoding unit 31 performs the variable length decoding process on the bitstream (step ST21 of FIG. 4), and decodes the header information (sequence level header) about each sequence which consists of one or more frames of pictures and the header information (picture level header) about each picture, the filter parameter for use in the loop filter unit 38, and the quantization matrix parameter.

At that time, when the enable flag information of the quantization matrix included in the above-described header information shows "enabled", the variable length decoding unit 31 variable-length-decodes the quantization matrix parameter and specifies the quantization matrix.

Concretely, for each chrominance signal and for each coding mode at each orthogonal transformation size, when the quantization matrix parameter shows that either a quantization matrix which is prepared, as an initial value, in advance and in common between the image encoding device and the image decoding device, or an already-decoded quantization matrix is used (no new quantization matrix is used), the image decoding device refers to the index information included in the quantization matrix parameter and specifying which quantization matrix in the above-described matrices is used, to specify the quantization matrix, and, when the quantization matrix parameter shows that a new quantization matrix is used, specifies, as the quantization matrix to be used, the quantization matrix included in the quantization matrix parameter.

The image decoding device then decodes the header information about each slice (slice level header), such as the slice partitioning information, from each slice data which constructs the data about each picture, and decodes the encoded data about each slice.

The variable length decoding unit 31 also determines the largest coding block size and the upper limit on the number of hierarchical layers partitioned which are determined by the encoding controlling unit 2 of the image encoding device shown in FIG. 1, according to the same procedure as that of the image encoding device (step ST22).

For example, when the largest coding block size and the upper limit on the number of hierarchical layers partitioned are determined according to the resolution of the video signal, the largest coding block size is determined on the basis of the decoded frame size information according to the same procedure as that of the image encoding device.

When the largest coding block size and the upper limit on the number of hierarchical layers partitioned are multiplexed into the sequence level header or the like by the image encoding device, the values decoded from the above-described header are used. When the smallest block size of the coding blocks, instead of the upper limit on the number of hierarchical layers partitioned, is encoded, the upper limit on the number of hierarchical layers partitioned is determined by decoding this size. More specifically, the number of hierarchical layers in the case of partitioning each largest coding block into blocks having the above-described smallest block size is the upper limit on the number of hierarchical layers partitioned.

The variable length decoding unit 31 decodes the partitioning state of a largest coding block as shown in FIG. 6 for each determined largest coding block. On the basis of the decoded partitioning state, the variable length decoding unit determines coding blocks hierarchically (step ST23).

The variable length decoding unit 31 then decodes the coding mode assigned to each coding block. The variable length decoding unit further partitions each coding block into one or more prediction blocks each of which is a unit for prediction process on the basis of the information included in the decoded coding mode, and decodes the prediction parameter assigned to each of the one or more prediction blocks (step ST24).

More specifically, when the coding mode assigned to a coding block is an intra coding mode, the variable length decoding unit 31 decodes the intra prediction parameter for each of the one or more prediction blocks which are included in the coding block and each of which is a unit for prediction process.

In contrast, when the coding mode assigned to a coding block is an inter coding mode, the variable length decoding unit decodes the inter prediction parameter and the motion vector for each of the one or more prediction blocks which are included in the coding block and each of which is a unit for prediction process (step ST24).

The variable length decoding unit 31 further decodes the compressed data (transformed and quantized transform coefficients) for each transformation block on the basis of the transformation block partitioning information included in the prediction difference coding parameters (step ST24).

At that time, the variable length decoding unit performs a process of decoding the coefficients of each CG in the same way that the variable length encoding unit 13 of the image encoding device of FIG. 1 performs the process of encoding the compressed data.

Therefore, as shown in FIG. 15, the variable length decoding unit performs a process of decoding 16 CGs of 4×4 pixels in order from the CG at the lower right corner, and further decodes the 16 coefficients in each CG in order from the coefficient at the lower right corner.

Concretely, the flag information showing whether a significant (non-zero) coefficient exists in the 16 coefficients in the CG is decoded first, whether or not each coefficient in the CG is a significant (non-zero) coefficient is then decoded in the above-described order only when the decoded flag information shows that a significant (non-zero) coefficient exists in the CG, and, for each coefficient showing a significant (non-zero) coefficient, information about the coefficient value is finally decoded in order. This process is performed in the above-described order on a per CG basis.

When the coding mode m(B") variable-length-decoded by the variable length decoding unit 31 is an intra coding mode (when m(B")∈INTRA), the select switch 33 outputs the intra prediction parameter of each prediction block, which is variable-length-decoded by the variable length decoding unit 31, to the intra prediction unit 34.

In contrast, when the coding mode m (B") variable-length-decoded by the variable length decoding unit 31 is an inter coding mode (when m(B")∈INTER), the select switch outputs the inter prediction parameter and the motion vector of each prediction block, which are variable-length-decoded by the variable length decoding unit 31, to the motion compensation unit 35.

When the coding mode m (B") variable-length-decoded by the variable length decoding unit 31 is an intra coding mode (m(B")∈INTRA) (step ST25), the intra prediction unit 34 receives the intra prediction parameter of each prediction block outputted from the select switch 33, and performs an intra prediction process on each prediction block $P_i^n$ in the coding block B" using the above-described intra prediction parameter while referring to the decoded image stored in the memory 37 for intra prediction, to generate an intra prediction image $P_{INTRAi}''$ according to the same procedure as that of the intra prediction unit 4 shown in FIG. 1 (step ST26).

When the flag showing whether or not the field encoding is performed is provided for the sequence level header decoded by the variable length decoding unit 31 and the above-described flag is valid, the filtering process is prevented from being performed on the upper edge of the prediction image generation block in the mean value (DC) prediction and in the horizontal prediction, like in the case of the image encoding device of FIG. 1. By doing in this way, the same prediction image as that of the encoded bitstream generated by the image encoding device of FIG. 1 can be generated.

When the flag of a sequence level header showing whether or not the field encoding is performed is prepared for a picture level header in the image encoding device of FIG. 1, according to the value of this flag, in this picture level header, showing whether or not the field encoding is performed, the ON/OFF switching of the filtering process on the upper edge of the prediction image generation block in the mean value (DC) prediction and in the horizontal prediction is performed on a per picture basis.

By doing in this way, the same prediction image as that of the encoded bitstream generated by the image encoding device of FIG. 1 which is configured as described above can be generated.

Further, as to the luminance signal, the intra prediction unit 34 performs the intra prediction process (intra-frame prediction process) using the above-described intra prediction parameter on the luminance signal, to generate a prediction image of the luminance signal.

On the other hand, as to the color difference signals, the intra prediction unit performs the intra prediction process based on the intra prediction parameter of the color difference signals, to generate prediction images of the color difference signals.

FIG. 23 is an explanatory drawing showing an example of the correspondence between the intra prediction parameter (index value) and the color difference intra prediction mode of the color difference signals.

When the intra prediction parameter of the color difference signals shows that the same prediction mode as the intra prediction mode for the luminance signal is used (when the intra prediction parameter shows the intra prediction mode common between the luminance and the color differences (DM mode)), the intra prediction unit performs the same intra-frame prediction as that on the luminance signal to generate prediction images of the color difference signals.

Further, when the intra prediction parameter of the color difference signals shows the vertical prediction mode or the horizontal prediction mode, the intra prediction unit performs a directional prediction on the color difference signals to generate prediction images of the color difference signals.

Further, when the intra prediction parameter of the color difference signals shows the color difference signal prediction mode using a luminance correlation (LM mode), the intra prediction unit calculates a correlation parameter showing the correlation between the luminance signal and the color difference signals by using the luminance signals and the color difference signals of a plurality of pixels adjacent to the upper and left sides of a block for which a prediction image is to be generated, and generates prediction images of the color difference signals by using both the correlation parameter and the luminance signal associated with the block of each of the color difference signals which is the target for prediction process.

In the case in which the image encoding device is configured to perform the process in the above-described DM mode or the above-described LM mode and prevent itself from selecting another prediction mode when the input signal format is the YUV4:4:4 signal format, the image decoding device is similarly configured in such a way as to be able to decode the encoded bitstream generated by the image encoding device.

Because there is a high correlation between the edge position of the luminance signal and those of the color difference signals in a YUV4:4:4 signal, by prohibiting the application of a prediction mode different from that applied to the luminance signal to the color difference signals, the amount of information in the intra prediction mode of the color difference signals can be reduced and the coding efficiency can be improved.

Further, when the input signal format is the YUV4:2:2 signal format, if the luminance signal is a square block, as shown in FIG. 27, each of the color difference signals is a rectangular block in which the number of pixels in the horizontal direction is half as compared with that of the luminance signal. Therefore, in order to apply a prediction in the same direction to the luminance signal and the color difference signals when a YUV4:4:4 signal is converted into a YUV4:2:2 signal, as shown in FIG. 28, the prediction direction of the color difference signals is configured to differ from that of the luminance signal on the YUV4:2:2 signal in the case of a directional prediction other than the vertical prediction and the horizontal prediction.

Concretely, when the prediction direction vector of the luminance signal is expressed by $v_L=(dx_L, dy_L)$, as shown in FIG. 29, the prediction direction vector of each of the color difference signals is expressed by $v_C=(dx_L/2, dy_L)$. More specifically, when the angle of the prediction direction is expressed by theta, as shown in FIG. 30, it is necessary to perform a prediction in a prediction direction having a relation shown by $\tan\theta_C=2\tan\theta_L$, where the angle of the prediction direction of the luminance signal is expressed by $\theta_L$ and the angle of the prediction direction of each of the color difference signals is expressed by $\theta_C$.

Therefore, in order to make it possible to correctly perform the above-described DM mode in which a prediction in the same direction is performed on the luminance signal and the color difference signals, when the input signal format is the YUV4:2:2 signal format, the intra prediction unit converts an index of the intra prediction mode which is used for the luminance signal into an index of the intra prediction mode which is used for the prediction on the color difference signals, and performs the prediction process on the color difference signals according to the intra prediction mode corresponding to the converted index.

FIG. 31 shows an example of the conversion of the intra prediction mode index in the intra prediction mode of FIG. 7.

The conversion table of FIG. 31 is an example of a table for performing conversion into an angle $\theta_C$ which is the closest to the following relation: $\tan\theta_C=2\tan\theta_L$ in the case of an angle at which the directional prediction in the intra prediction mode is given by $\tan\theta$ shown in FIG. 32, where the angle of the prediction direction is expressed by theta (refer to FIG. 30).

The implementation of the conversion process can be configured in such a way that the conversion table for the index is prepared and the intra prediction unit converts the index by referring to the conversion table, as described above, or a conversion equation is prepared and the intra prediction unit converts the index according to the conversion equation.

Because the intra prediction unit is configured in this way, the intra prediction unit can perform an appropriate prediction on the color difference signals according to the YUV4:2:2 signal format only by performing the conversion of the index without changing the directional prediction process itself.

Further, in the case in which the image encoding device is configured in such a way as to prevent itself from performing the above-described LM mode on the color difference signals, the image decoding device is similarly configured in such a way as to be able to decode the encoded bitstream generated by the image encoding device.

As an example of the correspondence between the intra prediction parameter (index value) and the color difference intra prediction mode of the color difference signals at that time, the example of FIG. 24 is provided.

Because by thus configuring the intra prediction unit in such a way as not to use the LM mode as well, the dependence between the luminance signal and the color difference signals of the target pixel for prediction is eliminated, parallelization of the prediction process on the luminance signal and that on the color difference signals is enabled, and high-speed arithmetic processing can be implemented.

In addition, in the case in which the image encoding device is configured in such a way as to, as to the vertical prediction and the horizontal prediction on the color difference signals, use the same prediction method as that in MPEG-4 AVC/H.264 without performing the filtering process on a block boundary, the image decoding device is similarly configured in such a way as to be able to decode the encoded bitstream generated by the image encoding device.

By not performing the filtering process in this way, a reduction of the amount of computations of the prediction process can be achieved.

When the coding mode M(B″) variable-length-decoded by the variable length decoding unit 31 is an inter coding mode (m(B″)∈INTER) (step ST25), the motion compensation unit 35 receives the motion vector and the inter prediction parameter of each prediction block which are outputted from the select switch 33, and performs an inter prediction process on each prediction block $P_i''$ in the coding block B″ using the motion vector and the inter prediction parameter while referring to the decoded image which is stored in the motion-compensated prediction frame memory 39 and on which the filtering process is performed, to generate an inter prediction image $P_{INTERi}''$ (step ST27).

When receiving the compressed data and the prediction difference coding parameters from the variable length decoding unit 31, the inverse quantization/inverse transformation unit 32 refers to the quantization parameter and the transformation block partitioning information which are included in the prediction difference coding parameters and inverse-quantizes the compressed data on a per transformation block basis according to the same procedure as that of the inverse quantization/inverse transformation unit 8 shown in FIG. 1.

At that time, the inverse quantization/inverse transformation unit refers to each header information variable-length-decoded by the variable length decoding unit 31, and, when this header information shows that the inverse quantization process is to be performed on the slice currently being processed by using the quantization matrix, performs the inverse quantization process by using the quantization matrix.

At that time, the inverse quantization/inverse transformation unit refers to each header information variable-length-decoded by the variable length decoding unit 31 to specify the quantization matrix to be used for each of the chrominance signals and for each coding mode (intra coding or inter coding) at each orthogonal transformation size.

The inverse quantization/inverse transformation unit 32 also performs an inverse orthogonal transformation process on the transform coefficients, which are the compressed data inverse-quantized thereby, on a per transformation block basis, to calculate a decoded prediction difference signal which is the same as the local decoding prediction difference signal outputted from the inverse quantization/inverse transformation unit 8 shown in FIG. 1 (step ST28).

The adding unit 36 adds the decoded prediction difference signal calculated by the inverse quantization/inverse transformation unit 32 and either the intra prediction image $P_{INTRAi}''$ generated by the intra prediction unit 34 or the inter prediction image $P_{INTERi}''$ generated by the motion compensation unit 35 to calculate a decoded image and output the decoded image to the loop filter unit 38, and also stores the decoded image in the memory 37 for intra prediction (step ST29).

This decoded image is a decoded image signal which is used at the time of subsequent intra prediction processes.

When completing the processes of steps ST23 to ST29 on all the coding blocks B″ (step ST30), the loop filter unit 38 performs a predetermined filtering process on the decoded image outputted from the adding unit 36, and stores the decoded image filtering-processed thereby in the motion-compensated prediction frame memory 39 (step ST31).

Concretely, the loop filter unit performs a filtering (deblocking filtering) process of reducing a distortion occurring at a boundary between transformation blocks and a distortion occurring at a boundary between prediction blocks, a process (pixel adaptive offset process) of adaptively adding an offset on a per pixel basis, an adaptive filtering process of adaptively switching among linear filters, such as Wiener filters, and performing a filtering process, and so on.

However, for each of the above-described filtering processes including the deblocking filtering process, the pixel adaptive offset process, and the adaptive filtering process, the loop filter unit 38 refers to each header information variable-length-decoded by the variable length decoding unit 31 to specify whether or not to perform the process on the slice currently being processed.

At that time, in the case in which the loop filter unit 11 of the image encoding device is configured as shown in FIG. 11, for example, when performing two or more filtering processes, the loop filter unit 38 is configured as shown in FIG. 12.

In the deblocking filtering process, the loop filter unit refers to the header information variable-length-decoded by the variable length decoding unit 31, and, when there exists information for changing the various parameters used for the selection of the intensity of a filter applied to a block boundary from initial values, performs the deblocking filtering process on the basis of the change information. When no change information exists, the loop filter unit performs the deblocking filtering process according to a predetermined method.

In the pixel adaptive offset process, the loop filter unit partitions the decoded image into blocks on the basis of the block partitioning information for the pixel adaptive offset process, which is variable-length-decoded by the variable length decoding unit 31, refers to the index variable-length-decoded by the variable length decoding unit 31 and indicating the class classifying method of each of the blocks on a per block basis, and, when the index does not indicate "does not perform the offset process", performs a class classification on each pixel in each of the blocks according to the class classifying method indicated by the above-described index.

As candidates for the class classifying method, the same candidates as those for the class classifying method of the pixel adaptive offset process performed by the loop filter unit 11 are prepared in advance.

The loop filter unit 38 then refers to the offset information specifying the offset value calculated for each class on a per block basis and variable-length-decoded by the variable length decoding unit 31, and performs a process of adding the offset to the brightness value of the decoded image.

In the adaptive filtering process, after performing a class classification according to the same method as that used by the image encoding device of FIG. 1, the loop filter unit 20 performs the filtering process by using the filter for each class, which is variable-length-decoded by the variable length decoding unit 31, on the basis of information about the class classification.

The decoded image on which the filtering process is performed by this loop filter unit 38 is provided as a reference image for motion-compensated prediction, and is determined as a reproduced image.

As can be seen from the above description, because the image encoding device in accordance with this Embodiment 1 is configured in such a way as to generate an encoded bitstream which can be correctly played back from the same field at all times irrespective of the decoding start position of the encoded bitstream also in the field pair encoding of an interlaced video, a display device that displays a decoded image has only to be configured in such a way as to always display the same field first irrespective of the decoding start position of the encoded bitstream also in the field pair encoding of an interlaced video, and there is provided an advantage of being able to easily perform the display process.

Further, in accordance with this Embodiment 1, there is provided an advantage of being able to correctly decode the encoded bitstream which can be correctly played back at all times from the same field irrespective of the decoding start position of the encoded bitstream also in the field pair decoding of an interlaced video.

While the invention has been described in its preferred embodiment, it is to be understood that various changes can be made in an arbitrary component according to the embodiment, and an arbitrary component according to the embodiment can be omitted within the scope of the invention.

INDUSTRIAL APPLICABILITY

As mentioned above, because the image encoding device, the image encoding method, the image decoding device, and the image decoding method in accordance with the present invention make it possible to generate and encode an encoded bitstream which can be played back at all times from the same field irrespective of the decoding start position of the encoded bitstream also in the field pair encoding of an interlaced video, they are useful in a video encoding device, a video decoding device, etc.

EXPLANATION OF REFERENCE NUMERALS

1 block partitioning unit, 2 encoding controlling unit, 3 select switch, 4 intra prediction unit (intra predictor), 5 motion-compensated prediction unit, 6 subtracting unit, 7 quantization/inverse transformation unit, 9 adding unit, 10 memory for intra prediction, 11 loop filter unit, 12 motion-compensated prediction frame memory, 13 variable length encoding unit, 14 slice partitioning unit, 31 variable length decoding unit, 32 inverse quantization/inverse transformation unit, 33 select switch, 34 intra prediction unit (intra predictor), 35 motion compensation unit, 36 adding unit, 37 memory for intra prediction, 38 loop filter unit, and 39 motion-compensated prediction frame memory.

The invention claimed is:

1. An image encoding device that encodes each field as a picture, each of frames consisting of two fields: a first field and a second field, said image encoding device comprising:
   an encoder that makes a setup for encoding a first field of a specific frame as a first picture which is an intra picture to be predicted by using only an intra prediction and which is a non-Intra Random Access Point (non-IRAP) picture, the specific frame having any position in each of the frames, and encoding the first picture which is the first field of said specific frame, a second picture which is a second field of said specific frame to be predicted by using the first picture and whose encoding order is later than that of the first picture, and a third picture which is to be predicted by using the first picture or the second picture and whose encoding order is later than that of said specific frame and whose display order is earlier than that of said specific frame; and
   a multiplexer that multiplexes information showing that the first picture which is the first field of said specific frame is a picture, in a bitstream, at which decoding can be started into said bitstream.

2. An image encoding method of encoding each field as a picture, each of frames consisting of two fields: a first field and a second field, said image encoding method comprising:
   an encoding setting step of making a setup for encoding a first field of a specific frame as a first picture which is an intra picture to be predicted by using only an intra prediction and which is a non-Intra Random Access Point (non-IRAP) picture, the specific frame having any position in each of the frames, and encoding the first picture which is the first field of said specific frame, a second picture which is a second field of said specific frame to be predicted by using the first picture and whose encoding order is later than that of the first picture, and a third picture which is to be predicted by using the first picture or the second picture and whose encoding order is later than that of said specific frame and whose display order is earlier than that of said specific frame; and
   a multiplexing step of multiplexing information showing that the first picture which is the first field of said specific frame is a picture, in a bitstream, at which decoding can be started into said bitstream.

3. An image decoding device comprising:
   a decoder that decodes a bitstream in which each of frames consists of two fields: a first field and a second field, and each of the fields is encoded as a picture, and acquires information showing that a first picture which is the first field of a specific frame is a picture, in said bitstream, at which decoding can be started, the specific frame having any position in each of the frames, the first picture being an intra picture and a non-Intra Random Access Point (non-IRAP) picture, and
   that, when starting the decoding from the first field of said specific frame specified by said information, decodes the first picture which is the first field of said specific frame, a second picture which is the second field of said specific frame to be predicted by using the first picture, and a third picture which is to be predicted by using the first picture or the second picture and whose encoding order is later than that of said specific frame and whose display order is earlier than that of said specific frame.

4. An image decoding method comprising:
a decoding step of decoding a bitstream in which each of frames consists of two fields: a first field and a second field, and each of the fields is encoded as a picture, and acquiring information showing that a first picture which is the first field of a specific frame is a picture, in said bitstream, at which decoding can be started, the specific frame having any position in each of the frames, the first picture being an intra picture and a non-Intra Random Access Point (non-IRAP) picture, and,
when starting the decoding from the first field of said specific frame specified by said information, decoding the first picture which is the first field of said specific frame, a second picture which is the second field of said specific frame to be predicted by using the first picture, and a third picture which is to be predicted by using the first picture or the second picture and whose encoding order is later than that of said specific frame and whose display order is earlier than that of said specific frame.

5. A non-transitory computer-readable storage medium storing coded data in which each of frames consists of two fields: a first field and a second field, and each of the fields is encoded as a picture, the coded data comprising:
a first picture which is the first field of a specific frame having any position in each of the frames;
a second picture which is the second field of said specific frame and whose encoding order is later than that of the first picture;
a third picture whose encoding order is later than that of said specific frame and whose display order is earlier than that of said specific frame; and
information showing that the first picture is a picture, in a bitstream, at which decoding can be started, wherein
the coded data allows an image decoding device
to specify a position of the first picture in accordance with the information,
to decode the first picture which is an intra picture and which is a non-Intra Random Access Point (non-IRAP) picture, the second picture which is to be predicted by using the first picture, and the third picture which is to be predicted by using the first picture or the second picture.

* * * * *